United States Patent
Johnson et al.

(10) Patent No.: US 11,302,912 B2
(45) Date of Patent: Apr. 12, 2022

(54) BATTERY WITH NOVEL COMPONENTS

(71) Applicant: HHELI, LLC, Tulsa, OK (US)

(72) Inventors: Paige L. Johnson, Tulsa, OK (US); Jonathan G. Neff, Tulsa, OK (US)

(73) Assignee: HHeLi, LLC, Tulsa, OK (US)

( * ) Notice: Subject to any disclaimer, the term of this patent is extended or adjusted under 35 U.S.C. 154(b) by 111 days.

(21) Appl. No.: 16/780,583

(22) Filed: Feb. 3, 2020

(65) Prior Publication Data

US 2020/0176766 A1 Jun. 4, 2020

Related U.S. Application Data

(62) Division of application No. 15/949,805, filed on Apr. 10, 2018, now Pat. No. 10,553,861.

(60) Provisional application No. 62/507,655, filed on May 17, 2017, provisional application No. 62/507,660, filed on May 17, 2017, provisional application No. 62/483,789, filed on Apr. 10, 2017.

(51) Int. Cl.

| | |
|---|---|
| *H01M 4/36* | (2006.01) |
| *H01M 4/525* | (2010.01) |
| *H01M 4/505* | (2010.01) |
| *H01M 4/48* | (2010.01) |
| *H01M 4/485* | (2010.01) |
| *H01M 4/52* | (2010.01) |
| *H01M 4/02* | (2006.01) |
| *H01M 10/0525* | (2010.01) |
| *C01G 19/02* | (2006.01) |
| *C01G 49/02* | (2006.01) |
| *C01G 29/00* | (2006.01) |
| *C01G 25/02* | (2006.01) |
| *C01G 23/04* | (2006.01) |
| *C01G 30/00* | (2006.01) |
| *C01G 15/00* | (2006.01) |
| *C01G 49/00* | (2006.01) |
| *C01G 23/047* | (2006.01) |

(52) U.S. Cl.
CPC ............ *H01M 4/366* (2013.01); *C01G 15/00* (2013.01); *C01G 19/02* (2013.01); *C01G 23/04* (2013.01); *C01G 23/047* (2013.01); *C01G 25/02* (2013.01); *C01G 29/00* (2013.01); *C01G 30/004* (2013.01); *C01G 49/0027* (2013.01); *C01G 49/02* (2013.01); *H01M 4/483* (2013.01); *H01M 4/485* (2013.01); *H01M 4/505* (2013.01); *H01M 4/523* (2013.01); *H01M 4/525* (2013.01); *C01P 2002/50* (2013.01); *C01P 2002/54* (2013.01); *C01P 2004/64* (2013.01); *C01P 2004/80* (2013.01); *C01P 2006/40* (2013.01); *H01M 10/0525* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 4,502,936 A | 3/1985 | Hayfield | |
| 5,296,319 A | 3/1994 | Bito et al. | |
| 5,679,481 A | 10/1997 | Takanishi et al. | |
| 6,007,945 A | 12/1999 | Jacobs et al. | |
| 6,171,571 B1 | 1/2001 | Bedard et al. | |
| 6,670,300 B2 | 12/2003 | Werpy et al. | |
| 6,746,983 B2 | 6/2004 | Gaffney et al. | |
| 6,753,114 B2 | 6/2004 | Jacobs et al. | |
| 7,026,068 B2 * | 4/2006 | Takahashi | H01M 4/5815 429/231 |
| 7,053,022 B2 | 5/2006 | Gaffney et al. | |
| 7,147,834 B2 | 12/2006 | Wong et al. | |
| 7,166,263 B2 | 1/2007 | Vanderspurt et al. | |
| 7,314,682 B2 | 1/2008 | Thackeray et al. | |
| 7,582,276 B2 | 9/2009 | Nonninger | |
| 7,611,750 B2 | 11/2009 | Yi et al. | |
| 7,612,011 B2 | 11/2009 | Vanderspurt et al. | |
| 7,718,568 B2 | 5/2010 | Gaffney et al. | |
| 7,732,096 B2 | 6/2010 | Thackeray et al. | |
| 7,825,064 B2 | 11/2010 | Wong et al. | |
| 8,088,707 B2 | 1/2012 | Kim et al. | |
| 8,148,011 B2 | 4/2012 | Thackeray et al. | |
| 8,173,827 B2 | 5/2012 | Chang et al. | |
| 8,303,841 B2 | 11/2012 | Li et al. | |
| 8,318,384 B2 | 11/2012 | Luo et al. | |
| 8,383,077 B2 | 2/2013 | Thackeray et al. | |
| 8,480,998 B2 | 7/2013 | Hagemeyer et al. | |
| 8,493,711 B2 | 7/2013 | Seymour | |

(Continued)

FOREIGN PATENT DOCUMENTS

| | | |
|---|---|---|
| AU | 2007330996 B2 | 6/2008 |
| AU | 2007330996 C1 | 7/2014 |

(Continued)

OTHER PUBLICATIONS

Chung, D.-W., Shearing, P.R., Brandon, N.P., Harris, S.J., Garcia, E.R.—Particle Size Polydispersity in Li-Ion Batteries, Journal of Electrochemical Society, 161(3), pp. A422-A430, 2014 (Year: 2014).*

(Continued)

*Primary Examiner* — Anca Eoff
(74) *Attorney, Agent, or Firm* — GableGotwals

(57) ABSTRACT

A battery cell having an anode or cathode comprising an acidified metal oxide ("AMO") material, preferably in monodisperse nanoparticulate form 20 nm or less in size, having a pH<7 when suspended in a 5 wt % aqueous solution and a Hammett function $H_0$>−12, at least on its surface.

23 Claims, 46 Drawing Sheets

(56) References Cited

U.S. PATENT DOCUMENTS

| | | | |
|---|---|---|---|
| 8,503,162 B2 | 8/2013 | Seymour | |
| 8,614,878 B2 | 12/2013 | Seymour | |
| 8,632,926 B2* | 1/2014 | Lee | H01M 8/1039 |
| | | | 429/494 |
| 8,658,126 B2 | 2/2014 | Toledo Antonio et al. | |
| 8,685,283 B2 | 4/2014 | Wei et al. | |
| 8,759,245 B2 | 6/2014 | Chang et al. | |
| 8,828,904 B2 | 9/2014 | Wei et al. | |
| 8,871,374 B2 | 10/2014 | Vaughey et al. | |
| 8,889,078 B2 | 11/2014 | Ji et al. | |
| 8,921,257 B2 | 12/2014 | Hazin et al. | |
| 8,926,860 B2 | 1/2015 | Sun et al. | |
| 8,969,238 B2 | 3/2015 | Fehrmann et al. | |
| 9,012,351 B2 | 4/2015 | Yang et al. | |
| 9,098,001 B2 | 8/2015 | Tashiro et al. | |
| 9,130,226 B2 | 9/2015 | Thackeray et al. | |
| 9,786,910 B2* | 10/2017 | Johnson | H01M 4/48 |
| 10,700,349 B2* | 6/2020 | Johnson | H01M 10/0567 |
| 10,978,704 B2* | 4/2021 | Johnson | C01G 49/02 |
| 2002/0086213 A1 | 7/2002 | Utsugi et al. | |
| 2003/0065216 A1 | 4/2003 | Tanimoto et al. | |
| 2004/0201948 A1 | 10/2004 | Hosoya et al. | |
| 2004/0219428 A1 | 11/2004 | Nagayama | |
| 2005/0118511 A1 | 6/2005 | Park et al. | |
| 2005/0202171 A1 | 9/2005 | Shin | |
| 2006/0147808 A1 | 7/2006 | Xiao et al. | |
| 2006/0188781 A1 | 8/2006 | Thackeray et al. | |
| 2007/0048435 A1 | 3/2007 | Suzuki et al. | |
| 2007/0179044 A1* | 8/2007 | Yang | C08F 10/00 |
| | | | 502/103 |
| 2007/0287067 A1 | 12/2007 | Takahashi et al. | |
| 2008/0026282 A1 | 1/2008 | Tamura et al. | |
| 2008/0272740 A1 | 11/2008 | Martinet et al. | |
| 2009/0017378 A1 | 1/2009 | Charest et al. | |
| 2009/0027056 A1 | 1/2009 | Huang et al. | |
| 2009/0317718 A1 | 12/2009 | Imachi et al. | |
| 2010/0001583 A1 | 1/2010 | Ichikawa | |
| 2010/0016443 A1 | 1/2010 | Toledano et al. | |
| 2010/0027192 A1 | 2/2010 | Perry et al. | |
| 2010/0099031 A1 | 4/2010 | Kato et al. | |
| 2010/0129724 A1 | 5/2010 | Kolosnitsyn | |
| 2010/0181540 A1 | 7/2010 | Suzuki | |
| 2010/0203121 A1 | 8/2010 | Toledano et al. | |
| 2011/0033746 A1 | 2/2011 | Liu et al. | |
| 2011/0052994 A1 | 3/2011 | Harada et al. | |
| 2011/0129709 A1 | 6/2011 | Ahn et al. | |
| 2011/0206974 A1 | 8/2011 | Inoue et al. | |
| 2011/0259244 A1 | 10/2011 | Herbig et al. | |
| 2011/0305940 A1 | 12/2011 | Usami | |
| 2012/0058397 A1 | 3/2012 | Zhamu et al. | |
| 2012/0085978 A1 | 4/2012 | Tashiro et al. | |
| 2012/0237819 A1 | 9/2012 | Ahn | |
| 2012/0238842 A1 | 9/2012 | Colvin, Jr. et al. | |
| 2013/0017340 A1 | 1/2013 | Brown et al. | |
| 2013/0026409 A1 | 1/2013 | Baker et al. | |
| 2013/0078518 A1 | 3/2013 | Thackeray et al. | |
| 2013/0149610 A1 | 6/2013 | Kang et al. | |
| 2013/0216911 A1 | 8/2013 | Hosoya et al. | |
| 2013/0224603 A1 | 8/2013 | Chen et al. | |
| 2013/0255872 A1 | 10/2013 | Zhong | |
| 2013/0266872 A1 | 10/2013 | Adamson et al. | |
| 2013/0330640 A1 | 12/2013 | Badding et al. | |
| 2014/0017570 A1 | 1/2014 | Naoi et al. | |
| 2014/0027670 A1 | 1/2014 | Sun et al. | |
| 2014/0135206 A1* | 5/2014 | Sharma | C01G 19/02 |
| | | | 502/171 |
| 2014/0187413 A1 | 7/2014 | Lagaron Cabello et al. | |
| 2014/0212694 A1 | 7/2014 | Park et al. | |
| 2014/0242445 A1 | 8/2014 | Gozdz et al. | |
| 2014/0322607 A1 | 10/2014 | Thackeray et al. | |
| 2014/0343203 A1 | 11/2014 | Miltner et al. | |
| 2015/0044565 A1 | 2/2015 | Wang et al. | |
| 2015/0065667 A1 | 3/2015 | Cheng et al. | |
| 2015/0069295 A1 | 3/2015 | Ho et al. | |
| 2015/0079471 A1 | 3/2015 | Fang et al. | |
| 2015/0087505 A1 | 3/2015 | Sanchez Valente et al. | |
| 2015/0126774 A1 | 5/2015 | Hiraoka et al. | |
| 2015/0140423 A1 | 5/2015 | Brown et al. | |
| 2015/0151280 A1 | 6/2015 | Sanchez Valente et al. | |
| 2015/0155595 A1 | 6/2015 | Ogihara | |
| 2015/0238937 A1 | 8/2015 | Kang et al. | |
| 2015/0263342 A1 | 9/2015 | Newbound et al. | |
| 2015/0287978 A1 | 10/2015 | Lockett et al. | |
| 2015/0303459 A1 | 10/2015 | Kovalenko et al. | |
| 2016/0293957 A1 | 10/2016 | Okae et al. | |
| 2017/0069931 A1 | 3/2017 | Wang et al. | |
| 2017/0141389 A1 | 5/2017 | Johnson et al. | |
| 2017/0214079 A1 | 7/2017 | Dai et al. | |
| 2018/0138506 A1 | 5/2018 | Johnson | |
| 2018/0294479 A1 | 10/2018 | Johnson et al. | |
| 2018/0337404 A1 | 11/2018 | Johnson | |
| 2018/0337405 A1 | 11/2018 | Johnson | |

FOREIGN PATENT DOCUMENTS

| | | |
|---|---|---|
| BR | PI0720068 A2 | 6/2008 |
| CA | 2637436 A1 | 8/2007 |
| CA | 2677185 A1 | 8/2008 |
| CA | 2824842 A1 | 8/2008 |
| CA | 2685475 A1 | 11/2008 |
| CA | 2744601 A1 | 6/2010 |
| CA | 2744601 C | 9/2013 |
| CA | 2677185 C | 12/2013 |
| CA | 2637436 C | 11/2014 |
| CN | 105406072 A | 3/2016 |
| CN | 105543961 A | 5/2016 |
| DE | 102013206736 A1 | 10/2014 |
| DE | 102013224206 A1 | 5/2015 |
| EP | 2086678 A1 | 8/2006 |
| EP | 1739139 A1 | 1/2007 |
| EP | 1888311 A2 | 2/2008 |
| EP | 2104558 A2 | 6/2008 |
| EP | 1997169 A1 | 12/2008 |
| EP | 2118208 A2 | 11/2009 |
| EP | 1739139 B1 | 10/2010 |
| EP | 1888311 A4 | 6/2011 |
| EP | 2545776 A2 | 1/2013 |
| EP | 2662914 A2 | 11/2013 |
| EP | 2662915 A2 | 11/2013 |
| EP | 2545776 A3 | 12/2014 |
| EP | 2662914 A4 | 1/2015 |
| EP | 1997169 B1 | 8/2015 |
| JP | 2002170556 A | 6/2002 |
| JP | 2008013427 A | 1/2008 |
| JP | 2008285388 A | 11/2008 |
| JP | 2009524568 A | 7/2009 |
| JP | 201148947 A | 3/2011 |
| JP | 2012169217 A | 9/2012 |
| JP | 2014116229 A | 6/2014 |
| JP | 2016001427 A | 1/2016 |
| KR | 1020030062496 A | 7/2003 |
| KR | 1020070108086 A | 11/2007 |
| KR | 101125593 B1 | 3/2012 |
| KR | 1020140088203 A | 7/2014 |
| WO | 0023510 A1 | 4/2000 |
| WO | 2006124670 A2 | 11/2006 |
| WO | 2007085077 A1 | 8/2007 |
| WO | 2007129842 A1 | 11/2007 |
| WO | 2008066293 A1 | 6/2008 |
| WO | 2008072239 A2 | 6/2008 |
| WO | 2008093347 A2 | 8/2008 |
| WO | 2008131551 A1 | 11/2008 |
| WO | 2012115206 A1 | 1/2014 |
| WO | 2014083135 A1 | 6/2014 |
| WO | 2015078745 A1 | 6/2015 |
| WO | 2016018738 A1 | 2/2016 |
| WO | 2016030126 A1 | 3/2016 |
| WO | 2016184687 A1 | 11/2016 |

(56) References Cited

FOREIGN PATENT DOCUMENTS

| WO | 2017087404 A1 | 5/2017 |
| WO | 2017087408 A9 | 5/2017 |

OTHER PUBLICATIONS

WIPO, "PCT/US18/52286: International Search Report and Written Opinion", dated Dec. 4, 2018.
PubChem Open Chemistry Database, "Ammonium Dihydrogen Phosphate", Mar. 22, 2016.
Adschiri et al, "Hydrothermal synthesis of metal oxide nanoparticles at supercritical conditions", , pp. 227-235, vol. 3, No. 2, Publisher: Journal of Nanoparticle Research; Jun. 2001.
Barbe et al, "Nanocrystalline Titanium Oxide electrodes for Photovoltaic Applications", , pp. 3157-3158, 3168, vol. 80, No. 12, Publisher: Journal of the American Ceramic Society; 1997.
Briois et al, "Solid-State and Solution Structural Study of Acetylacetone-Modified Tin(IV) Chloride Used as a Precursor of SnO2 nanoparticles Prepared by a Sol-Gel Route", , pp. 3885-3894, vol. 16, Publisher: Chem. Mater. 2004.
Chen et al, "Size effect of tin oxide nanoparticles on high capacity lithium battery anode materials", Dec. 15, 2007, pp. 1313-1318, vol. 202, No. 4-7, Publisher: Surface and Coatings Technology.
Feng, "The Synthesis and Characterization of Phosphonic Acids for the Surface Modification Study on Indium Tin Oxide", , Publisher: A dissertation presented to The Academic Faculty Georgia Institute of Technology; Aug. 2012.
Hino et al, "Reactions of butane and isobutane catalyzed by zirconium oxide treated with sulfate ion. solid superacid catalyst", , pp. 6439-6441, vol. 101, No. 21, Publisher: 1979 American Chemical Society.
Hofmann et al, "Highly monodisperse water-dispersable iron oxide nanoparticles for biomedical applications", , pp. 7842-7853, vol. 20, Publisher: Journal of Materials Chemistry; 2010.
Holland et al, "NMR characterization of phosphonic Acid Capped SnO2 nanoparticles", "Chem. Mater. 2007", Feb. 14, 2007, pp. 2519-2526, vol. 19, Publisher: American Chemical Society.
Mousavand et al, "Supercritical hydrothermal synthesis of organic-Oinorganic hybrid nanoparticles", Mar. 2006, pp. 1445-1446, vol. 41, No. 5, Publisher: Journal of Materials Science.
Munoz et al, "Comparative study of two wet chemical methods of BaSnO3 synthesis: Mechanism of formation of mixed oxide", Apr. 7, 2015, pp. 86-95, vol. 279, Publisher: Powder Technology 2015.
Rabuffetti et al, "Synthesis-Dependent Surface Acidity and Structure of SrTiO3 Nanoparticles", , pp. 11056-11067, vol. 114, No. 26, Publisher: Dept of Chemistry, Northwestern University, J. Phys. Chem; 2010.
Jouhannaud et al, "Rapid synthesis of tin (IV) oxide nanoparticles by microwave induced thermohydrolysis, Journal of Solid State Chemistry 2008",, pp. 1439-1444, vol. 181.
Lim et al., "Spherical Tin Oxide, SnO2 Particles Fabricated via Facile Hydrothermal method for Detection of Mercury (II) Ions", Sep. 1, 2011, pp. 4329-4340, Publisher: International Journal of Electrochemical Science.

Lu et al, "Electrochemical properties of tin oxide anodes for sodium-ion batteries",, pp. 287-295, Publisher Journal of Power Sources 284; 2015.
Lu et al, "Improved electrochemical performance of tin-sulfide anodes for solium-ion batteries", Jun. 24, 2015, Publisher Journal of Materials Chemistry A.
Mousavand et al., "Supercritical hydrothermal synthesis of organic-Oinorganic hybrid nanoparticles", Mar. 2006, pp. 1445-1446, vol. 41, No. 5, Publisher: Journal of Materials Science.
Munoz et al., "Comparative study of two wet chemical methods of BaSnO3 synthesis: Mechanism of formation of mixed oxide", Apr. 7, 2015, pp. 86-95, vol. 279, Publisher: Powder Technology 2015.
Nitta et al., "High-Capacity Anode Materials for Lithium-Ion Batteries: Choice of Elements and Structures of Active Particles",, Publisher: www.materialsviews.com; 2013.
WIPO, "PCT/US18/26961 International Search Report", dated Aug. 27, 2018.
KIPO, "PCT/US16/62068 International Search Report and Written Opinion", dated Mar. 2, 2017.
KIPO, "PCT/US16/62073 International Search Report and Written Opinion", dated Mar. 2, 2017.
USPTO, "PCT/US 17/61866 International Search Report and Written Opinion", dated Jan. 17, 2018.
Queffelec et al., "Surface Modification Using Phosphonic Acids and Esters",, pp. 3777-3807, vol. 112, Publisher: Chemical Reviews; 2012.
Rabuffetti et al., "Synthesis-Dependent Surface Acidity and Structure of SrTiO3 Nanoparticles", , p. 11056-11067, vol. 114, No. 26, Publisher: Dept of Chemistry, Northwestern University, J. Phys. Chem; 2010.
Subramanian et al, "Hydrothermal Synthesis and Pseudocapacitance Properties of MnO2 Nanostructures", "The Journal of Physical Chemistry B; Dec. 2005",, pp. 20207-20214, vol. 109, No. 43, Publisher: ResearchGate.
Sugunan et al., "Catalysis by some metal oxides modified with phosphate ions", Jun. 3, 2002, pp. 2251-2255, vol. 41A, No. Nov. 2002, Publisher: Indian Journal of Chemistry.
Sun et al, "Monodisperse Porous LiFePO4 Microspheres for a High Power Li-Ion Battery Cathode",, pp. 2132-2135, vol. 133, No. 7, Publisher: Journal of the American Chemical Society; 2011.
Venere, "Nanoparticle network could bring fast-charging batteries", Dec. 3, 2014, Publisher: Purdue University.
Wang et al., "Selected-control hydrothermal synthesis of alpha-and beta-MnO(2) single crystal nanowires",, pp. 2880-2881, vol. 124, No. 12, Publisher: Journal of the American Chemical Society; Apr. 2002.
Zhang et al, "Nanoscale Magnesium Hydroxide and Magnesium Oxide Powders: Control Over Size, Shape, and Structure via Hydrothermal Synthesis", "ResearchGate", Jan. 2001, pp. 435-440, vol. 13, No. 2, Publisher Chemistry of Materials.
Zhou et al, "Ultra-Uniform SnOx/Carbon Nanohybrids toward Advanced Lithium-Ion Battery Anodes", "Advanced Materials 2014",, pp. 3943-3949, vol. 26, Publisher: wileyonlinelibrary.com.

\* cited by examiner

| Reagents used for synthesis | O | S | Cl | Metal | pH |
|---|---|---|---|---|---|
| Metal-chloride and HCl | 58.6 | - | 2.3 | 27.9 | 2.0 |
| Metal-sulfate and $H_2SO_4$ | 58.3 | 2.0 | - | 26.2 | 1.2 |

FIG. 6

| Reagents used for synthesis | O | P | O-C=O | Metal |
|---|---|---|---|---|
| Metal-acetate and phosphoric acid | 59.6 | 3.0 | 0.4 | 27.3 |

FIG. 10

BATTERY WITH NOVEL COMPONENTS

CROSS-REFERENCE TO RELATED CASE

This is a divisional application claiming priority to U.S. patent application Ser. No. 15/949,805, filed Apr. 10, 2018, which claims the benefit of U.S. provisional patent application Ser. No. 62/483,789, filed on Apr. 10, 2017, entitled "Blended Acidified Metal Oxide Additive for Use in a Battery Electrode", U.S. provisional patent application Ser. No. 62/507,655, filed on May 17, 2017, entitled "Battery with Acidified Electrode," and U.S. provisional patent application Ser. No. 62/507,660, filed on May 17, 2017, entitled "Battery with Novel Cathode," and incorporates such applications by reference into this disclosure as if fully set out at this point.

FIELD

This disclosure is in the field of materials useful in chemical energy storage and power devices such as, but not limited to, batteries. More specifically, this disclosure relates to a battery cell with a cathode and/or an anode comprising acidified metal oxide ("AMO") nanomaterials.

BACKGROUND OF THE INVENTION

Metal oxides are compounds in which oxygen is bonded to metal, having a general formula $M_mO_x$. They are found in nature but can be artificially synthesized. In synthetic metal oxides the method of synthesis can have broad effects on the nature of the surface, including its acid/base characteristics. A change in the character of the surface can alter the properties of the oxide, affecting such things as its catalytic activity and electron mobility. The mechanisms by which the surface controls reactivity, however, are not always well characterized or understood. In photocatalysis, for example, the surface hydroxyl groups are thought to promote electron transfer from the conduction band to chemisorbed oxygen molecules.

Despite the importance of surface characteristics, the metal oxide literature, both scientific papers and patents, is largely devoted to creating new, nanoscale, crystalline forms of metal oxides for improved energy storage and power applications. Metal oxide surface characteristics are ignored and, outside of the chemical catalysis literature, very little innovation is directed toward controlling or altering the surfaces of known metal oxides to achieve performance goals.

The chemical catalysis literature is largely devoted to the creation of "superacids" acidity greater than that of pure sulfuric acid (18.4 M $H_2SO_4$)—often used for large-scale reactions such as hydrocarbon cracking. Superacidity cannot be measured on the traditional pH scale, and is instead quantified by Hammett numbers. Hammett numbers ($H_0$) can be thought of as extending the pH scale into negative numbers below zero. Pure sulfuric acid has an $H_0$ of −12.

There are, however, many reaction systems and many applications for which superacidity is too strong. Superacidity may, for example, degrade system components or catalyze unwanted side reactions. However, acidity may still be useful in these same applications to provide enhanced reactivity and rate characteristics or improved electron mobility.

The battery literature teaches that acidic groups are detrimental in batteries, where they can attack metal current collectors and housings and cause deterioration in other electrode components. Further, the prior art teaches that an active, catalytic electrode surface leads to electrolyte decomposition which can result in gas generation within the cell and ultimately in cell failure.

A need exists for battery implementation having a synthetic metal oxide that is acidic but not superacidic at least on its surface and is deployed within the anode and/or cathode.

SUMMARY OF THE INVENTION

This application describes materials corresponding to acidified metal oxides ("AMO") and applications for using the AMOs, including in batteries, such as in battery electrode materials, as catalysts, as photovoltaic or photoactive components, and sensors. Techniques for preparing AMOs and devices comprising AMOs are further disclosed. The disclosed AMOs are optionally used in combination with acidic species to enhance their utility.

The AMOs described include those in the form of a nanomaterial, such as a nanoparticulate form, which may be monodispersed or substantially monodispersed and have particle sizes less than 100 nm, for example. The disclosed AMOs exhibit low pH, such as less than 7 (e.g., between 0 and 7), when suspended in water or resuspended in water after drying, such as at a particular concentration (e.g., 5 wt. %), and further exhibit a Hammett function, H0, that is greater than −12 (i.e., not superacidic), at least on the surface of the AMO.

The surface of the AMOs may optionally be functionalized, such as by acidic species or other electron withdrawing species. Synthesis and surface functionalization may be accomplished in a "single-pot" hydrothermal method in which the surface of the metal oxide is functionalized as the metal oxide is being synthesized from appropriate precursors. In some embodiments, this single-pot method does not require any additional step or steps for acidification beyond those required to synthesize the metal oxide itself, and results in an AMO material having the desired surface acidity (but not superacidic).

Optionally, surface functionalization occurs using strong electron-withdrawing groups ("EWGs")—such as $SO_4$, $PO_4$, or halogens (Br, Cl, etc.)—either alone or in some combination with one another. Surface functionalization may also occur using EWGs that are weaker than $SO_4$, $PO_4$, or halogens. For example, the synthesized metal oxides may be surface-functionalized with acetate ($CH_3COO$), oxalate ($C_2O_4$), and citrate ($C_6H_5O_7$) groups.

Despite the conventional knowledge that acidic species are undesirable in batteries because they can attack metal current collectors and housings and cause deterioration in other electrode components, and that active, catalytic electrode surfaces can lead to electrolyte decomposition, gas generation within the cell, and ultimately in cell failure, the inventors have discovered that acidic species and components can be advantageous in batteries employing AMO materials in battery electrodes.

For example, the combination or use of the AMO with acidic species can enhance the performance of the resultant materials, systems or devices, yielding improved capacity, cyclability, and longevity of devices. As an example, batteries employing AMO materials in combination with acidic electrolytes or electrolytes containing acidic species as described herein exhibit considerable gains in capacity, such as up to 100 mAh/g or more greater than similar batteries employing non-acidified electrolytes or electrolytes lacking acidic species. In some embodiments, improvements in capacity between 50 and 300 mAh/g may be achieved. In addition, absolute capacities of up to 1000 mAh/g or more are achievable using batteries having acidified electrolytes or electrolytes including acidic species. Moreover, cycle life of a battery may be improved through the use of acidic electrolytes or electrolytes containing acidic species, such as where a battery's cycle life is extended by up to 100 or more charge-discharge cycles.

In addition or alternatively, batteries including an electrode, such as a cathode or anode, that is itself acidic or that includes acidic species, such as an organic acid, may also be beneficial and, again, contrary to the conventional teaching in battery technology. For example, batteries incorporating acidic electrodes or acidic species within the electrode may enhance the performance and yield improved capacity, cyclability, and longevity, particularly when used in electrodes including AMO materials. Capacity gains of up to 100 mAh/g or greater are achievable. Cycle life of a battery may also be improved through the use of acidic electrodes or electrodes containing acidic species, such as where a battery's cycle life is extended by up to 100 or more cycles. As an example, an acidic electrode or an electrode that includes acidic species may exhibit a pH less than 7 (but not be superacidic), such as when components of the electrode are suspended in water (or resuspended in water after drying) at 5 wt. %.

As a further example, batteries in which the electrode is formed using a slurry may also be beneficial and contrary to the conventional teaching in battery technology. As described herein, the AMO material may optionally formed into battery electrode by first forming a slurry of the AMO material with one or more binder compounds, solvents, additives (e.g., conductive additives or acidic additives), and/or other wet processing materials. The slurry may be deposited on a conductive material or current collector in order to form an electrode. Such a slurry and/or a solvent may optionally be acidic or include acidic species and, again, allow for improvements in capacity, cyclability, and longevity of the resultant battery. Optionally, all or a portion of the solvent may be evaporated, leaving the AMO material, binder, additives, etc. The resultant material may optionally exhibit its own acidity, such having a pH less than 7 (but not superacidic), when suspended in water (or resuspended in water after drying) at 5 wt. %, for example.

As described above, acidic species may optionally be included as an additive to any of the components of a battery, such as an electrode or an electrolyte. Optionally, a battery comprising an AMO may include an electrolyte positioned between the electrodes in which acidic species are dissolved in a solvent. Such an electrolyte may also be referred to herein as an acidified electrolyte. The electrolyte may optionally include one or more lithium salts dissolved in the solvent, such as $LiPF_6$, $LiAsF_6$, $LiClO_4$, $LiBF_4$, $LiCF_3SO_3$, and combinations of these. It will be appreciated that the electrolyte may be positioned not only in the space separating the electrodes (i.e., between the electrodes), but may also penetrate through or into pores of the electrodes and/or through or into pores of any materials or structures optionally positioned between the electrodes, such as a separator.

Example acidic species useful with the AMOs, electrodes, and electrolytes described herein include but are not limited to organic acids, such as carboxylic acids. Example acidic species include those exhibiting a pKa in water of between −10 and 7, between −5 and 6, between 1 and 6, between 1.2 and 5.6, or about 4. Specific example organic acids include, for example, oxalic acid, carbonic acid, citric acid, maleic acid, methylmalonic acid, formic acid, glutaric acid, succinic acid, methylsuccinic acid, methylenesuccinic acid, citraconic acid, acetic acid, benzoic acid. Example organic acids include dicarboxylic acids, such as those having a formula of

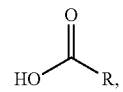

where R is a substituted or unsubstituted C1-C20 hydrocarbon, such as a substituted or unsubstituted alkyl group, a substituted or unsubstituted alkenyl group, a substituted or unsubstituted aromatic or heteroaromatic, a substituted or unsubstituted amine, etc. Example organic acids also include those having a formula of

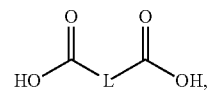

where L is a substituted or unsubstituted C1-C20 divalent hydrocarbon, such as a substituted or unsubstituted alkylene group, a substituted or unsubstituted arylene group, a substituted or unsubstituted heteroarylene group, a substituted or unsubstituted amine, etc. Organic acids may include organic acid anhydrides, such as having a formula of

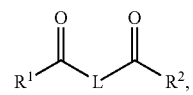

where R1 and R2 are independently a substituted or unsubstituted C1-C20 hydrocarbon, such as a substituted or unsubstituted alkyl group, a substituted or unsubstituted alkenyl group, a substituted or unsubstituted aromatic or heteroaromatic group, a substituted or unsubstituted amine, etc. Optionally, R1 and R2 can form a ring. Example organic acid anhydrides include any anhydrides of the above mentioned organic acids. Specific organic acid anhydrides include, but are not limited to glutaric anhydride, succinic anhydride, methylsuccinic anhydride, maleic anhydride, and itaconic anhydride.

Useful concentrations of the acidic species in either or both the electrolyte and the AMO electrode include from 0 wt. % to 10 wt. %, 0.01 wt. % to 10 wt. %, from 0.1 wt. % to 10 wt. %, from 1 wt. % to 5 wt. %, or from 3 wt. % to 5 wt. %.

Useful solvents include those employed in lithium ion battery systems, for example, such as ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Other useful solvents will be appreciated to those skilled in the art. Optionally, when an acidic species and metal salt are dissolved in a solvent to form an electrolyte, the electrolyte itself exhibits an acidic condition (i.e., pH less than 7).

Example binders useful with the batteries and electrodes described herein include Styrene Butadiene Copolymer (SBR), Polyvinylidene Fluoride (PVDF), Carboxy methyl cellulose (CMC), Styrene Butadiene Rubber (SBR), acrylonitrile, polyacrylic acid (PAA), polyvinyl alcohol (PVA), polyamide imide (PAI), and any combination of these. Optionally, conductive polymers may be useful as a binder.

Other example additives useful with the AMOs and electrodes described herein include, but are not limited to conductive additives. Example conductive additives include graphite, conductive carbon, carbon black, Ketjenblack, and conductive polymers, such as poly(3,4-ethylenedioxythiophene (PEDOT), polystyrene sulfonate (PSS), PEDOT:PSS composite, polyaniline (PAM), and polypyrrole (PPY). Conductive additives may be present, for example, in an electrode, at any suitable concentration such as at weight percents greater than 0 and as high as 35 wt. %, 40 wt. % or more. Optionally, conductive additives are present in an electrode at a range of 1 wt. % to 95 wt. %, 1 wt. % to 35 wt. %, 1 wt. % to 25 wt. %, 5 wt. % to 40 wt. %, 10 wt. % to 40 wt. %, 15 wt. % to 40 wt. %, 20 wt. % to 40 wt. %, 25 wt. % to 40 wt. %, 30 wt. % to 40 wt. %, 35 wt. % to 40 wt. %, 40 wt. % to 45 wt. %, 40 wt. % to 50 wt. %, 40 wt. % to 55 wt. %, 40 wt. % to 60 wt. %, 40 wt. % to 65 wt. %, 40 wt. % to 70 wt. %, 40 wt. % to 75 wt. %, 40 wt. % to 80 wt. %, 40 wt. % to 85 wt. %, 40 wt. % to 90 wt. %, or 40 wt. % to 95 wt. %.

Methods of making batteries are also described herein. An example method of making a battery comprises making an AMO nanomaterial; forming a first electrode of or comprising the AMO nanomaterial; forming an electrolyte by dissolving one or more metal salts in a solvent; and positioning the electrolyte between the first electrode and a second electrode. Another example method of making a battery comprises making an AMO nanomaterial; forming a first electrode of or comprising the AMO nanomaterial and one or more metal salts; and positioning the electrolyte between the first electrode and a second electrode.

Electrolytes for use in batteries are also disclosed herein. For example, the disclosed electrolytes are useful in batteries comprising a first electrode and a second electrode, such as a first electrode that comprises an acidified metal oxide (AMO) nanomaterial. Example electrolytes comprise a solvent and one or more metal salts dissolved in the solvent. Optionally, an acidic species is dissolved in the solvent, such as an acidic species that is different from the one or more metal salts.

As described above, a variety of acidic species are useful in the disclosed electrolytes, such as an acidic species comprising an organic acid and/or an organic acid anhydride. Example organic acids include, but are not limited to, oxalic acid, acetic acid, citric acid, maleic acid, methylmalonic acid, glutaric acid, succinic acid, methylsuccinic acid, methylenesuccinic acid, citraconic acid, or any combination of these. Example organic acid anhydrides include, but are not limited to glutaric anhydride, succinic anhydride, methylsuccinic anhydride, maleic anhydride, itaconic anhydride, or any combination of these. Other acidic species examples are described above. Useful acidic species include, but are not limited to, those exhibiting a pKa of between −10 and 7, between −5 and 6, between 1 and 6, between 1.2 and 5.6, or about 4. The acidic species may optionally be present in the electrolyte at any suitable concentration, such as from 0.01 wt. % to 10 wt. %, from 0.1 wt. % to 10 wt. %, from 1 wt. % to 5 wt. %, or from 3 wt. % to 5 wt. %.

It will be appreciated that lithium metal salts, such as $LiPF_6$, $LiAsF_6$, $LiClO_4$, $LiBF_4$, $LiCF_3SO_3$, may be useful components of the disclosed acidified electrolytes. Example solvents include, but are not limited to, ethylene carbonate, butylene carbonate, propylene carbonate, vinylene carbonate, dimethyl carbonate, diethyl carbonate, dipropyl carbonate, ethylmethyl carbonate, methylpropyl carbonate, ethylpropyl carbonate, fluoroethylene carbonate and mixtures thereof. Example solvents may be useful in metal ion batteries, such as lithium ion batteries.

BRIEF DESCRIPTION OF THE DRAWINGS

FIG. 6 is X-ray photoelectron spectroscopy (XPS) data showing surface functionalization arising endogenously from the synthesis method disclosed herein. Numbers shown are atomic concentrations in %. The far-right column lists the corresponding pH of the synthesized nanoparticles as measured when dispersed at 5 wt % in aqueous solution.

FIG. 10 provides X-ray photoelectron spectroscopy analysis of the surface of AMO nanoparticles synthesized using both a strong (phosphorous containing) and weak (acetate) electron withdrawing group shows greater atomic concentration of phosphorous than of the bonds associated with acetate groups.

DEFINITIONS

Figure 1:
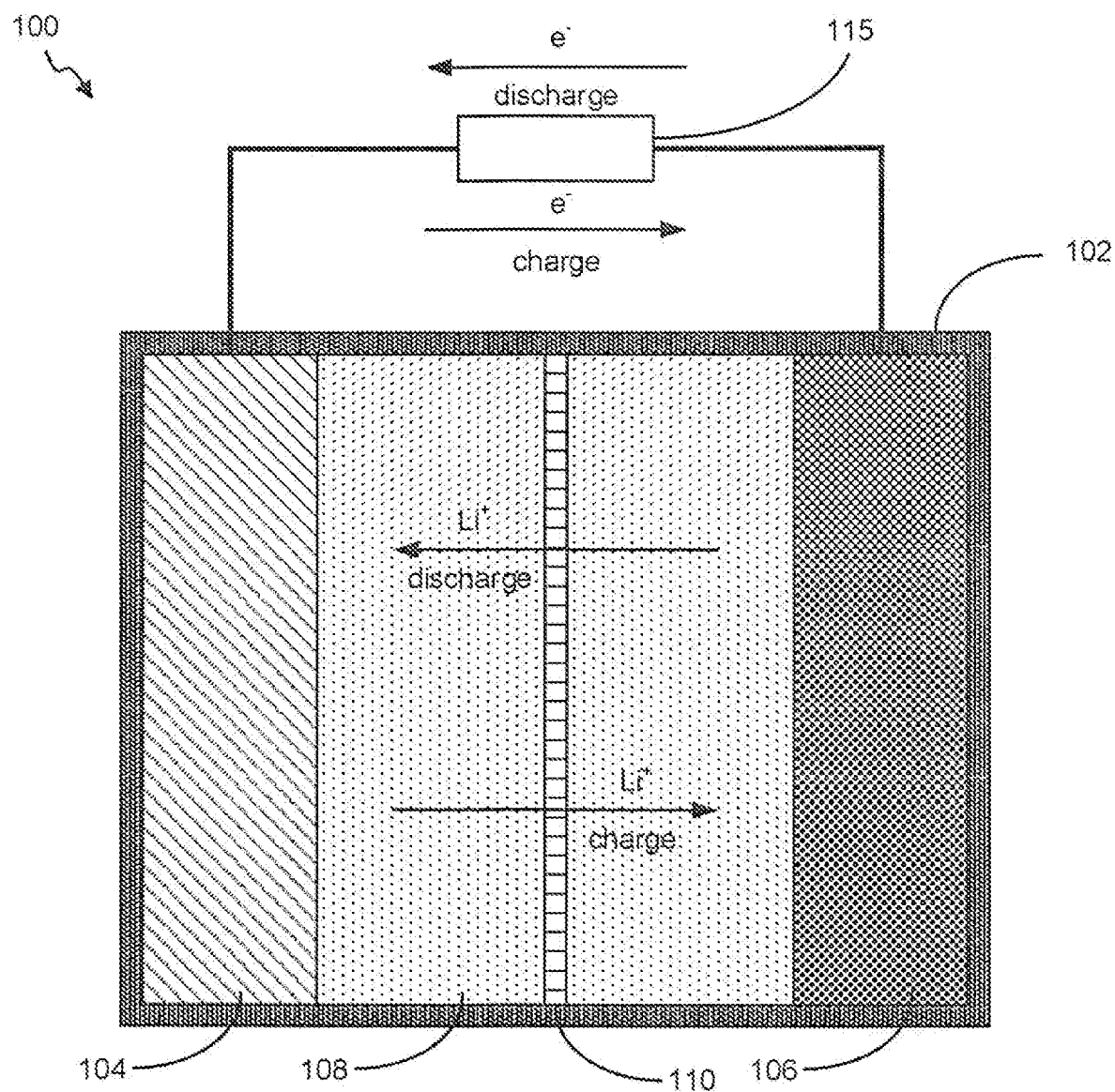
FIG. 1 is a simplified cutaway view of an example lithium ion battery cell.

For the purposes of this disclosure, the following terms have the following meanings:

Acidic oxide—a term used generally in the scientific literature to refer to binary compounds of oxygen with a nonmetallic element. An example is carbon dioxide, $CO_2$. The oxides of some metalloids (e.g., Si, Te, Po) also have weakly acidic properties in their pure molecular state.

Acidified metal oxide ("AMO")—a term used here to denote a binary compound of oxygen with a metallic element which has been synthesized or modified to have an acidity greater than that of its natural mineralogical state and also a Hammett function, $H_0 > -12$ (not superacidic). The average particle size is also less than that of the natural mineralogical state. Naturally occurring mineralogical forms do not fall within the scope of the inventive AMO material. A synthesized metal oxide, however, that is more acidic than its most abundant naturally occurring mineralogical form (of equivalent stoichiometry) but not superacidic falls within the bounds of this disclosure and can be said to be an AMO material provided it satisfies certain other conditions discussed in this disclosure.

Acidic—a term used generally in the scientific literature to refer to compounds having a pH of less than 7 in aqueous solution.

Electron-withdrawing group ("EWG")—an atom or molecular group that draws electron density towards itself. The strength of the EWG is based upon its known behavior in chemical reactions. Halogens, for example are known to be strong EWGs. Organic acid groups such as acetate are known to be weakly electron withdrawing.

Hammett function—An additional means of quantifying acidity in highly concentrated acid solutions and in superacids, the acidity being defined by the following equation: $H_0 = pK_{BH+} + \log([B]/[BH+])$. On this scale, pure 18.4 molar $H_2SO_4$ has a $H_0$ value of $-12$. The value $H_0 = -12$ for pure sulfuric acid must not be interpreted as pH=$-12$, instead it means that the acid species present has a protonating ability equivalent to $H_3O^+$ at a fictitious (ideal) concentration of $10^{12}$ mol/L, as measured by its ability to protonate weak bases. The Hammett acidity function avoids water in its equation. It is used herein to provide a quantitative means of distinguishing the AMO material from superacids. The Hammett function can be correlated with colorimetric indicator tests and temperature programmed desorption results.

Metal oxide—a term used generally in the scientific literature to refer to binary compounds of oxygen with a metallic element. Depending on their position in the periodic table, metal oxides range from weakly basic to amphoteric (showing both acidic and basic properties) in their pure molecular state. Weakly basic metal oxides are the oxides of lithium, sodium, magnesium, potassium, calcium, rubidium, strontium, indium, cesium, barium and tellurium. Amphoteric oxides are those of beryllium, aluminum, gallium, germanium, astatine, tin, antimony, lead and bismuth.

Monodisperse—characterized by particles of uniform size which are substantially separated from one another, not agglomerated as grains of a larger particle.

pH—a functional numeric scale used generally in the scientific literature to specify the acidity or alkalinity of an aqueous solution. It is the negative of the logarithm of the concentration of the hydronium ion $[H_3O^+]$. As used here it describes the relative acidity of nanoparticles suspended in aqueous solution.

Surface functionalization—attachment of small atoms or molecular groups to the surface of a material.

Superacid—substances that are more acidic than 100% $H_2SO_4$, having a Hammett function, $H_0 < -12$.

DETAILED DESCRIPTION OF THE PREFERRED EMBODIMENTS

Referring now to FIG. 1, a lithium ion battery cell 100 is illustrated in a simplified cutaway view. The cell 100 may comprise a casing or container 102. In some embodiments, the casing 102 is a polymer or an alloy. The casing 102 chemically and electrically isolates the contents of the cell 100 from adjacent cells, from contamination, and from damaging or being damaged by other components of the device into which the cell 100 is installed. A full battery may contain a plurality of cells arranged in a series and/or parallel configuration. The battery may have a further casing or securement mechanism binding the plurality of cells together as is known in the art.

The cell 100 provides a cathode 104 and an anode 106. The contents of the cell 100 undergo a chemical reaction when a conduction path is provided between the cathode 104 and anode 106 that is external to the cell 100. As a result of the chemical reaction, electrons are provided at the anode 106 that flow to the cathode 104 via the circuit provided external to the battery (sometimes referred to as the load). At a basic level, during discharge of the cell 100, the materials comprising the anode 106 are oxidized providing the electrons that flow through the circuit. The materials comprising the cathode 104, as recipient of the electrons given up by the anode 106, are reduced.

Within the cell 100, during discharge, metallic cations move through an electrolyte 108 from the anode 106 to the cathode 104. In the case of a lithium based battery, the metallic cation may be a lithium cation (Li+). The electrolyte 108 may be a liquid electrolyte such as a lithium salt in an organic solvent (e.g., $LiClO_4$ in ethylene carbonate). Other lithium based electrolyte/solvent combinations may be used as are known in the art. In some cases the electrolyte 108 may be a solid electrolyte such as a lithium salt in a polyethylene oxide. Optionally, the electrolyte may comprise a polymer electrolyte. Example electrolytes include those described in U.S. Patent Application Publication 2017/0069931, which is hereby incorporated by reference.

A separator 110 may be employed to prevent contact between the electrodes 104, 106. The separator 110 may be a porous layer of material that is permeable to the lithium ions and the electrolyte 108 but not otherwise electrically conductive so as to prevent internal shorting of the cell 100. As is known in the art, the separator 110 may comprise glass fibers or may comprise a polymer, possibly with a semi-crystalline structure. Additional components, such as current collectors, may also be included in the cell 100, but are not shown in FIG. 1.

Together the anode 104, cathode 106, electrolyte 108, and separator 110 form the completed cell 100. Since the separator 110 is porous, the electrolyte 108 may flow into, or be contained by, the separator 110. Under normal operating conditions, the porosity of the separator 110 allows for ion (Li+) flow between the electrodes 104, 106 via the electrolyte 108. As is known in the art, a separator can be constructed so as to melt and close the internal pore structure to shut down the cell in the event of exposure to excess heat or a runaway exothermic reaction.

Most lithium-based cells are so-called secondary batteries. They can be discharged and recharged many times before the chemical or structural integrity of the cell falls below acceptable limits. Cells and batteries according to the present disclosure are considered to be both primary (e.g., single use) and secondary batteries.

In the case of the cell 100 being a secondary cell (or part of a secondary battery) it should be understood that the cell 100 may be recharged either alone or as a component of a completed system wherein multiple cells are recharged simultaneously (and possibly in the same parallel or series circuit).

A reverse voltage is applied to the cell 100 in order to effect charging. It should be understood that various schemes for effective recharging of lithium batteries can be employed. Constant current, variable current, constant voltage, variable voltage, partial duty cycles, etc., may be employed. The present disclosure is not intended to be limited to a particular charging methodology unless stated in the claims. During charging of cell 100, element 115 represents a voltage source that is applied between cathode 104 and anode 106 to provide electrons from cathode 105 to anode 106 and allow chemical reactions to take place. Lithium ions are shuttled from cathode 104 to the anode 106 through electrolyte 108 and separator 110.

As examples, cathode 104 or anode 106 may independent comprise an AMO material disclosed herein. For use of an AMO material as a cathode, an anode may correspond to lithium metal or a lithium intercalation material, such as graphite. Optionally, electrolyte 108 may include an acidic species, such as dissolved in an organic solvent with a lithium salt. In addition to or alternative to use of an acidic species in electrolyte 108, an electrode (i.e., cathode 104 or anode 106) may optionally comprise an AMO and an acidic species. Oxalic acid is an exemplary acidic species.

Without wishing to be bound by any theory, it is believed that the presence of acidic species in the cathode 104 or anode 106 and/or electrolyte 108 improves a surface affinity of the AMO material toward lithium ions, resulting in an improved ability to take up lithium ions during discharge and overall improvement to capacity as compared to a similar cell lacking acidic species or having a basified electrode or electrolyte (i.e., including basic species). Alternatively or additionally, the presence of acidic species may allow for additional active sites for lithium uptake in cathode 104.

Figure 2:
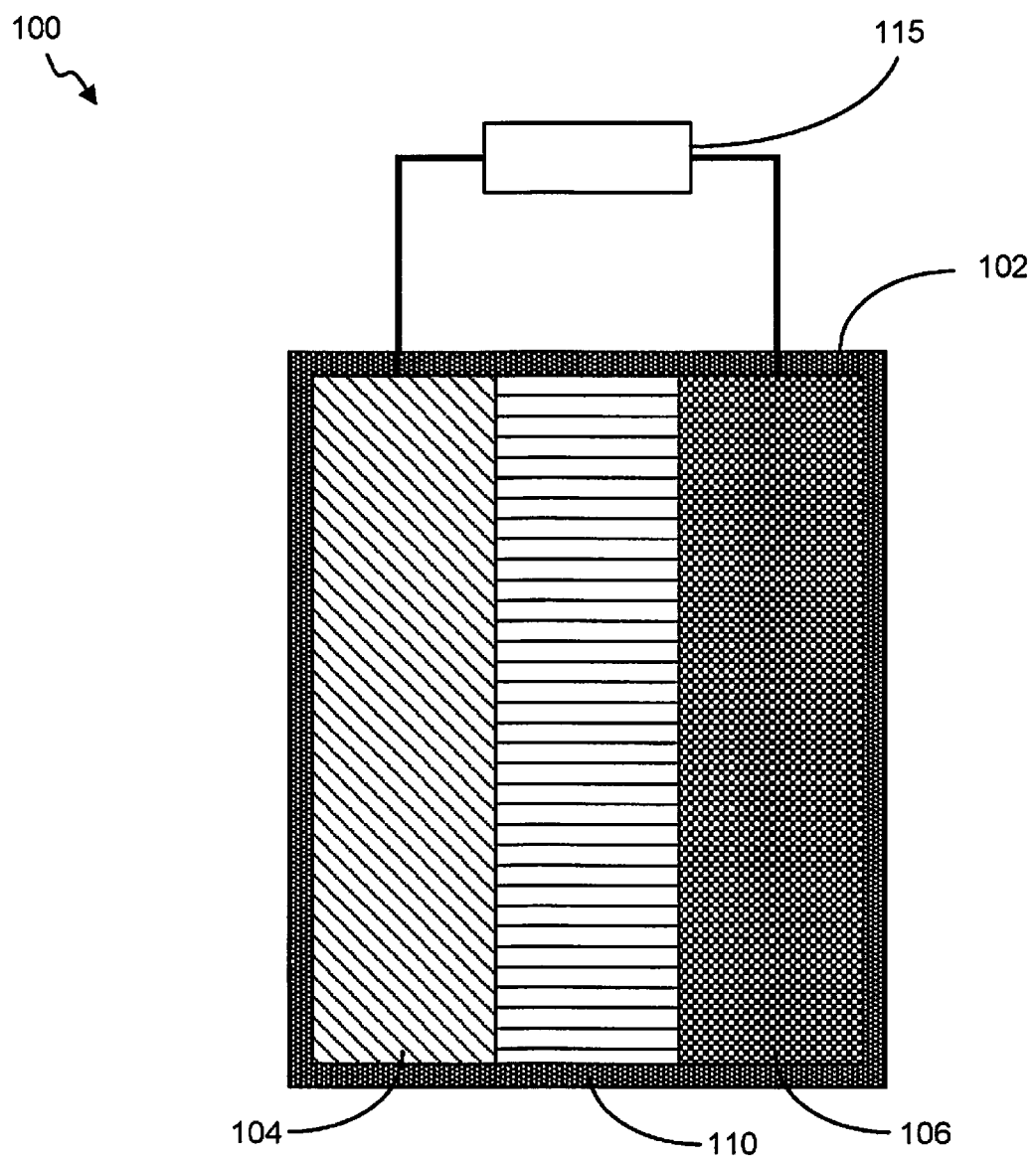
FIG. 2 is another simplified cutaway view of a lithium ion battery cell with the electrolyte substantially contained by the separator.

It should be understood that FIG. 1 is not to scale. A shown in FIG. 2, in most applications, the separator 110 occupies most or all of the space between the electrodes 104, 106 and is in contact with the electrodes 104, 106. In such case, the electrolyte 108 is contained within the separator 110 (but may also intrude into the pores or surface of the anode or cathode). FIG. 2 is also not necessarily to scale. The actual geometry of a cell can range from relatively thin and flat pouches, to canister type constructions, to button cells and others. Cell construction techniques such as winding or bobbin or pin type assemblies may be used.

Current collectors known in the art and other components (not shown) may also be relied upon to form a cell 100 into a commercially viable package. Although overall shape or geometry may vary, a cell or battery will normally, at some location or cross section, contain the electrodes 104, 106 separated rather than touching, and have the electrolyte 108 and possibly separator 110 between them. Cells may also be constructed such that there are multiple layers of anodes and cathodes. Cells may be constructed such that two cathodes are on opposite sides of a single anode or vice versa.

A functional or operational battery intended for a specific purpose may comprise a plurality of cells arranged according to the needs of particular application. An example of such a battery is shown schematically in FIG. 3. Here the battery 300 comprises four lithium cells 100 arranged in series to increase voltage. Capacity can be increased at this voltage by providing additional stacks of four cells 100 in parallel with the stack shown. Different voltages can be achieved by altering the number of cells 100 arranged in series.

Figure 3:
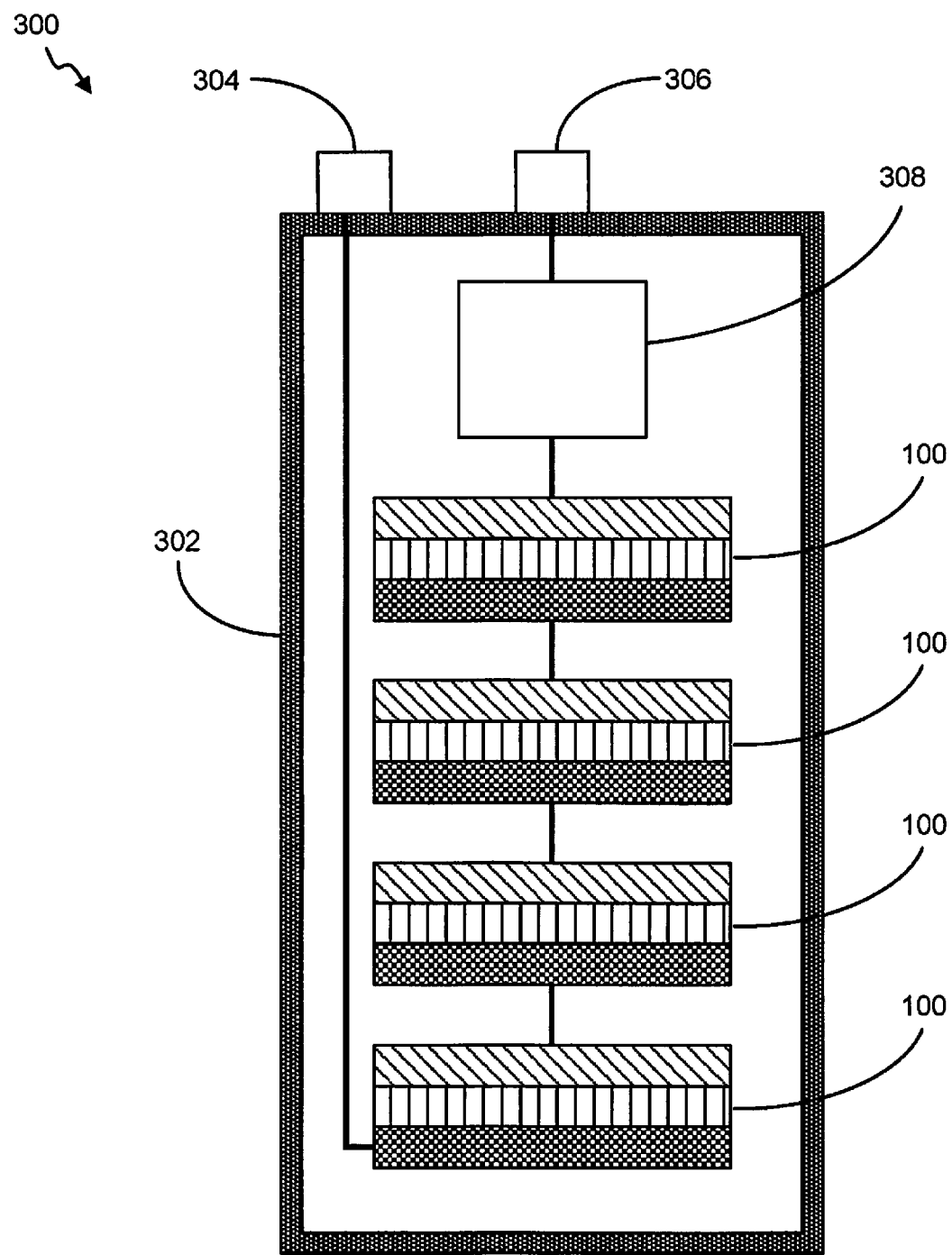
FIG. 3 is a schematic of a lithium ion battery comprising multiple cells.

A positive electrode 306 may be accessible on the outside of a casing 302 of the battery 300. A negative electrode 304 is also provided. The physical form factor of the electrodes 304, 306 may vary according to application. Various binders, glues, tapes and/or other securement mechanisms (not shown) may be employed within a battery casing 302 to stabilize the other components. Batteries based on lithium technology are generally operable, rechargeable, and storable in any orientation (if a secondary cell). As discussed above, cells 100 may take on various different geometric shapes. Thus FIG. 3 is not meant to represent any particular physical form factor of the battery 300.

The battery 300 may also comprise various adjunct circuitry 308 interposing the positive electrode 308 and the lithium cells 100 within the casing 302 of the battery 300. In other embodiments, the adjust circuitry interposes the negative electrode 304 and the lithium cells 100 instead of, or in addition to, interposing the positive electrode 306 and the lithium cells 100. The adjunct circuitry 308 may include short circuit protection, overcharge protection, overheating shutdown and other circuitry as is known in the art to protect the battery 300, the cells 100, and/or any load attached to the battery 300.

The composition of materials chosen for the cathode 104, anode 106, and electrolyte may be critical to the performance of the cell 100 and any battery of which it forms a part. In the context of the present disclosure, various examples of AMOs and methods for their production are provided in this regard. These AMOs are suitable for use in forming anodes or cathodes in half cells, cells, and batteries. The AMOs of the present disclosure are otherwise compatible with known lithium cell technology including existing anode and cathode compositions, electrolyte formulations, and separator compositions.

In the context of the present disclosure, various examples of AMOs and methods for their production and use are provided. These AMOs are suitable for use in forming cathodes or anodes in half cells, cells, and batteries. The disclosed AMOs are otherwise compatible with conventional lithium battery technology, including existing anode compositions, cathode compositions, electrolyte formulations, and separator compositions. It will be appreciated that the material of the anode 106 chosen for a cell or battery according to the present disclosure may be less electronegative than the material of the cathode to suitably complement the cathodic materials. In one particular embodiment, the disclosed AMOs are useful as a cathode in a cell having a lithium metal anode.

In various embodiments of the present disclosure, the cathode 104 comprises an AMO material having a surface that is acidic but not superacidic. This would be in contrast to materials previously known and utilized as cathodes such as lithium cobalt or lithium manganese materials. The AMO materials of the present disclosure and methods for their production are described below. In other embodiments, the anode 106 comprises an AMO material of the present disclosure having a surface that is acidic but not super acidic.

The surfaces of metal oxides are ideally arrays of metal and oxygen centers, ordered according to the crystalline structure of the oxide. In reality the arrays are imperfect, being prone to vacancies, distortion, and the effects of surface attachments. Regardless, any exposed metal centers are cationic (positively charged) and can accept electrons, thus functioning by definition as Lewis acid sites. Oxygen centers are anionic (negatively charged) and act as Lewis base sites to donate electrons. This leads to the well-known amphotericity of metal oxide surfaces.

Under normal atmospheric conditions, the presence of water vapor will adsorb to the metal oxide surface either molecularly (hydration) or dissociatively (hydroxylation). Both OH– and H+ species can adsorb on the oxide surface. The negatively-charged hydroxyl species will attach at the metal, cationic (Lewis acid, electron accepting) centers, and the H+ will attach at the oxygen, anionic (Lewis base, electron donating) centers. Both adsorptions lead to the presence of the same functional group—a hydroxyl—on the metal oxide surface.

These surface hydroxyl groups can serve as either Brønsted acids or as Brønsted bases, because the groups can either give up or accept a proton. The tendency of an individual hydroxyl group to be a proton donor or a proton acceptor is affected by the coordination of the metal cation or oxygen anion to which it is attached. Imperfections of the metal oxide surface such as oxygen vacancies, or coordination of the surface groups with other chemical species, mean that all cations and anions are not equally coordinated. Acid-base sites will vary in number and in strengths. When broadly "totaled" across the surface of the oxide, this can give the surface an overall acidic or basic character.

The quantity and strength of Lewis acid and base sites (from the exposed metal cations and oxygen anions, respectively) and Brønsted acid and base sites (from the surface hydroxyl groups)—add broad utility and functionality to the metal oxide and its use in both chemical reactions and device applications. The sites are a strong contributor to the chemical reactivity of the metal oxide. They can serve as anchor sites to which other chemical groups, and even additional metal oxides, may be attached. And they can affect surface charge, hydrophilicity and biocompatibility.

One way of altering the surface of metal oxides is to attach small chemical groups or electron-withdrawing groups ("EWGs") in a process known as surface functionalization. The EWG induces polarization of the hydroxide bonds and facilitates dissociation of hydrogen. For example, a stronger EWG should lead to a more polarized bond and therefore a more acidic proton. The acidity of Lewis sites can be increased by inducing polarization that facilitates the donation of electrons to the site. When compounds so made are placed in water, the acidic protons will dissociate and so reduce the aqueous pH measurement.

Though somewhat imprecise when working with solid acid/base systems rather than liquid ones, traditional methods of pH measurement utilizing titrations, pH paper and pH probes can be used to evaluate the acidity of metal oxides dispersed in aqueous solution. These measurements can be supplemented by the use of techniques including but not limited to colorimetric indicators, infrared spectroscopy, and temperature programmed desorption data to establish the acidified nature of the metal oxide surface. Surface groups can be examined by standard analytical techniques including but not limited to x-ray photoelectron spectroscopy.

Surface functionalization can be accomplished post-synthesis, including but not limited to exposing the metal oxide to acidic solutions or to vapors containing the desired functional groups. It can also be accomplished via solid state methods, in which the metal oxide is mixed and/or milled with solids containing the desired functional groups. However, all of these methods require an additional surface functionalization step or steps beyond those required to synthesize the metal oxide itself.

Synthesis and surface functionalization of the AMO material may be accomplished in a "single-pot" hydrothermal synthesis method or its equivalent in which the surface of the metal oxide is functionalized as the metal oxide is being synthesized from appropriate precursors. A precursor salt containing an EWG is solubilized and the resulting solution is acidified using an acid containing a second EWG. This acidified solution is then basified and the basified solution is heated then washed. A drying step produces the solid AMO material.

By way of example, a preferred embodiment of an AMO form of tin oxide was synthesized and simultaneously surface functionalized using the following single-pot method:

1. Initially, seven grams (7 g) of a tin (II) chloride dihydrate ($SnCl_2 2H_2O$) is dissolved in a solution of 35 mL of absolute ethanol and 77 mL distilled water.
2. The resulting solution is stirred for 30 minutes.
3. The solution is acidified by the addition of 7 mL of 1.2M HCl, added dropwise, and the resulting solution is stirred for 15 minutes.
4. The solution is basified by the addition of 1M of an aqueous base, added dropwise until the pH of the solution is about 8.5.
5. The resulting opaque white suspension is then placed in a hot-water bath (~60° to 90° C.) for at least 2 hours while under stirring.
6. The suspension is then washed with distilled water and with absolute ethanol.
7. The washed suspension is dried at 100° C. for 1 hour in air and then annealed at 200° C. for 4 hours in air.

This method results in an AMO of tin, surface-functionalized with chlorine, whose pH is approximately 2 when resuspended and measured in an aqueous solution at 5 wt % and room temperature. By definition its Hammett function, $H_0 > -12$. Although an open system such as a flask is described here, a closed system such as an autoclave may also be used.

Utilizing the single pot method disclosed above, a number of AMO's have been synthesized. Table 1 below describes the precursors and acids that have been used. In some instances, a dopant is utilized as well:

| Precursor | Dopant | Acid |
|---|---|---|
| SnAc | | $CH_3COOH$ |
| SnAc | | $H_2SO_4$ |
| SnAc | | $HNO_3$ |
| SnAc | | $H_3PO_4$ |
| SnAc | | $C_6H_8O_7$ |
| SnAc | | $C_2H_2O_4$ |
| SnAc | FeAc | HCl |
| SnAc | FeAc | $H_2SO_4$ |
| SnAc | FeAc | $HNO3$ |
| SnAc | FeAc | $C_2H_2O_4$ |
| SnAc | FeAc | $H_3PO_4$ |
| SnAc | FeAc | $C_6H_8O_7$ |
| SnAc | HBr | |
| SnAc | $H_3BO_3$ | |
| $SnSO_4$ | $MnCl_2$ | $H_2SO_4$ |

| Precursor | Dopant | Acid |
| --- | --- | --- |
| $SnCl_2$ | $MnCl_2$ | HCl |
| $SnCl_2$ | $FeCl_3$ & $AlCl_3$ | HCl |
| $FeCl_3$ | $SnCl_2$ | HCl |
| $Fe(NO_3)_3$ | | $HNO_3$ |
| $BiCl_3$ | | HCl |
| $Zr(SO_4)_2$ | | $H_2SO_4$ |
| $TiOSO_4$ | | $H_2SO_4$ |
| $Sb_2(SO_4)_3$ | | $H_2SO_4$ |
| $In(Cl)_3$ | | HCl |
| $In_2(SO_4)_3$ | | $H_2SO_4$ |
| $In(III)Br$ | | HBr |
| $InCl_3$ | | HCl |
| $LiAc$ & $FeCl_3$ | $SnCl_2$ | HCl | where Ac is an acetate group with the chemical formula $C_2H_3O_2$

In some embodiments, the electron withdrawing groups have a carbon chain length of 5 or less or 6 or less and/or an organic mass of 200 or less (AMU). In some embodiments, the electron withdrawing groups have a carbon chain length of 8 or less, or 10 or less, and/or an organic mass of 500 or less.

It will be appreciated that the method's parameters can be varied. These parameters include, but are not limited to, type and concentration of reagents, type and concentration of acid and base, reaction time, temperature and pressure, stir rate and time, number and types of washing steps, time and temperature of drying and calcination, and gas exposure during drying and calcination. Variations may be conducted singly, or in any combination, possibly using experimental design methodologies. Additionally, other metal oxide synthesis methods—e.g., spray pyrolysis methods, vapor phase growth methods, electrodeposition methods, solid state methods, and hydro- or solvo thermal process methods—may be useful for achieving the same or similar results as the method disclosed here.

A variety of annealing conditions are useful for preparing AMO nanomaterial. Example annealing temperatures may be below 300° C., such as from 100° C. to 300° C. Example annealing time may range from about 1 hours to about 8 hours, or more. Annealing may take place under a variety of atmospheric conditions. For example, annealing may occur in air at atmospheric pressure. Annealing may occur at elevated pressure (greater than atmospheric pressure) or reduced pressure (less than atmospheric pressure or in a vacuum). Annealing may alternatively occur in a controlled atmosphere, such as under an inert gas (e.g., nitrogen, helium, or argon) or in the presence of an oxidizing gas (e.g., oxygen or water).

A variety of drying conditions are useful for preparing AMO nanomaterials. Example drying temperatures may be from 50° C. to 150° C. Example drying time may range from about 0.5 hours to about 8 hours, or more. Drying may take place under a variety of atmospheric conditions. For example, drying may occur in air at atmospheric pressure. Drying may occur at elevated pressure (greater than atmospheric pressure) or reduced pressure (less than atmospheric pressure or in a vacuum). Drying may alternatively occur in a controlled atmosphere, such as under an inert gas (e.g., nitrogen, helium, or argon) or in the presence of an oxidizing gas (e.g., oxygen or water).

Figure 4:
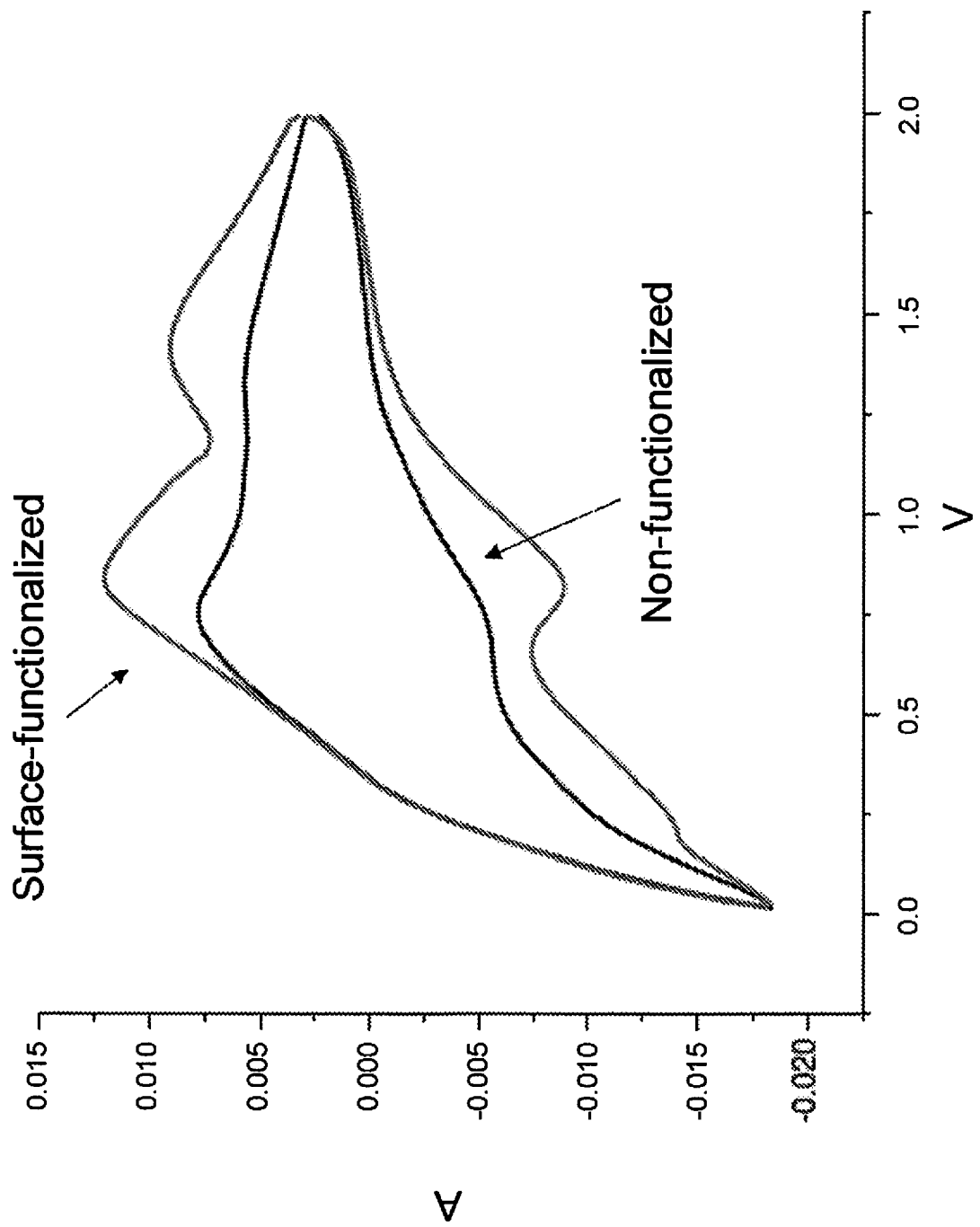
FIG. 4 shows differences in the cyclic voltammogram of AMO tin prepared by the method disclosed herein relative to that of commercially available, non-AMO tin when cycled against Li.

The performance characteristics of the AMO nanomaterials of the present disclosure differ from those of non-acidified metal oxide nanoparticles. As one example, FIG. 4 shows differences in the cyclic voltammogram of AMO tin prepared by the single-pot method relative to that of commercially available, non-AMO tin when cycled against lithium. For example, the surface-functionalized AMO material exhibits better reversibility than the non-AMO material. The presence of distinct peaks in the CV of the AMO material may indicate that multiple electron transfer steps are occurring during charging/discharging. For example, a peak at higher voltage may indicate direct oxidation/reduction of the AMO material, while a peak at lower voltage may originate due to changing the material structure of the AMO material (i.e., alloying).

Figure 5:
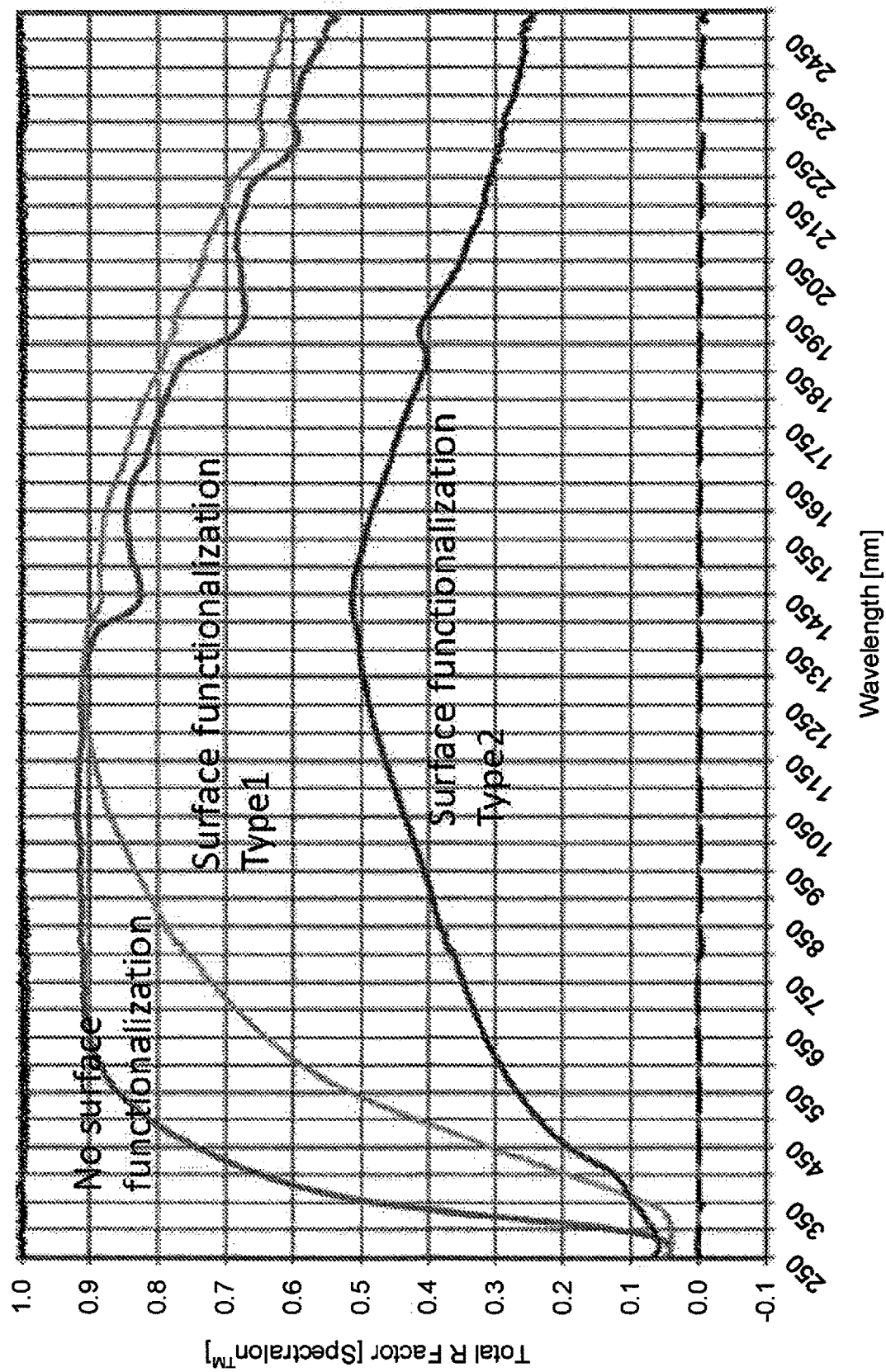
FIG. 5 shows the total reflectance of AMO tin oxide is different than that of commercially available, non-AMO tin oxide.

As another example, FIG. 5 shows the total reflectance of AMO tin oxide is different than that of commercially available, non-AMO tin oxide. The data indicates that the AMO has a lower band gap and therefore more desirable properties as a component of a photovoltaic system in addition to use as an anode according to the present disclosure.

The AMO material may be thought of as having the general formula $$M_mO_x/G$$

where
$M_mO_x$ is the metal oxide, m being at least 1 and no greater than 5, x being at least 1 and no greater than 21;
G is at least one EWG that is not hydroxide, and
/ simply makes a distinction between the metal oxide and the EWG, denoting no fixed mathematical relationship or ratio between the two.
G may represent a single type of EWG, or more than one type of EWG.

Exemplary AMOs are acidified tin oxides ($Sn_xO_y$), acidified titanium dioxides ($Ti_aO_b$), acidified iron oxides ($Fe_cO_d$), and acidified zirconium oxide ($Zr_eO_f$). Exemplary electron-withdrawing groups ("EWGs") are Cl, Br, $BO_3$, $SO_4$, $PO_4$ and $CH_3COO$. Regardless of the specific metal or EWG, according to the present disclosure, the AMO material is acidic but not superacidic, yielding a pH<7 when suspended in an aqueous solution at 5 wt % and a Hammett function, $H_0>-12$, at least on its surface.

The AMO material structure may be crystalline or amorphous (or a combination thereof), and may be utilized singly or as composites in combination with one another, with non-acidified metal oxides, or with other additives, binders, or conductive aids known in the art. In other words, an anode prepared to take advantage of the AMO's of the present disclosure may or may not comprise other materials. In one embodiment, the AMO may be layered upon a conductive material to form the cathode 104. In some embodiments, the AMO material is added to a conductive aid material such as graphite or conductive carbon (or their equivalents) in a range of 10 wt % to 80 wt % and upwards of 90 wt % to 95 wt %. In preferred embodiments, the AMO was added at 10 wt %, 33 wt %, 50 wt %, and 80 wt %.

To maximize the amount of overall surface area available, the AMO should be in nanoparticulate form (i.e., less than 1 micron in size) and substantially monodispersed. More preferably, the nanoparticulate size is less than 100 nm and, even more preferably, less than 20 nm or 10 nm.

Mixed-metal AMOs, in which another metal or metal oxide is present in addition to the simple, or binary oxide, have been reduced to practice in forming anodes utilized in half cells, cells, and batteries. These mixed-metal AMOs may be thought of as having the general formula $$M_mN_nO_x/G \text{ and } M_mN_nR_rO_x/G$$

where:
- M is a metal and m is at least 1 and no greater than 5;
- N is a metal and n is greater than zero and no greater than 5;
- R is a metal and r is greater than zero and no greater than 5;
- O is total oxygen associated with all metals and x is at least 1 and no greater than 21;
- / simply makes a distinction between the metal oxide and the electron-withdrawing surface group, denoting no fixed mathematical relationship or ratio between the two; and
- G is at least one EWG that is not hydroxide.

G may represent a single type of EWG, or more than one type of EWG.

Some prior art mixed metal oxide systems, of which zeolites are the most prominent example, display strong acidity even though each simple oxide does not. Preferred embodiments of the mixed-metal AMO of this disclosure differ from those systems in that any embodiment must include at least one AMO which is acidic (but not superacidic) in simple $M_mO_x/G$ form. Preferred mixed metal and metal oxide systems are $Sn_xFe_cO_{y+d}$ and $Sn_xTi_aO_{y+b}$, where y+d and y+b may be an integer or non-integer value.

In another embodiment, the mixed metal AMO material is produced via the single-pot method with one modification: synthesis begins with two metal precursor salts rather than one, in any proportion. For example, Step 1 of the single-pot method may be altered as follows: Initially, 3.8 g of tin (II) chloride dihydrate ($SnCl_2$ $2H_2O$) and 0.2 g of lithium chloride (LiCl) are dissolved in a solution of 20 mL of absolute ethanol and 44 mL distilled water.

Metal precursor salts as shown in Table 1 could also be used, in any proportion. The metal precursor salts could have the same or differing anionic groups, depending on the desired product; could be introduced at different points in the synthesis; or could be introduced as solids or introduced in a solvent. In some embodiments, a first metal precursor salt may be used for the primary structure (i.e., larger proportion) of the resultant AMO, and a second (and optionally a third) metal precursor salt may be added as a dopant or as a minor component for the resultant AMO.

Experimentation with the single-pot method led to seven notable findings. First, in all cases both surface functionalization and acidity arise endogenously (see FIG. 6), rather than created post-synthesis. Unlike prior art surface functionalization methods, the single-pot method does not require any additional step or steps for surface functionalization beyond those required to synthesize the metal oxide itself, nor does it make use of hydroxyl-containing organic compounds or hydrogen peroxide.

Second, the method is broadly generalizable across a wide range of metal oxides and EWGs. Using the methods of the present disclosure, metal oxides of iron, tin, antimony, bismuth, titanium, zirconium, manganese, and indium have been synthesized and simultaneously surface-functionalized with chlorides, sulfates, acetates, nitrates, phosphates, citrates, oxalates, borates, and bromides. Mixed metal AMOs of tin and iron, tin and manganese, tin and manganese and iron, tin and titanium, indium and tin, antimony and tin, aluminum and tin, lithium and iron, and lithium and tin also have been synthesized. Additionally, surface functionalization can be accomplished using EWGs that are weaker than halogens and $SO_4$ yet still produce acidic but not superacidic surfaces. For example, the method also has been used to synthesize AMOs surface-functionalized with acetate ($CH_3COO$), oxalate ($C_2O_4$), and citrate ($C_6H_5O_7$). A variety of Examples are described below.

Figure 7:
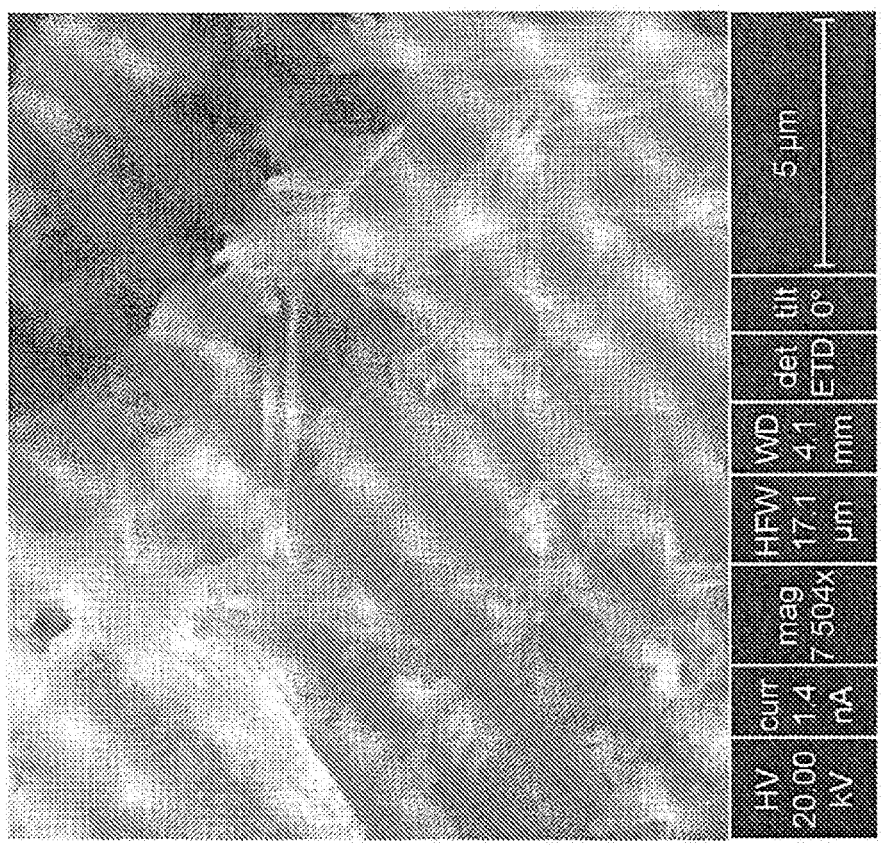
FIG. 7 provides electron micrograph images showing differences in morphology between AMO nanoparticles synthesized under identical conditions except for the use of a different group for functionalization.
Figure 7:
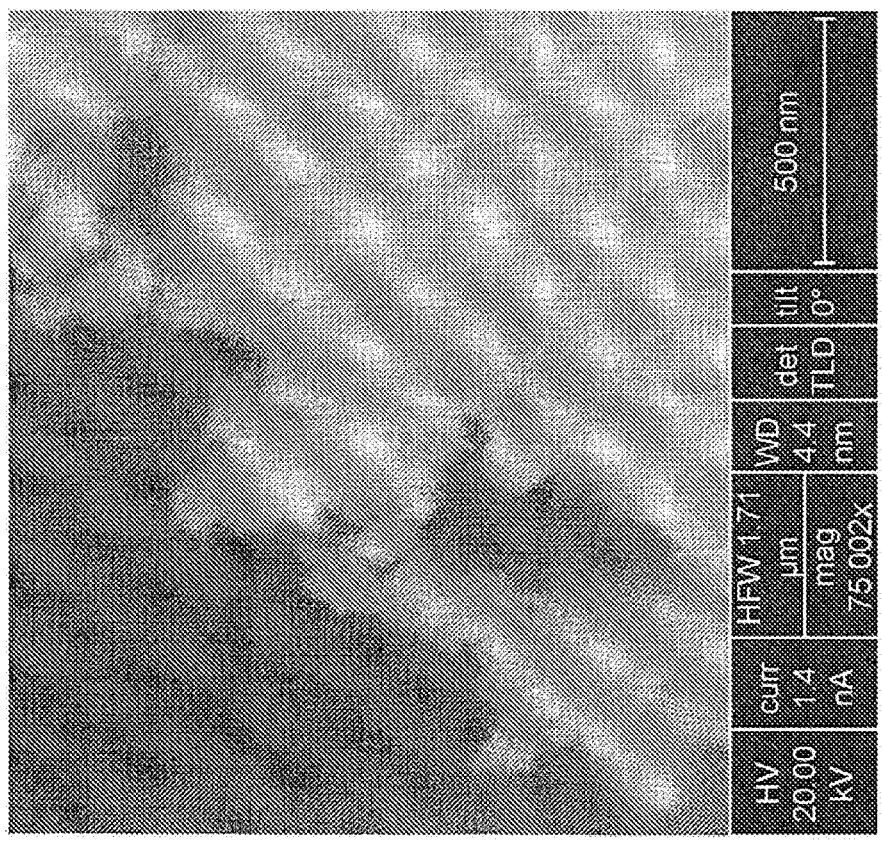

Third, there is a synergistic relationship between the EWG and other properties of the nanoparticles such as size, morphology (e.g., plate-like, spherical-like, needle- or rod-like), oxidation state, and crystallinity (amorphous, crystalline, or a mixture thereof). For example, differences in morphology can occur between AMO nanoparticles synthesized under identical conditions except for the use of a different EWG for surface functionalization (see FIG. 7). The surface functionalization may act to "pin" the dimensions of the nanoparticles, stopping their growth. This pinning may occur on only one dimension of the nanoparticle, or in more than one dimension, depending upon exact synthesis conditions.

Figure 8:
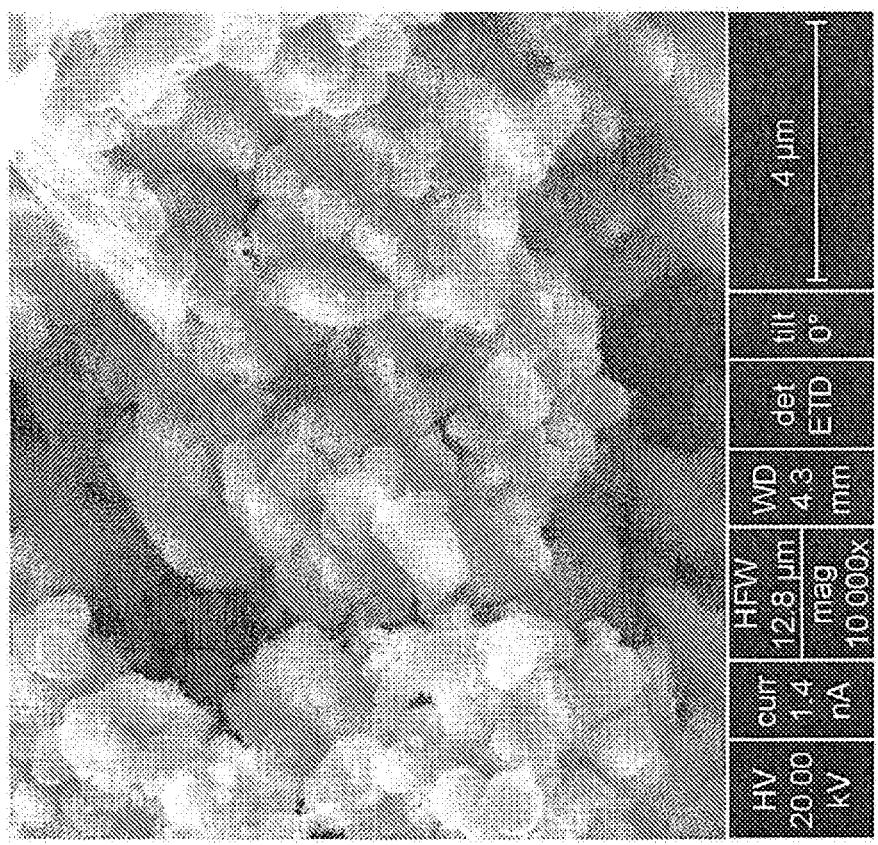
FIG. 8 shows the difference in morphology and performance of AMO nanoparticles synthesized under identical conditions except for having two different total reaction times.
Figure 8:
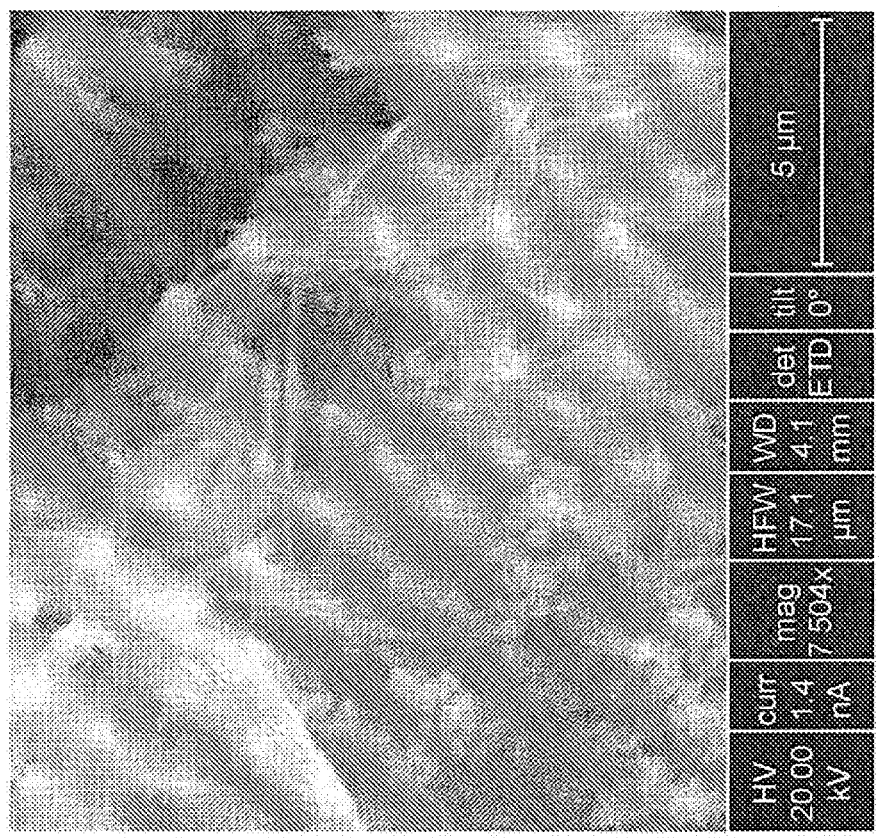
Figure 9:
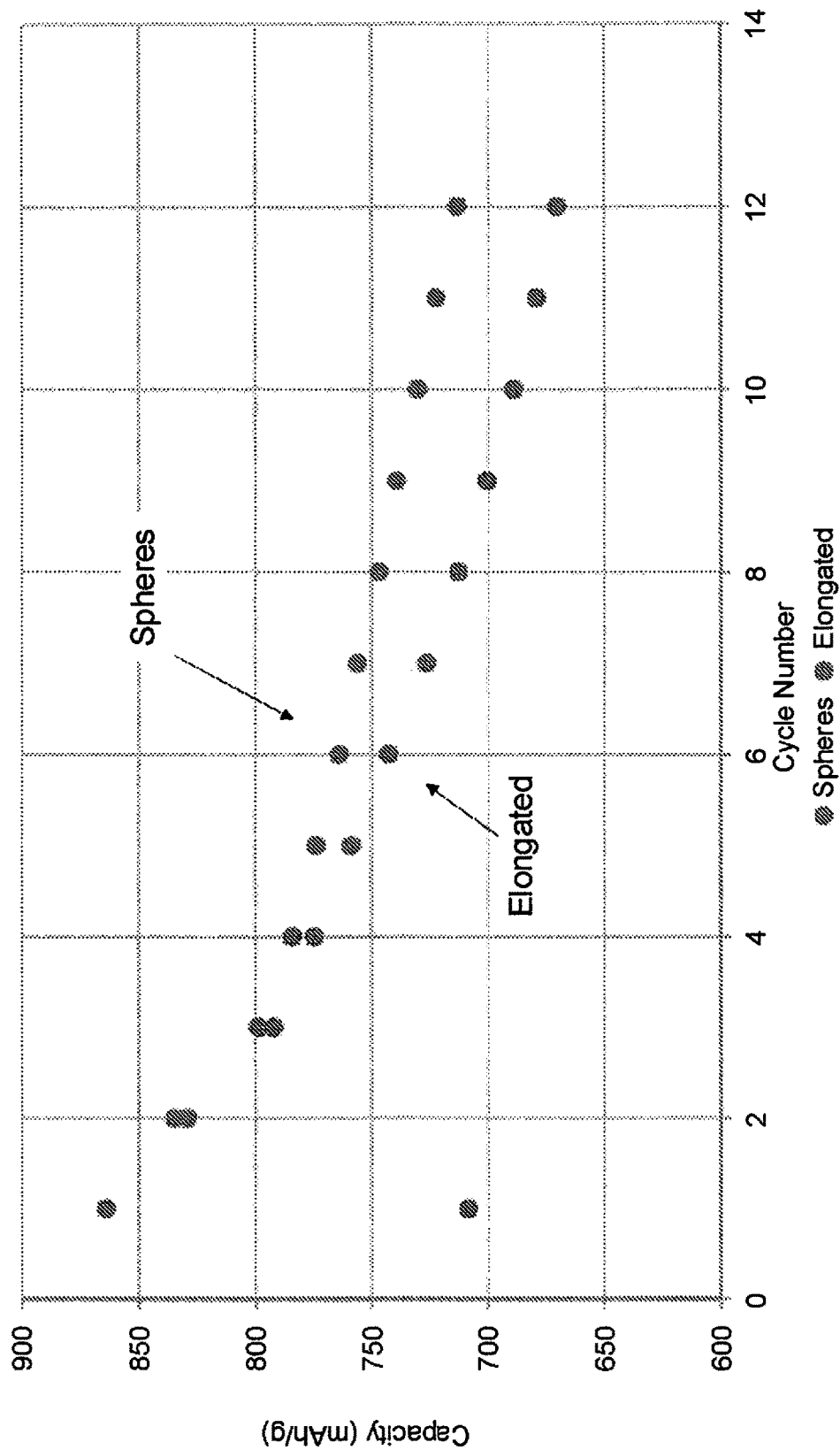
FIG. 9 provides representative half-cell data showing differences in behavior between spherical and elongated (needle-like or rod-like) AMOs upon cycling against lithium.

Fourth, the character of the AMO is very sensitive to synthesis conditions and procedures. For example, differences in morphology and performance of the AMO's nanoparticles can occur when synthesized under identical conditions except for having two different total reaction times (see FIGS. 8 & 9). Experimental design methodologies can be used to decide the best or optimal synthesis conditions and procedures to produce a desired characteristic or set of characteristics.

Fifth, both the anion present in the precursor salt and the anion present in the acid contribute to the surface functionalization of the AMO. In one preferred embodiment, tin chloride precursors and hydrochloric acid are used in a synthesis of an AMO of tin. The performance of these particles differ from an embodiment in which tin chloride precursors and sulfuric acid are used, or from an embodiment in which tin sulfate precursors and hydrochloric acid are used. Therefore, matching the precursor anion and acid anion is preferred in some embodiments.

Sixth, when utilizing a precursor with a weak EWG and an acid with a strong EWG, or vice versa, the strongly withdrawing anion will dominate the surface functionalization. This opens up a broader range of synthesis possibilities, allowing functionalization with ions that are not readily available in both precursor salts and acids. It may also permit mixed functionalization with both strong and weak EWGs. In one example, a tin acetate precursor and phosphoric acid are used to synthesize an AMO of tin. X-ray photoelectron spectroscopy analysis of the surface shows a greater atomic concentration of phosphorous than of the bonds associated with acetate groups (see FIG. 10).

Figure 11A:
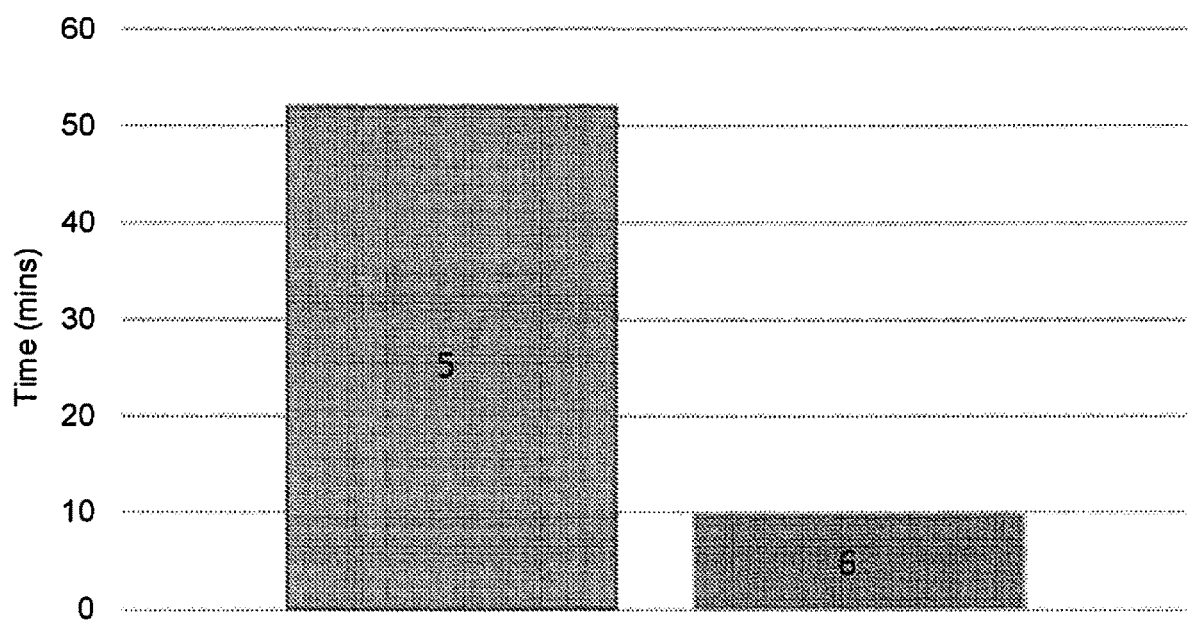
FIG. 11A provides data showing visible light activity degradation data for different AMOs.
Figure 11B:
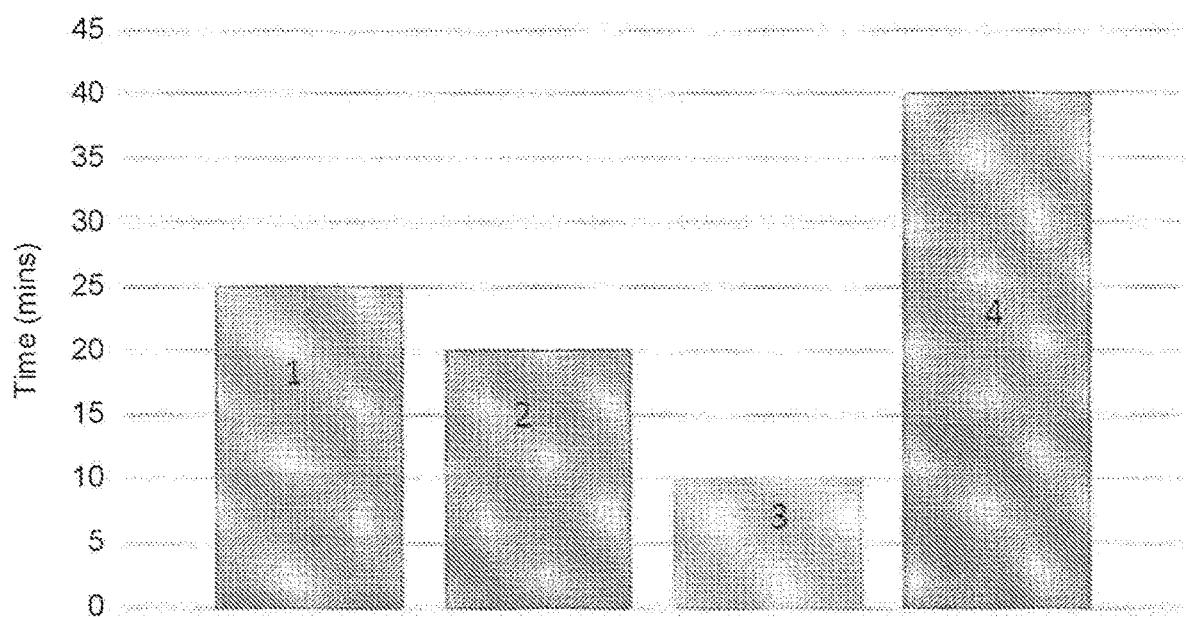
FIG. 11B provides data showing ultraviolet light activity degradation data for different AMOs.

Seventh, and last, while the disclosed method is a general procedure for synthesis of AMOs, the synthesis procedures and conditions may be adjusted to yield sizes, morphologies, oxidation states, and crystalline states as are deemed to be desirable for different applications. As one example, catalytic applications might desire an AMO material which is more active in visible light (see FIG. 11A) or one which is more active in ultraviolet light (see FIG. 11B).

Figure 12:
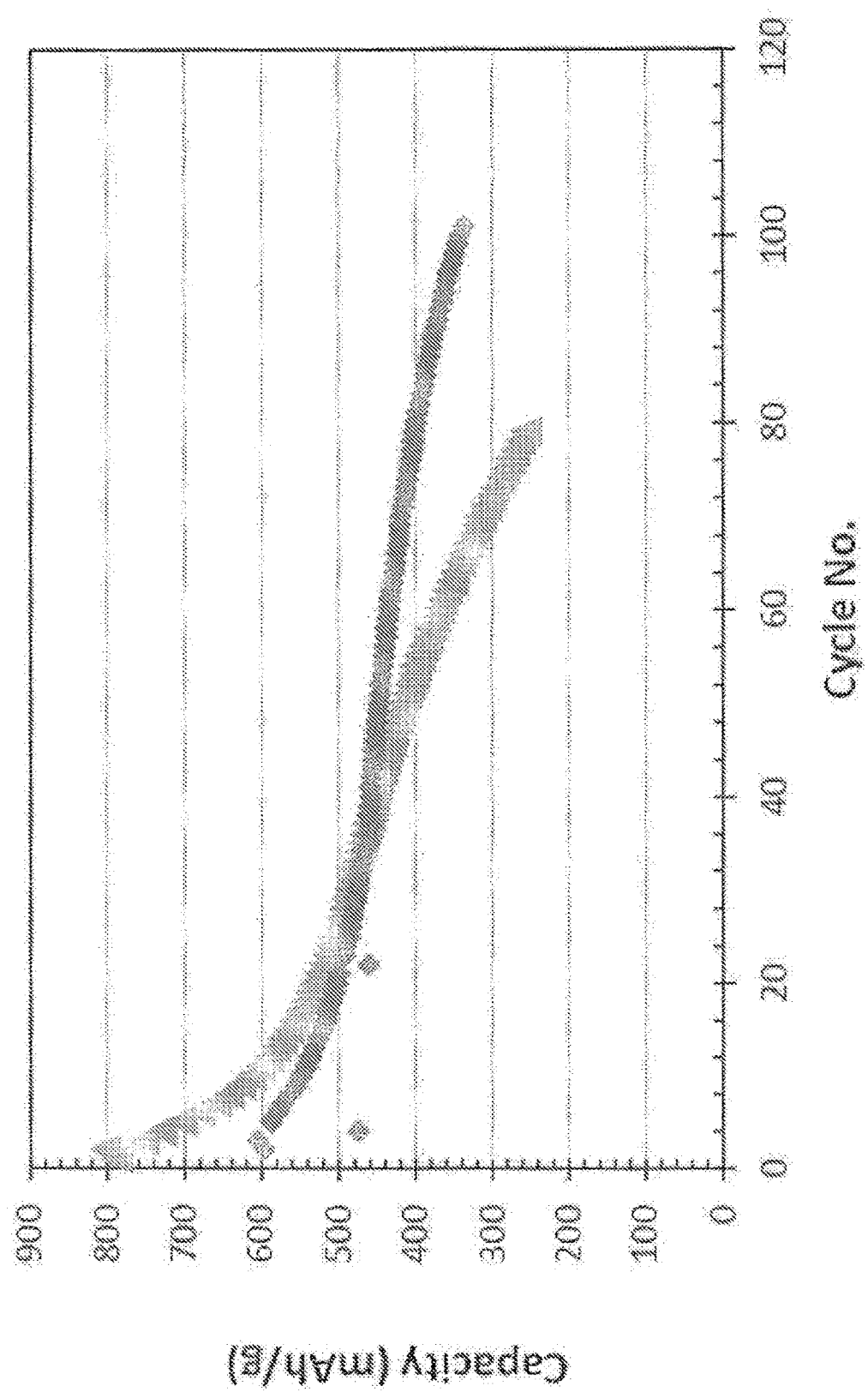
FIG. 12 is a graph comparing two AMOs, one having higher capacity for use in a primary (single use) battery application and the other having higher cyclabilty for use in a secondary (rechargeable) battery application.

In another example, the AMO material may be used as a battery electrode. A primary (single-use) battery application might desire an AMO with characteristics that lead to the highest capacity, while a secondary (rechargeable) battery application might desire the same AMO but with characteristics that lead to the highest cyclability. FIG. 12 compares the cyclability of two different batteries constructed from AMO materials, including a chlorine containing AMO and a sulfur containing AMO. The AMO material can result in enhanced battery performance, without deterioration of battery components or gas generation. This is exactly opposite what the prior art teaches.

Figure 13:
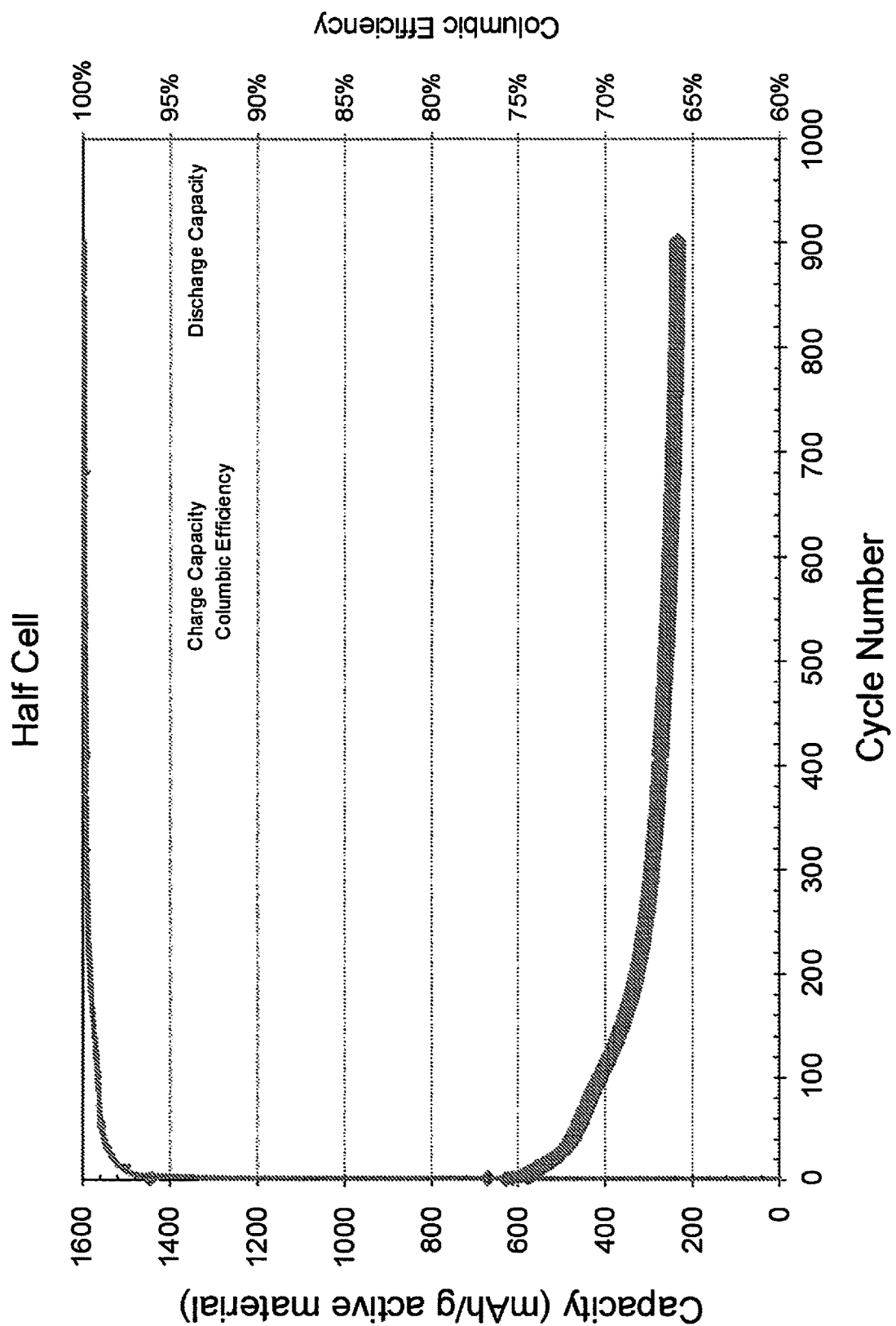
FIG. 13 provides charge and discharge capacity data and Columbic efficiency data, illustrating that AMOs can result in enhanced battery performance, without deterioration of battery components or gas generation.

In FIG. 13, the charge-discharge cyclability of a battery constructed as a half-cell of an AMO nanomaterial electrode versus lithium metal is shown, showing cyclability for up to 900 charge-discharge cycles, while still maintaining useful capacity and exceptional columbic efficiency. Such long cyclability is exceptional, particularly against the lithium metal reference electrode, as lithium metal is known to grow dendrites during even low cycle numbers, which can enlarge and result in dangerous and catastrophic failure of a battery cell.

According to the present disclosure, in a complete cell, the anode 106 comprising the disclosed AMO may be utilized with a known electrolyte 108 and a cathode 104 comprising known materials such as lithium cobalt oxide (LiCoO2). The material comprising the separator 110 may likewise be drawn from those currently known in the art.

In a complete cell, the cathode 104 comprising the disclosed AMO may be utilized with a known electrolyte 108 and an anode 106 comprising known materials such as carbon on copper foil, which display less electronegativity than AMO's of the present disclosure. The material comprising the separator 110 and electrolyte 108 may likewise be drawn from those currently known in the art as discussed above.

Various layering and other enhancement techniques may be deployed to maximize capacity for holding lithium ions for powering the cell 100. It should also be understood that a battery based on an AMO cathode 104 according to the present disclosure can be deployed as a secondary (e.g., rechargeable) battery but can also serve as a primary battery. Although the AMO anodes of the present disclosure lend themselves to a reversible battery chemistry, a cell or battery constructed as described herein, may be satisfactorily deployed as a primary cell or battery. Cells and batteries constructed according to the present disclosure, in some embodiments, do not require initial formation and therefore are ready to use as primary cells or batteries. In other cases, limited or rapid formation may be employed. Moreover, by deploying the cells and batteries of the present disclosure as primary cells that are not intended to be recharged, some of the safety issues that may be inherent with lithium battery chemistry are mitigated, as it is known in the art that the safety issues more frequently arise during battery cycling.

In other embodiments according to the present disclosure, the cathode 104 comprises tin oxide ($SnO_2$) but it has not been acidified in accordance with the AMO's described above. Known electrolytes 108, anodes 106, and separators 110, or those otherwise described in this disclosure may be utilized with such embodiments.

It will be appreciated that other battery constructions are possible using the AMO material. For example, a battery may comprise a first electrode comprising an AMO nanomaterial, a second electrode, and an electrolyte positioned between the first electrode and the second electrode. As an example in a lithium ion battery, the first electrode may operate as a cathode or an anode. For example, in operation as a cathode, the second electrode may correspond to lithium metal, graphite, or another anodic material. As another example, in operation as an anode, the second electrode may correspond to a LiCoO2, LiMn2O4, LiNiO2, or another cathodic material. Useful materials for the second electrode include, but are not limited to, graphite, lithium metal, sodium metal, lithium cobalt oxide, lithium titanate, lithium manganese oxide, lithium nickel manganese cobalt oxide (NMC), lithium iron phosphate, lithium nickel cobalt aluminum oxide (NCA), or any combination of these.

The AMO materials of the present disclosure may optionally be used with an acidic component, such as a binder, an acidic electrolyte, or an acidic electrolyte additive. This may be in the context of an anode, cathode, half-cell, complete cell, integrated battery, or other components. The inventors have surprisingly found that including acidic components and/or acidic species, such as organic acids or organic acid anhydrides, in a battery comprising an AMO material results in an increase in the capacity of versus batteries where the acidic species are not included. Again, the prior art teaches against use of acidic species, as these species may degrade metal current collectors and housings and cause deterioration in other electrode components.

Figure 14:
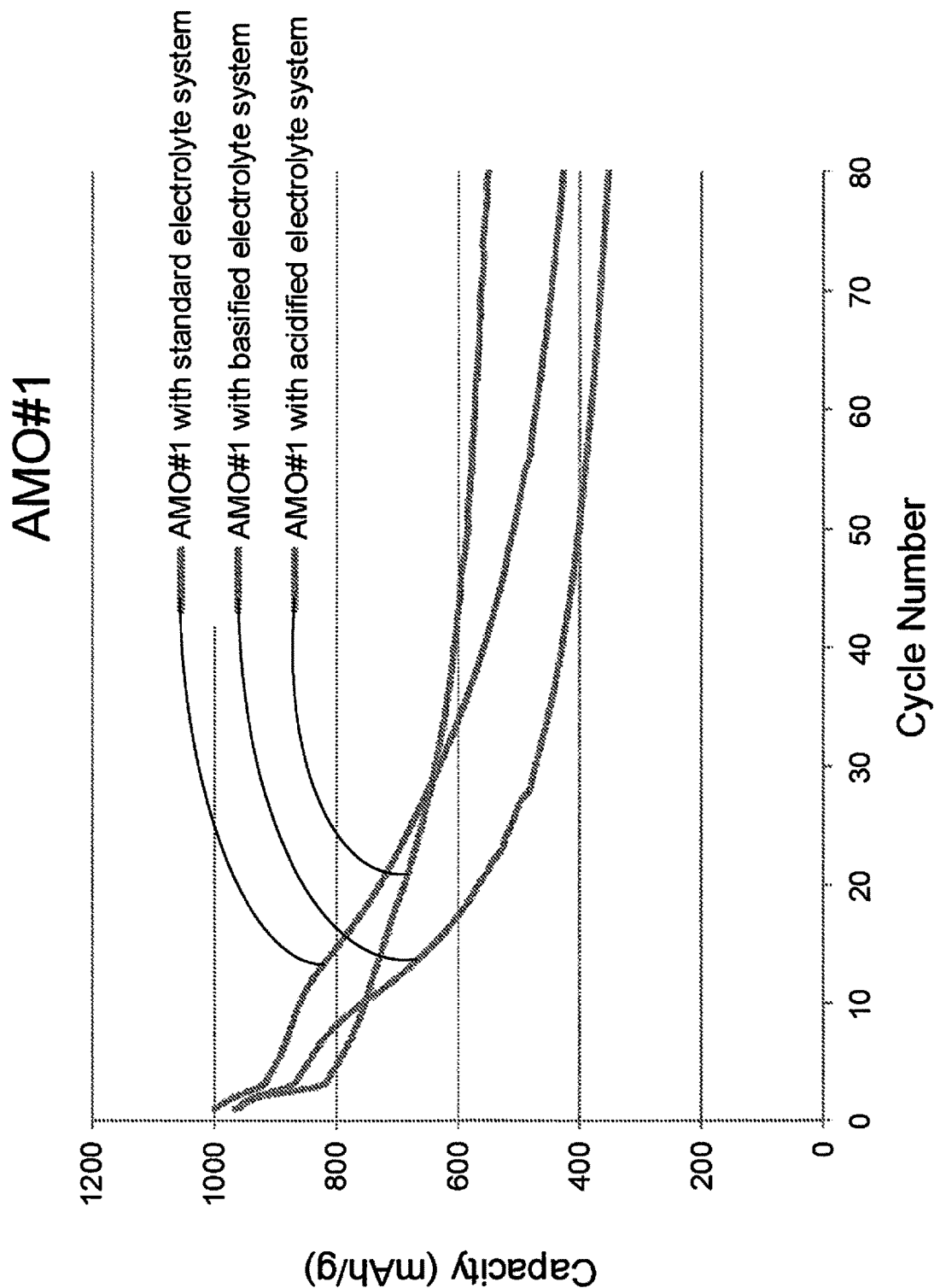
FIG. 14 shows capacity and cycling data for an AMO in standard, acidified, and basified electrolyte systems.

As shown in FIG. 14, which provides comparative cyclability data for AMO-based batteries formed of the same materials and structure except for one having a standard electrolyte, one having a basified electrolyte, and one having an acidified electrolyte. The batteries included a construction as follows: all cathodes included the same AMO material; all anodes were lithium metal; the standard electrolyte was a 1:1:1 mix of dimethylene carbonate, diethylene carbonate, and ethylene carbonate with 1 M LiPF6; the acidified electrolyte was the standard electrolyte with 3 wt. % succinic anhydride; the basified electrolyte was the standard electrolyte with 3 wt. % dimethylacetamide. All batteries were cycled at the same discharge rate. As illustrated, the battery with the acidified electrolyte system exhibits the best cycling ability, maintaining the highest capacity over the largest number of cycles.

Figure 15:
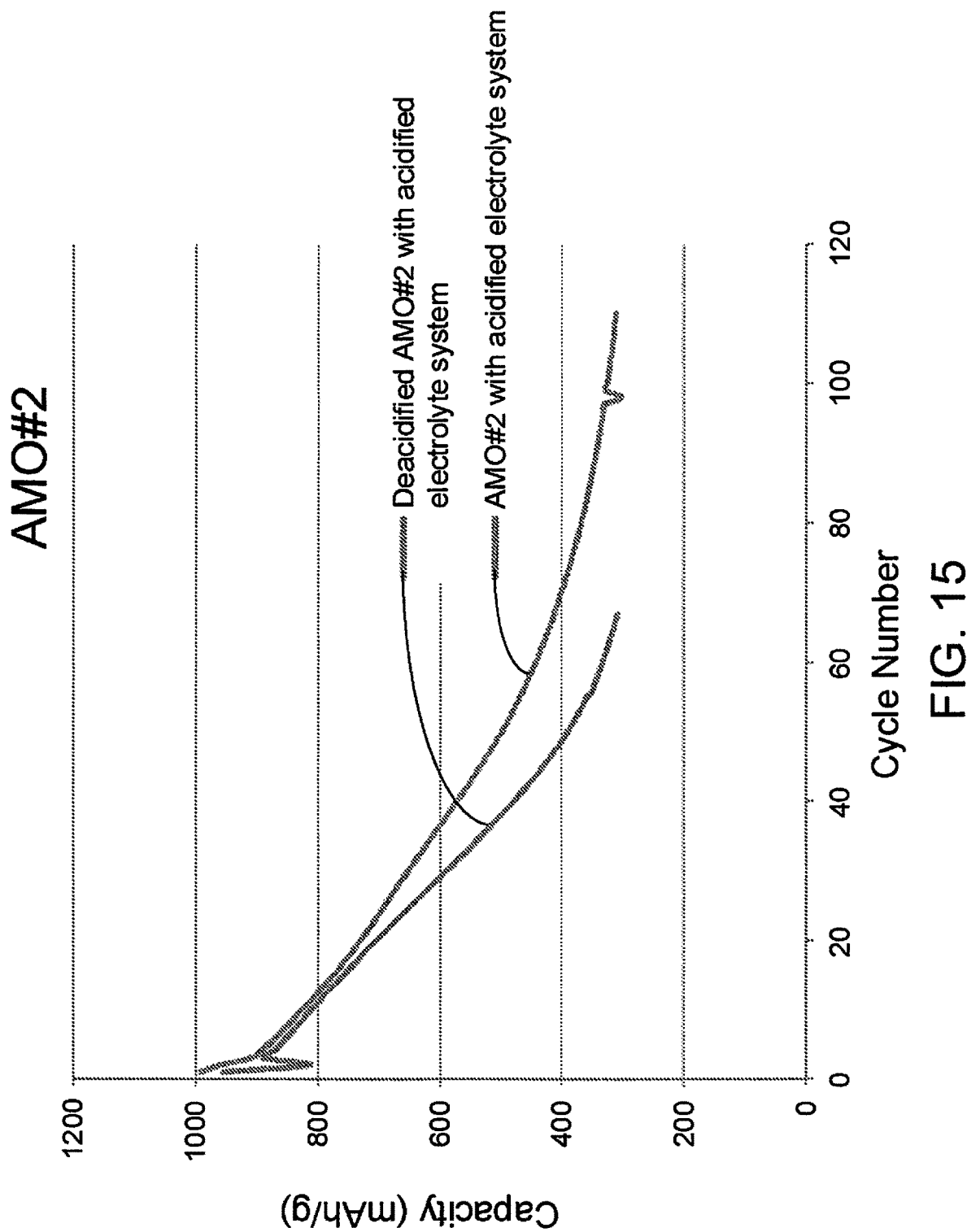
FIG. 15 shows capacity and cycling data for an AMO, and for the same AMO from which the acidification was removed by solvent washing.

FIG. 15 provides additional comparative cyclability data for two different batteries with the same battery construction including an acidified electrolyte, except that the AMO material of one battery is deacidified by washing with a solvent. The batteries included a construction as follows: the cathodes included the AMO material; the electrolyte was a 1:1:1 mix of dimethylene carbonate, diethylene carbonate, and ethylene carbonate with 1 M LiPF6 and 3 wt. % succinic anhydride; the anodes were lithium metal. The batteries were cycled at the same discharge rate. The battery having the acidified AMO material exhibits higher capacity retention vs. cycle number, indicating that the acidified surface of the AMO may interact with the acidified electrolyte, providing enhanced performance.

Several acidic electrolytes have been developed and/or tested and been found to operate advantageously with the cell chemistry described herein.

Example 1: AMO of Tin Oxide Functionalized by Acetate/Chloride

Figure 16:
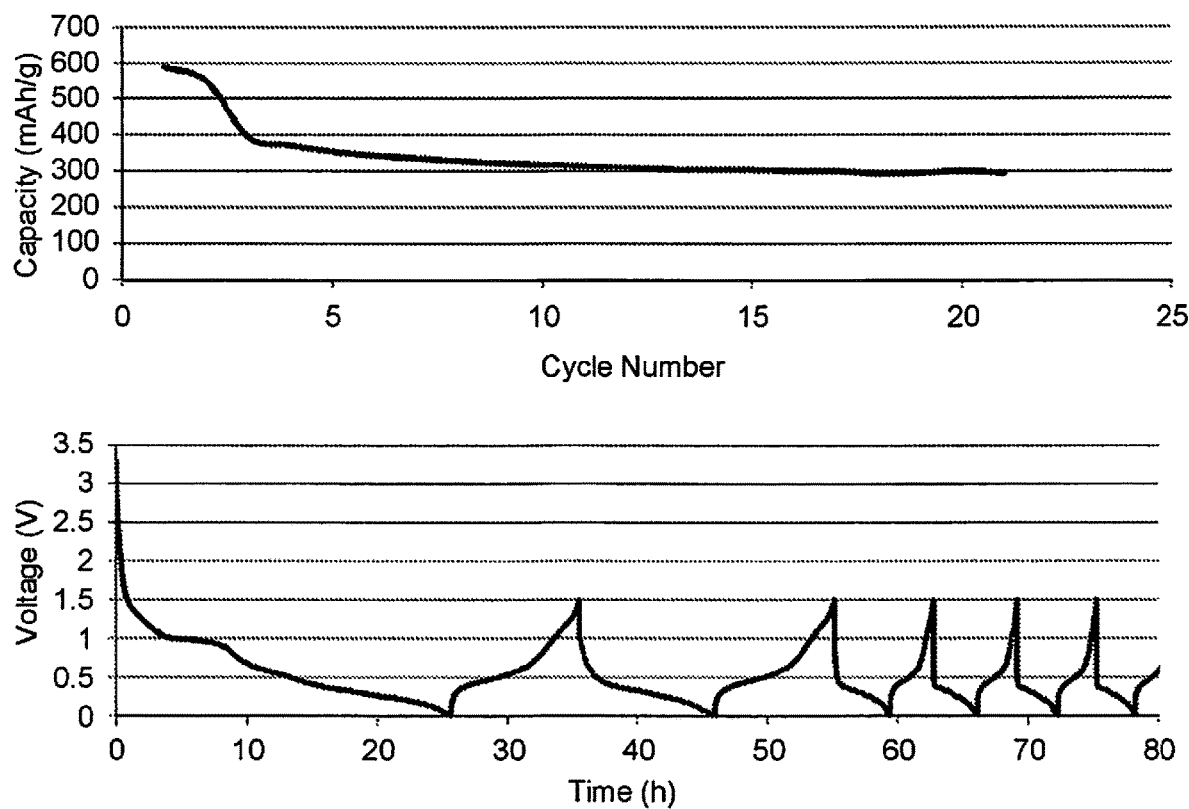
FIG. 16 provides data including a plot of measured capacity versus cycle number as well as a plot of the voltage as a function of time during cycling for a battery cell including an electrode comprising an AMO material.

A tin oxide AMO was synthesized using a single-pot hydrothermal synthesis method. Briefly, tin acetate (Sn (CH3COO)2) was dissolved in an ethanol/water solution and acidified by addition of hydrochloric acid (HCl). The resultant AMO nanomaterial was a soft, grey material and was formed into an electrode. The electrode was assembled in a battery cell against lithium metal and cycled by discharging to zero volts, followed by charging to 1.5 volts. FIG. 16 depicts a plot of the measured capacity versus cycle number, as well as a plot of the voltage as a function of time during cycling.

Example 2: AMO of Tin Oxide Functionalized by Acetate/Sulfate

Figure 17:
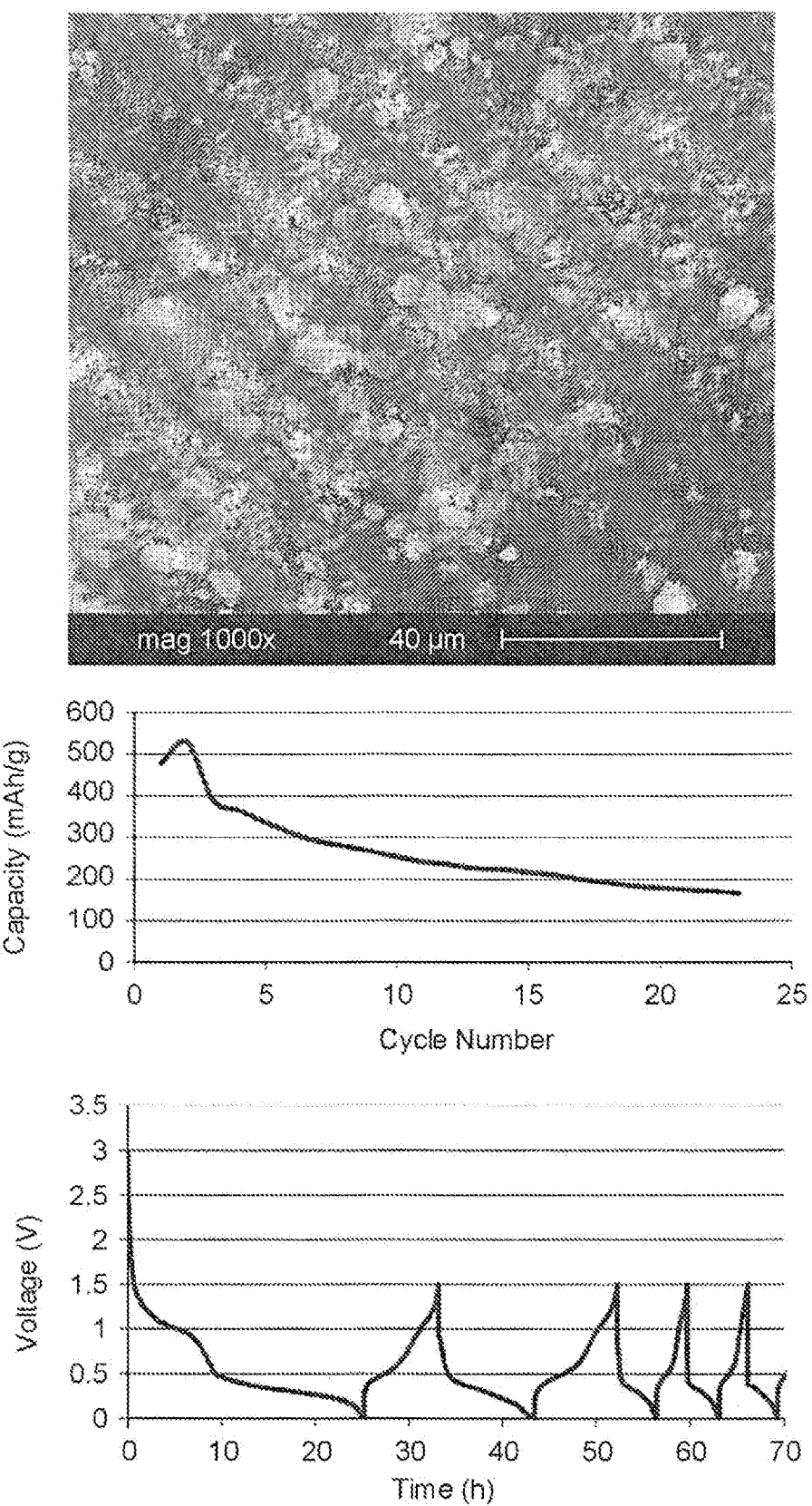
FIG. 17 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn (CH3COO)2) was dissolved in an ethanol/water solution and acidified by addition of sulfuric acid (H2SO4). The resultant AMO nanomaterial was a grey, flaky material and was formed into an electrode. The electrode was assembled in a battery cell against lithium metal and cycled by discharging to zero volts, followed by charging to 1.5 volts. FIG. 17 depicts an electron micrograph image of the AMO nanomaterial, a plot of the measured capacity versus cycle number, as well as a plot of the voltage as a function of time during cycling.

Example 3: AMO of Tin Oxide Functionalized by Acetate/Nitrate

Figure 18:
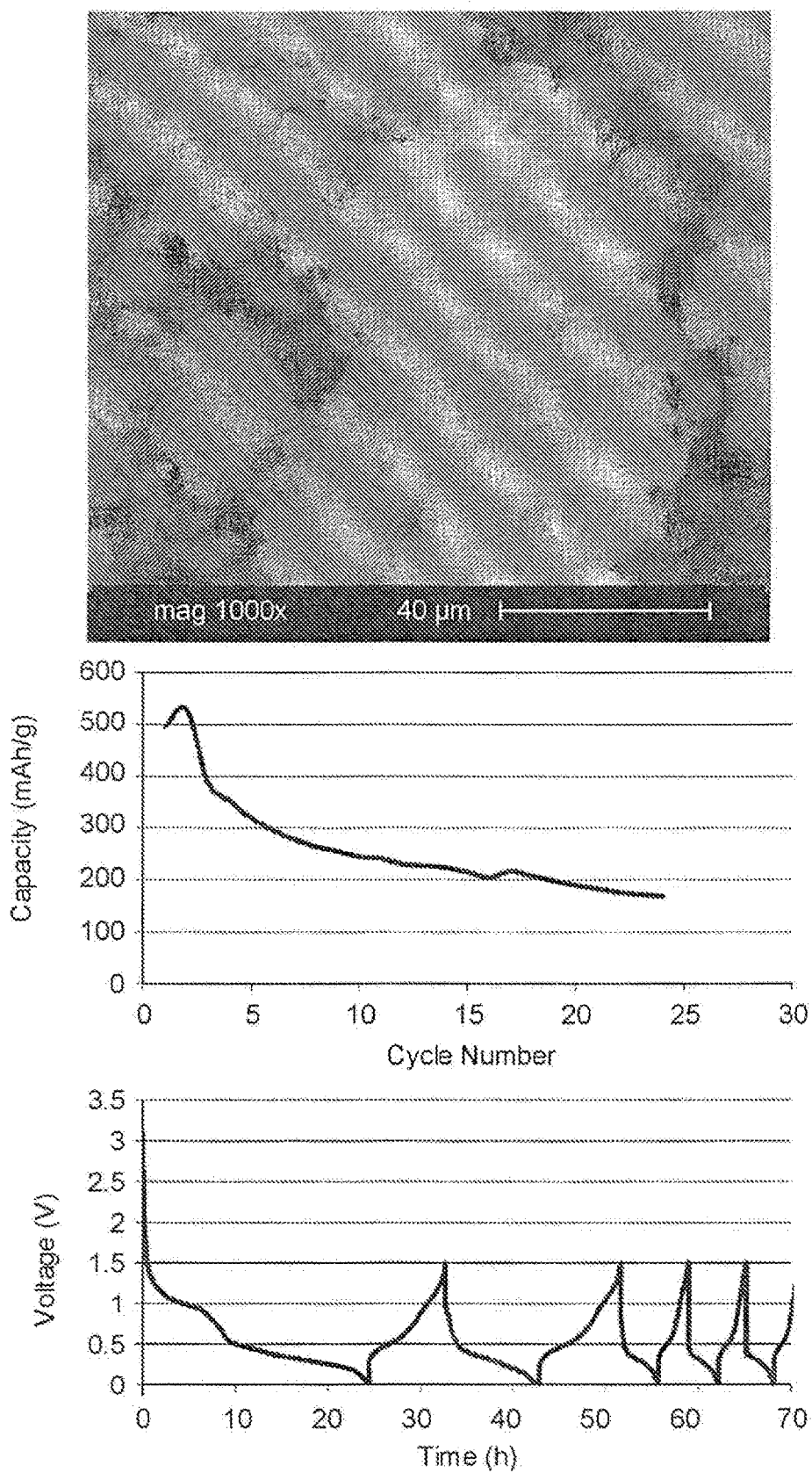
FIG. 18 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn (CH3COO)2) was dissolved in an ethanol/water solution and acidified by addition of nitric acid (HNO3). The resultant AMO nanomaterial was a grey, flaky material and was formed into an electrode. The electrode was assembled in a battery cell against lithium metal and cycled by discharging to zero volts, followed by charging to 1.5 volts. FIG. 18 depicts an electron micrograph image of the AMO nanomaterial, a plot of the measured capacity versus cycle number, as well as a plot of the voltage as a function of time during cycling.

Example 4: AMO of Tin Oxide Functionalized by Acetate/Phosphate

Figure 19:
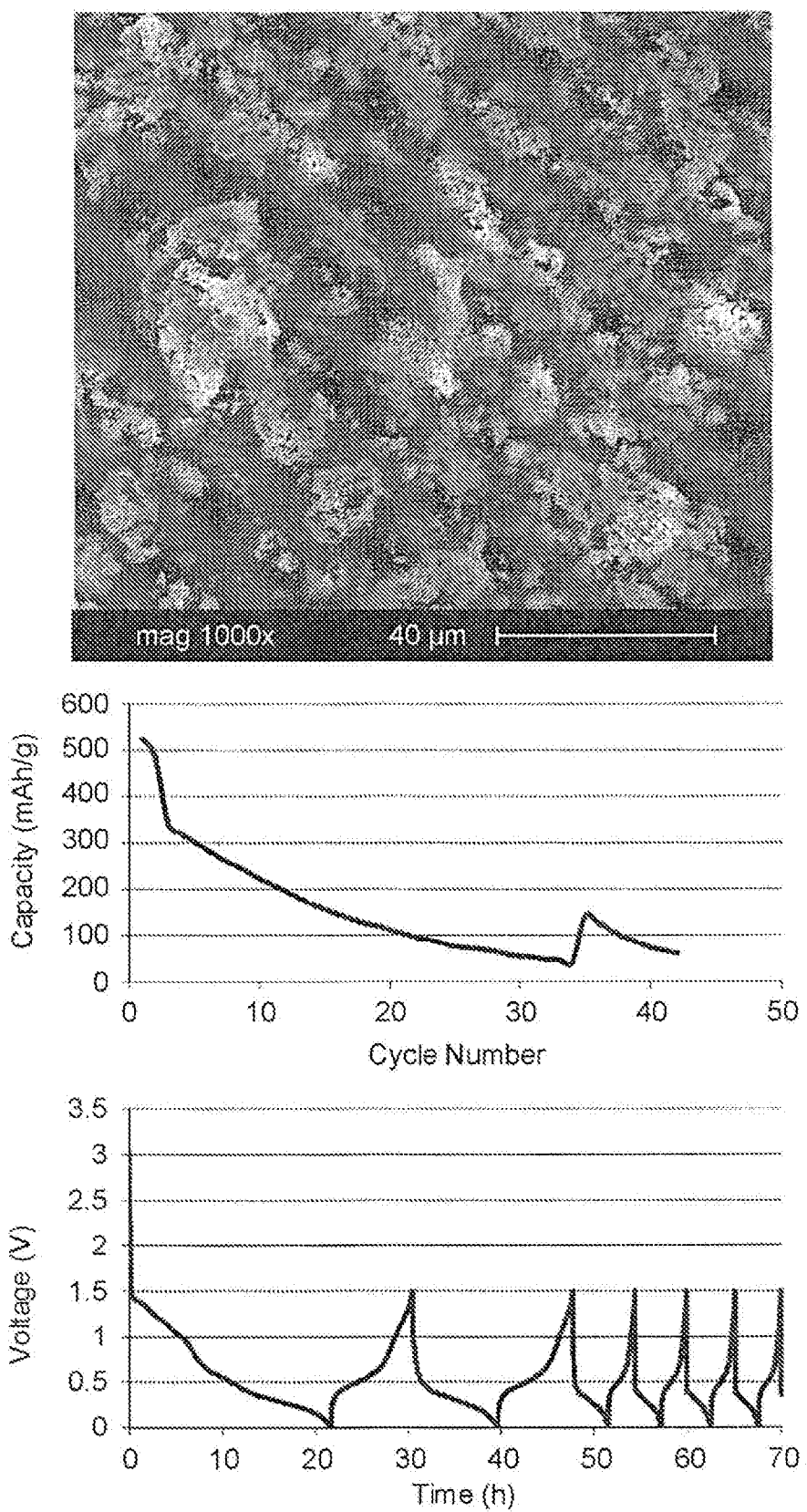
FIG. 19 provides an electron micrograph image of an AMO material and data including a plot of measured capacity versus cycle number as well as a plot of the voltage as a function of time during cycling for a battery cell including an electrode comprising the AMO material.

A tin oxide AMO was synthesized using a single-pot hydrothermal synthesis method. Briefly, tin acetate (Sn (CH3COO)2) was dissolved in an ethanol/water solution and acidified by addition of phosphoric acid (H3PO4). The resultant AMO nanomaterial was a brown, soft, flaky material and was formed into an electrode. The electrode was assembled in a battery cell against lithium metal and cycled by discharging to zero volts, followed by charging to 1.5 volts. FIG. 19 depicts an electron micrograph image of the AMO nanomaterial, a plot of the measured capacity versus cycle number, as well as a plot of the voltage as a function of time during cycling.

Example 5: AMO of Tin Oxide Functionalized by Acetate/Citrate

Figure 20:
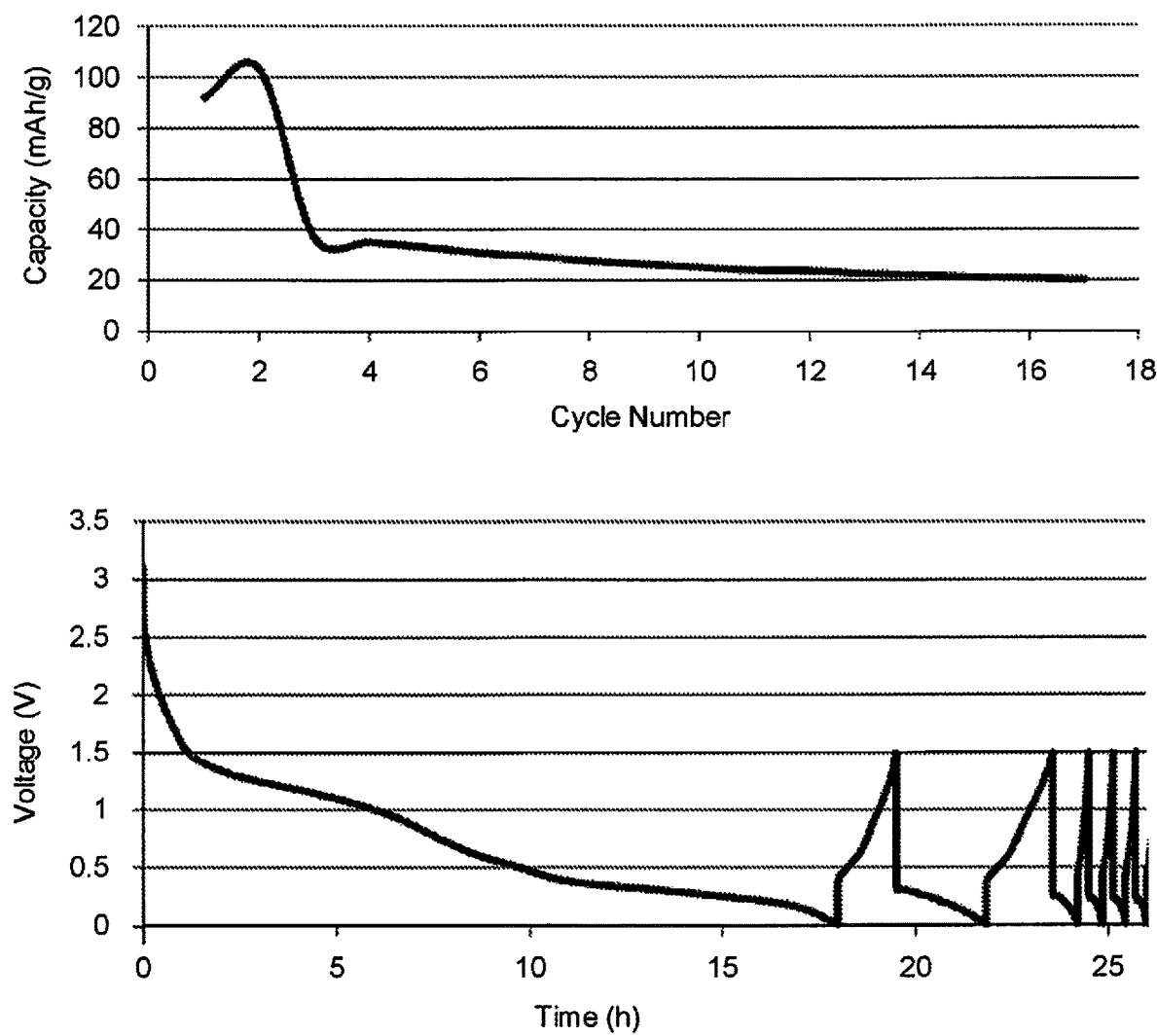
FIG. 20 provides data including a plot of measured capacity versus cycle number as well as a plot of the voltage as a function of time during cycling for a battery cell including an electrode comprising an AMO material.

A tin oxide AMO was synthesized using a single-pot hydrothermal synthesis method. Briefly, tin acetate (Sn (CH3COO)2) was dissolved in an ethanol/water solution and acidified by addition of citric acid (C6H8O7). The resultant AMO nanomaterial was a brown, flaky material and was formed into an electrode. The electrode was assembled in a battery cell against lithium metal and cycled by discharging to zero volts, followed by charging to 1.5 volts. FIG. 20 depicts a plot of the measured capacity versus cycle number, as well as a plot of the voltage as a function of time during cycling.

Example 6: AMO of Tin Oxide Functionalized by Acetate/Citrate

Figure 21:
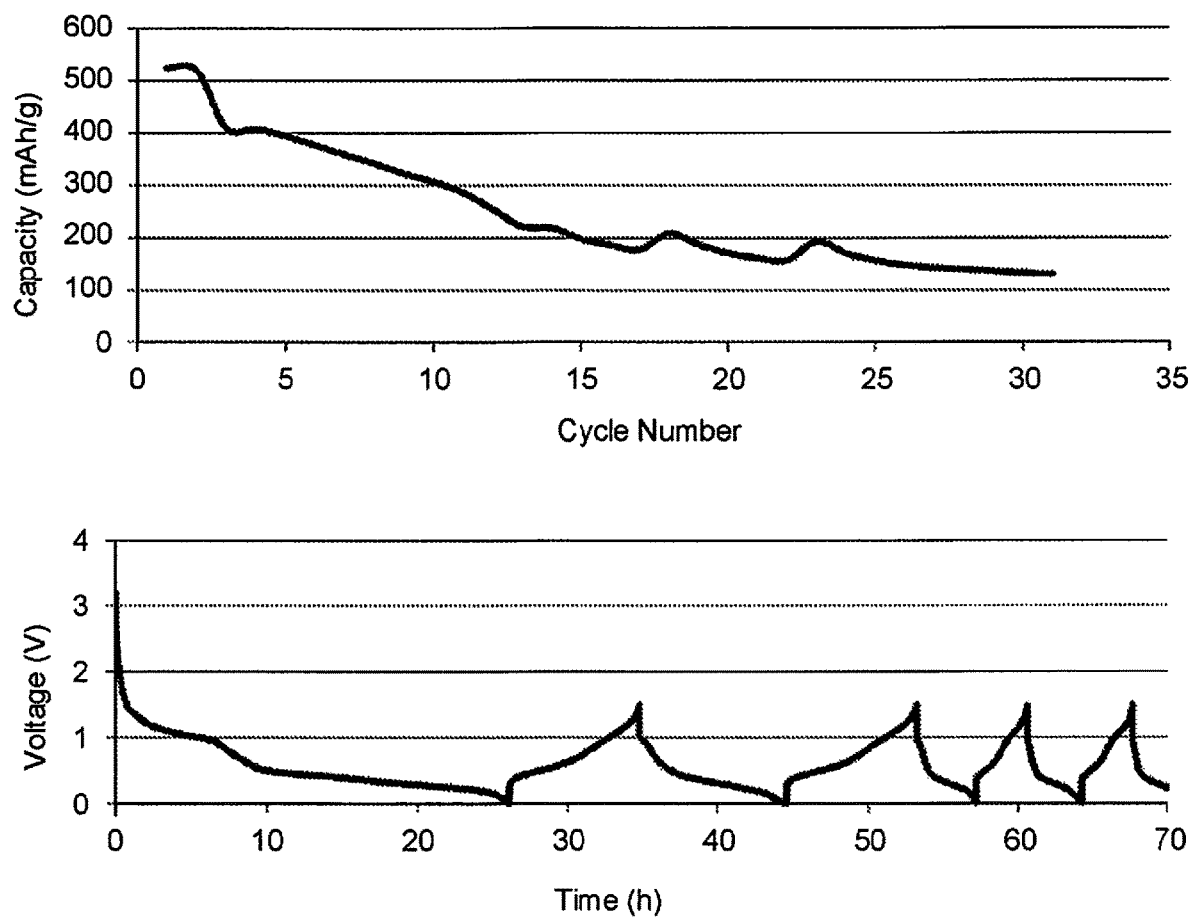
FIG. 21 provides data including a plot of measured capacity versus cycle number as well as a plot of the voltage as a function of time during cycling for a battery cell including an electrode comprising an AMO material.

A tin oxide AMO was synthesized using a single-pot hydrothermal synthesis method. Briefly, tin acetate (Sn (CH3COO)2) was dissolved in an ethanol/water solution and acidified by addition of oxalic acid (C2H2O4). The resultant AMO nanomaterial was a taupe, flaky material and was formed into an electrode. The electrode was assembled in a battery cell against lithium metal and cycled by discharging to zero volts, followed by charging to 1.5 volts. FIG. 21 depicts a plot of the measured capacity versus cycle number, as well as a plot of the voltage as a function of time during cycling.

Figure 22:
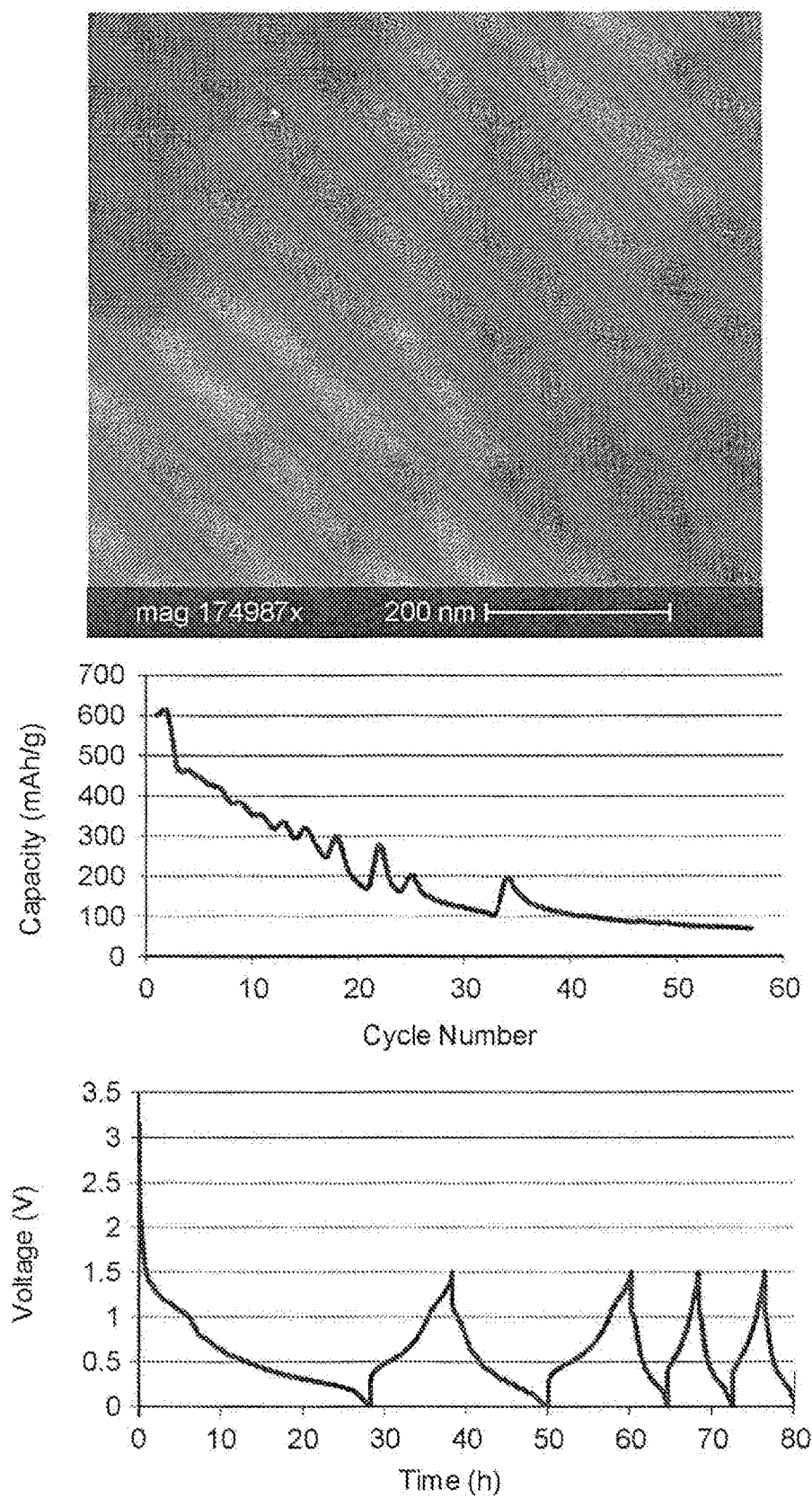
FIG. 22 provides an electron micrograph image of an AMO material and data including a plot of measured capacity versus cycle number as well as a plot of the voltage as a function of time during cycling for a battery cell including an electrode comprising the AMO material.

Example 7: AMO of Tin Oxide Doped with Iron Oxide and Functionalized by Acetate/Chloride A doped tin oxide AMO was synthesized using a single-pot hydrothermal synthesis method. Briefly, tin acetate (Sn (CH3COO)2) was dissolved in an ethanol/water solution with a lesser amount of iron acetate. The solution was acidified by addition of hydrochloric acid (HCl). The resultant AMO nanomaterial was a soft and flaky, creamy grey material and was formed into an electrode. The electrode was assembled in a battery cell against lithium metal and cycled by discharging to zero volts, followed by charging to 1.5 volts. FIG. 22 depicts an electron micrograph image of the AMO nanomaterial, a plot of the measured capacity versus cycle number, as well as a plot of the voltage as a function of time during cycling.

Figure 23:
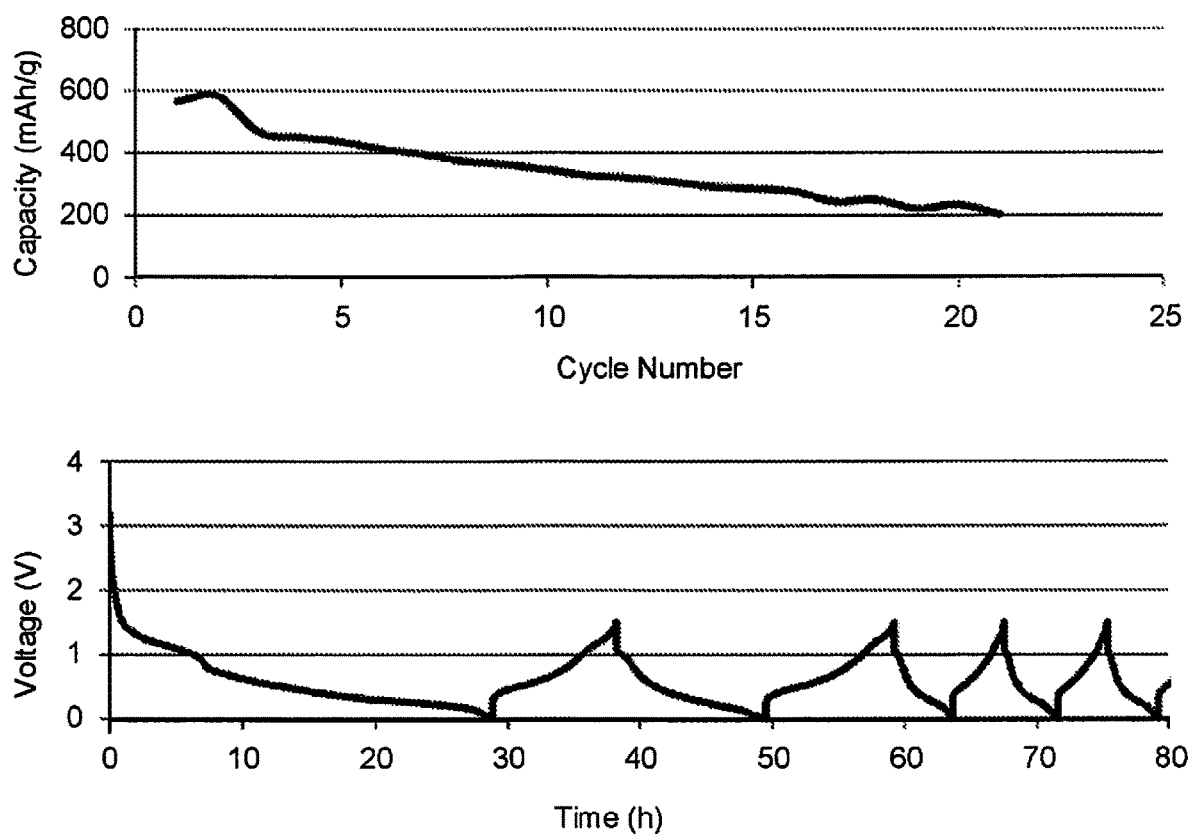
FIG. 23 provides data including a plot of measured capacity versus cycle number as well as a plot of the voltage as a function of time during cycling for a battery cell including an electrode comprising an AMO material.

Example 8: AMO of Tin Oxide Doped with Iron Oxide and Functionalized by Acetate/Sulfate A doped tin oxide AMO was synthesized using a single-pot hydrothermal synthesis method. Briefly, tin acetate (Sn (CH3COO)2) was dissolved in an ethanol/water solution with a lesser amount of iron acetate. The solution was acidified by addition of sulfuric acid (H2SO4). The resultant AMO nanomaterial was a pale, taupe colored, soft, flaky material and was formed into an electrode. The electrode was assembled in a battery cell against lithium metal and cycled by discharging to zero volts, followed by charging to 1.5 volts. FIG. 23 depicts a plot of the measured capacity versus cycle number, as well as a plot of the voltage as a function of time during cycling.

Figure 24:
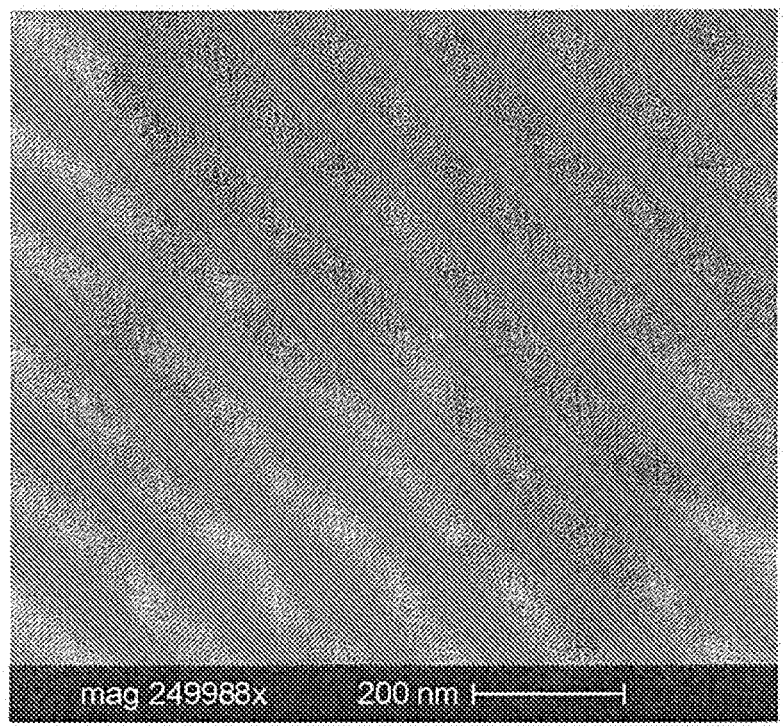
FIG. 24 provides an electron micrograph image of an AMO material and data including a plot of measured capacity versus cycle number as well as a plot of the voltage as a function of time during cycling for a battery cell including an electrode comprising the AMO material.
Figure 24:
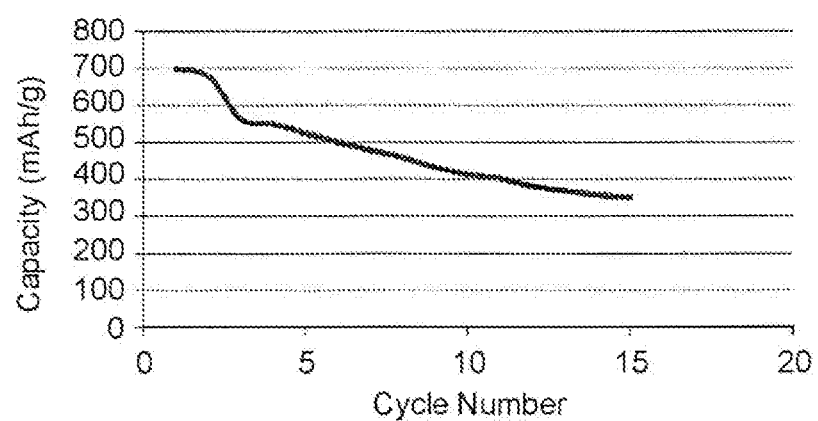
Figure 24:
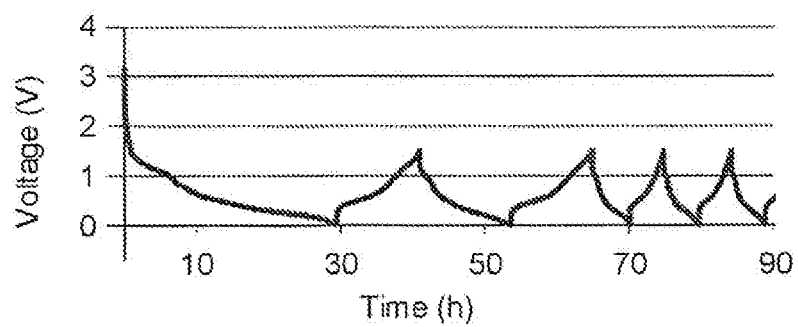

Example 9: AMO of Tin Oxide Doped with Iron Oxide and Functionalized by Acetate/Nitrate Two doped tin oxide AMO samples were synthesized using a single-pot hydrothermal synthesis method. Briefly, tin acetate (Sn(CH3COO)2) was dissolved in an ethanol/water solution with a lesser amount of iron acetate (Fe (CH3COO)3). The solution was acidified by addition of nitric acid (HNO3). The resultant AMO nanomaterial was a soft, white material and was formed into an electrode. The electrode was assembled in a battery cell against lithium metal and cycled by discharging to zero volts, followed by charging to 1.5 volts. FIG. 24 depicts an electron micrograph image of the AMO nanomaterial, a plot of the measured capacity versus cycle number, as well as a plot of the voltage as a function of time during cycling.

Figure 25:
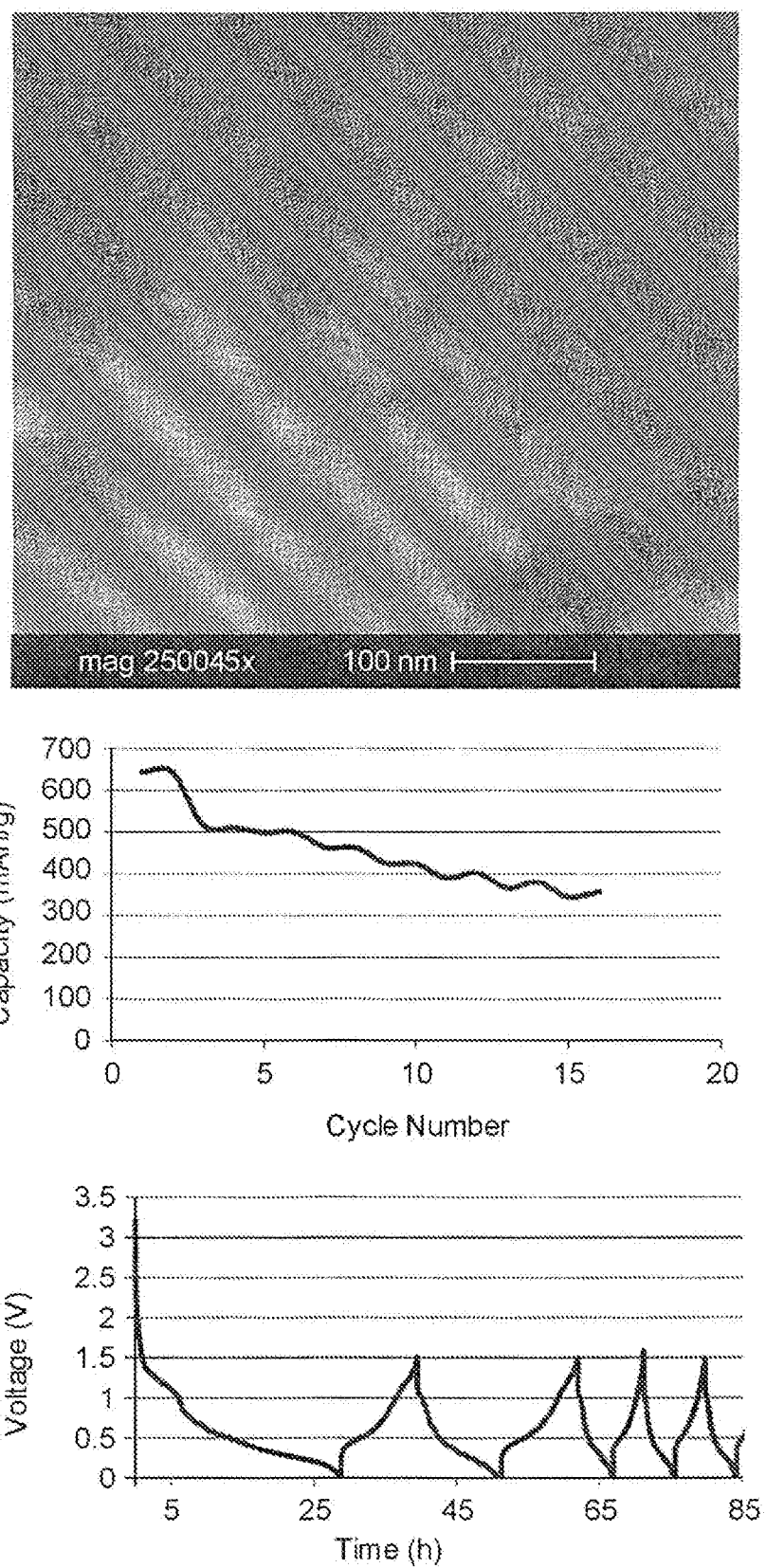
FIG. 25 provides an electron micrograph image of an AMO material and data including a plot of measured capacity versus cycle number as well as a plot of the voltage as a function of time during cycling for a battery cell including an electrode comprising the AMO material.

Example 10: AMO of Tin Oxide Doped with Iron Oxide and Functionalized by Acetate/Oxalate A doped tin oxide AMO was synthesized using a single-pot hydrothermal synthesis method. Briefly, tin acetate (Sn (CH3COO)2) was dissolved in an ethanol/water solution with a lesser amount of iron acetate (Fe(CH3COO)3). The solution was acidified by addition of oxalic acid (C2H2O4). The resultant AMO nanomaterial was a soft, white material and was formed into an electrode. The electrode was assembled in a battery cell against lithium metal and cycled by discharging to zero volts, followed by charging to 1.5 volts. FIG. 25 depicts an electron micrograph image of the AMO nanomaterial, a plot of the measured capacity versus cycle number, as well as a plot of the voltage as a function of time during cycling.

Figure 26:
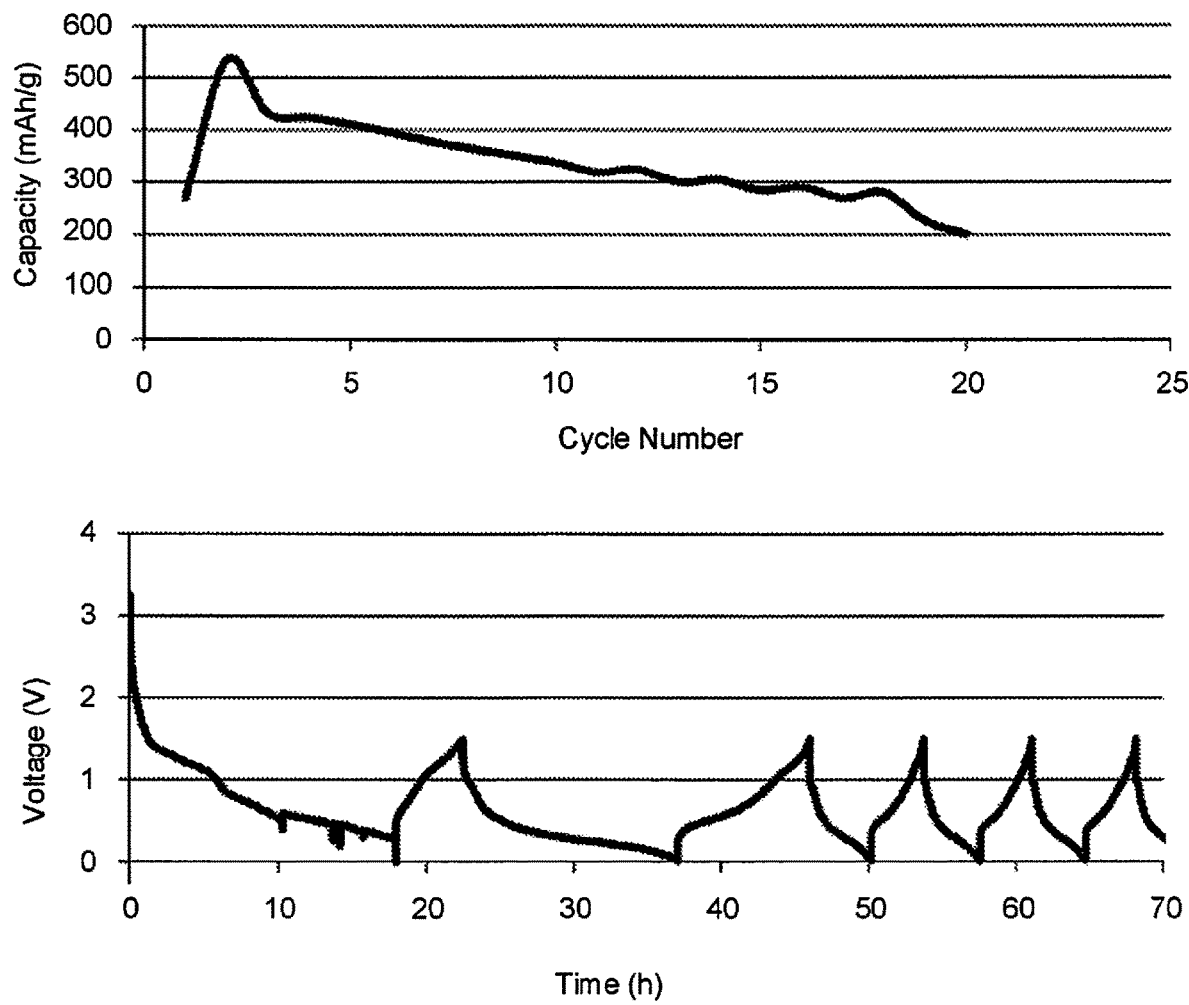
FIG. 26 provides data including a plot of measured capacity versus cycle number as well as a plot of the voltage as a function of time during cycling for a battery cell including an electrode comprising an AMO material.

Example 11: AMO of Tin Oxide Doped with Iron Oxide and Functionalized by Acetate/Phosphate A doped tin oxide AMO was synthesized using a single-pot hydrothermal synthesis method. Briefly, tin acetate (Sn(CH3COO)2) was dissolved in an ethanol/water solution with a lesser amount of iron acetate (Fe(CH3COO)3). The solution was acidified by addition of phosphoric acid (H3SO4). The resultant AMO nanomaterial was a white, flaky material and was formed into an electrode. The electrode was assembled in a battery cell against lithium metal and cycled by discharging to zero volts, followed by charging to 1.5 volts. FIG. 26 depicts a plot of the measured capacity versus cycle number, as well as a plot of the voltage as a function of time during cycling.

Figure 27:
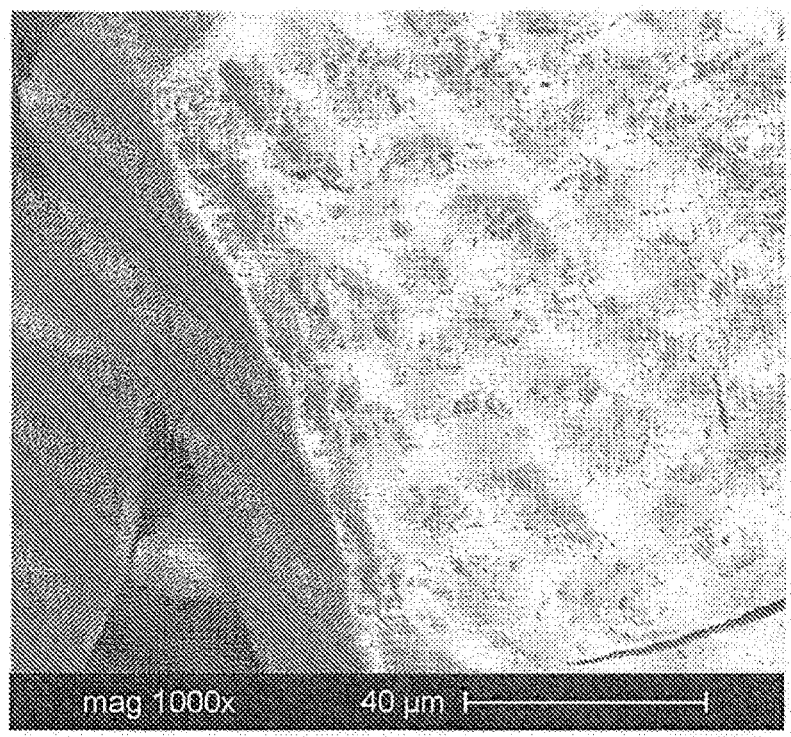
FIG. 27 provides an electron micrograph image of a synthesized material and data including a plot of measured capacity versus cycle number as well as a plot of the voltage as a function of time during cycling for a battery cell including an electrode comprising the synthesized material.
Figure 27:
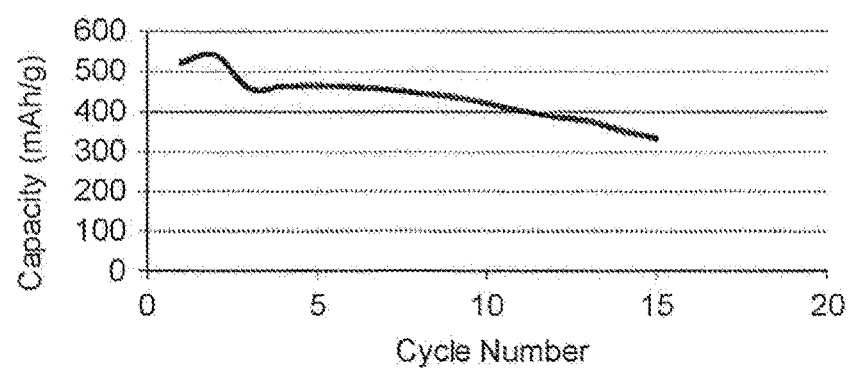
Figure 27:
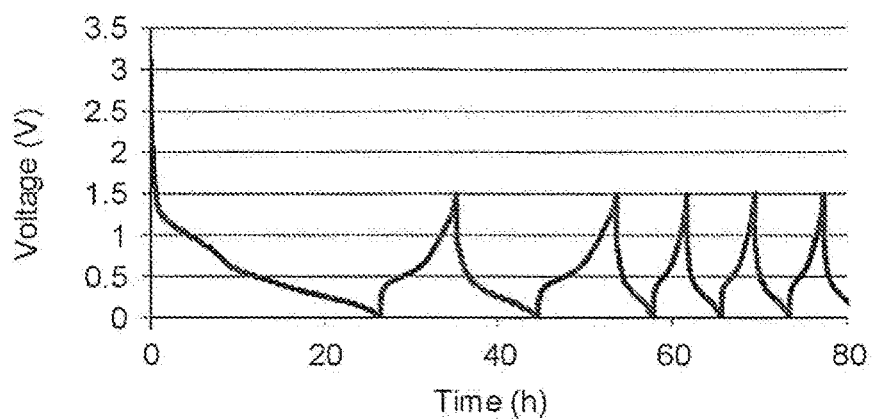

Example 12: Tin Oxide Doped with Iron Oxide and Functionalized by Acetate/Citrate A doped tin oxide was synthesized using a single-pot hydrothermal synthesis method. Briefly, tin acetate (Sn(CH3COO)2) was dissolved in an ethanol/water solution with a lesser amount of iron acetate (Fe(CH3COO)3). The solution was acidified by addition of citric acid (C6H8O7). The resultant material did not form particles, and was a yellow, glassy hard material, which was formed into an electrode. The electrode was assembled in a battery cell against lithium metal and cycled by discharging to zero volts, followed by charging to 1.5 volts. FIG. 27 depicts an electron micrograph image of the AMO nanomaterial, a plot of the measured capacity versus cycle number, as well as a plot of the voltage as a function of time during cycling.

Example 13: AMO of Tin Oxide Functionalized by Acetate/Bromide

Figure 28:
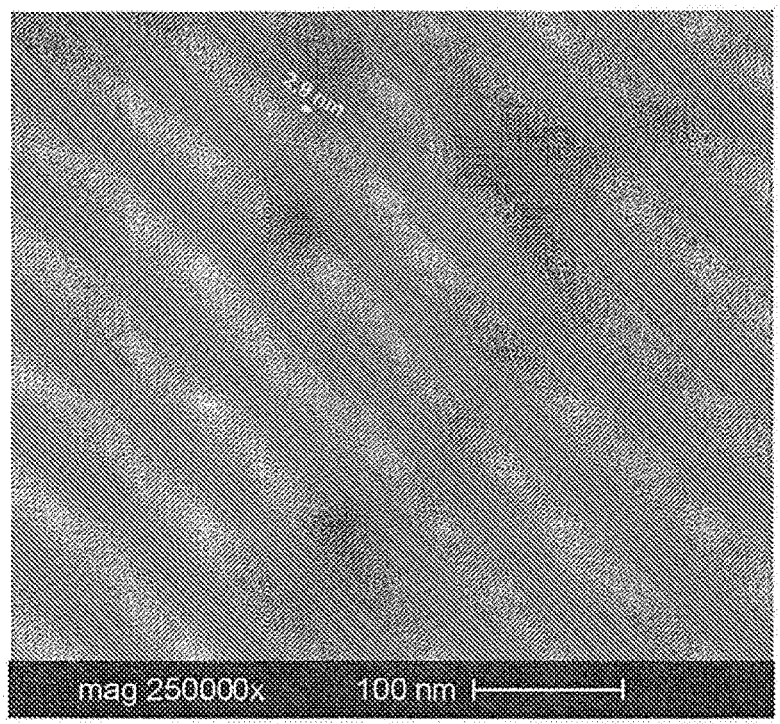
FIG. 28 provides an electron micrograph image of an AMO material and data including a plot of measured capacity versus cycle number as well as a plot of the voltage as a function of time during cycling for a battery cell including an electrode comprising the AMO material.
Figure 28:
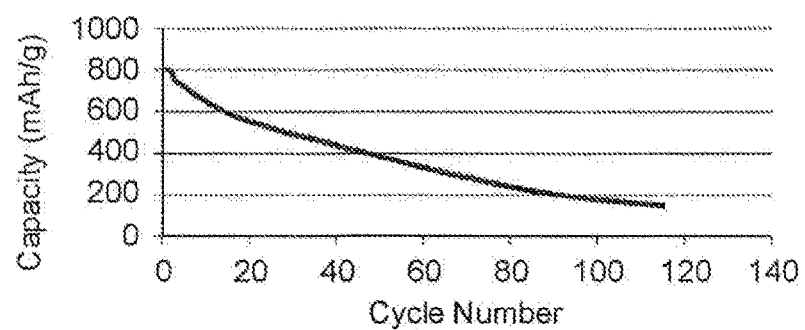
Figure 28:
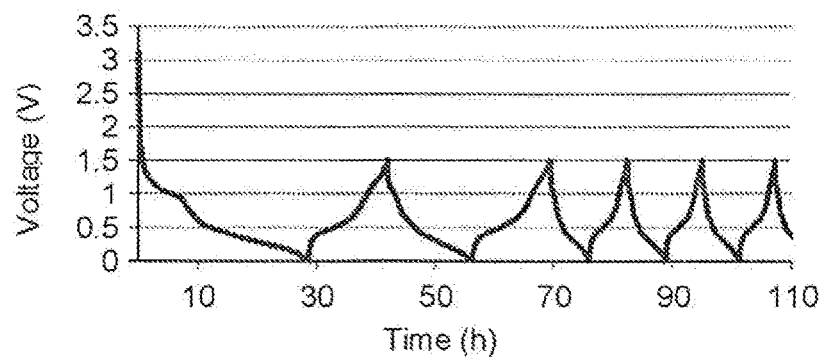

A tin oxide AMO was synthesized using a single-pot hydrothermal synthesis method. Briefly, tin acetate (Sn(CH3COO)2) was dissolved in an ethanol/water solution and acidified by addition of hydrobromic acid (HBr). The resultant AMO nanomaterial was a grey, soft, powdery material and was formed into an electrode. The electrode was assembled in a battery cell against lithium metal and cycled by discharging to zero volts, followed by charging to 1.5 volts. FIG. 28 depicts an electron micrograph image of the AMO nanomaterial, a plot of the measured capacity versus cycle number, as well as a plot of the voltage as a function of time during cycling.

Example 14: AMO of Tin Oxide Functionalized by Acetate/Borate

Figure 29:
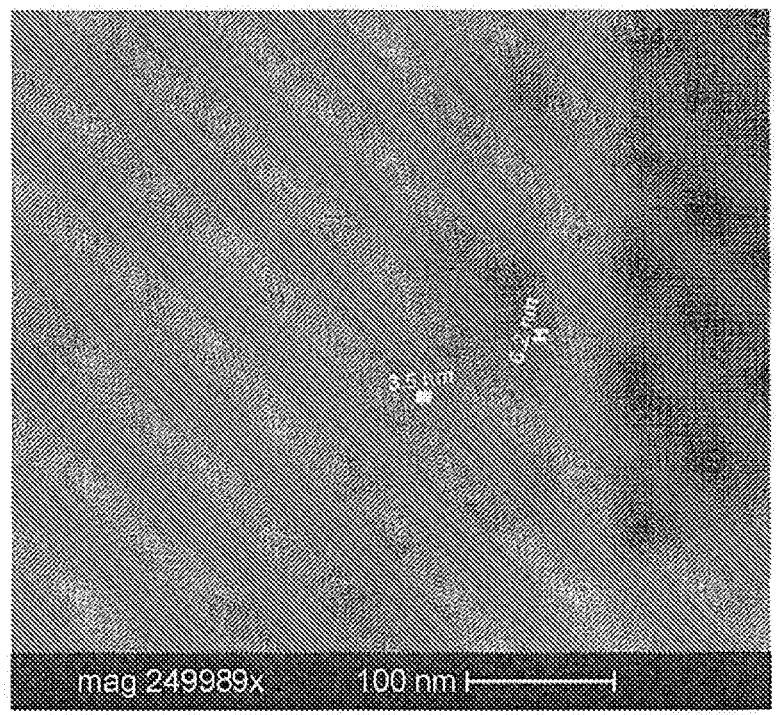
FIG. 29 provides an electron micrograph image of an AMO material and data including a plot of measured capacity versus cycle number as well as a plot of the voltage as a function of time during cycling for a battery cell including an electrode comprising the AMO material.
Figure 29:
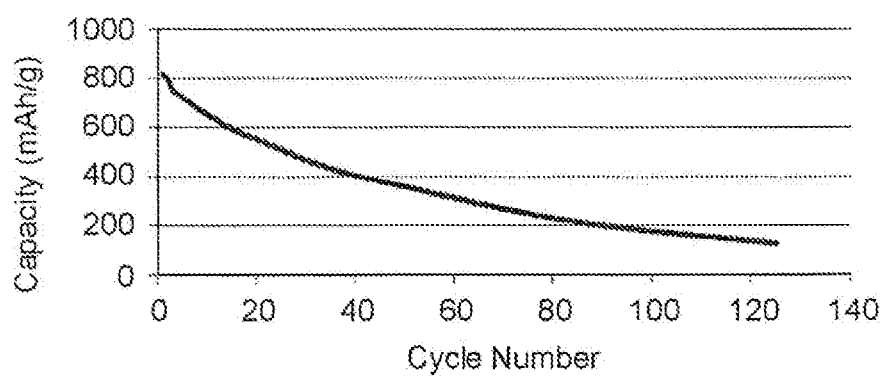
Figure 29:
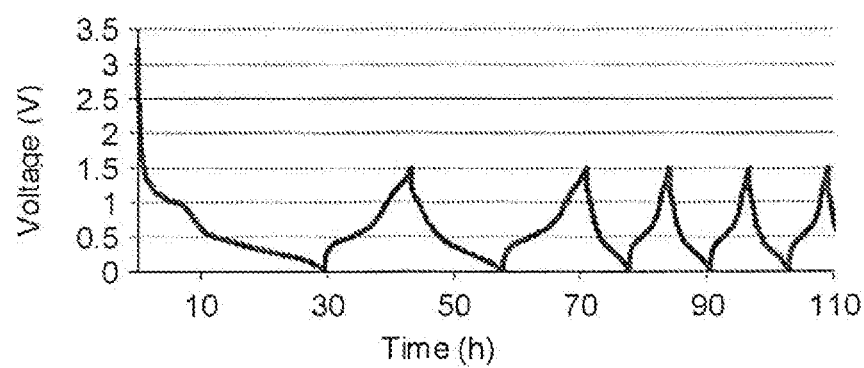

A tin oxide AMO was synthesized using a single-pot hydrothermal synthesis method. Briefly, tin acetate (Sn(CH3COO)2) was dissolved in an ethanol/water solution and acidified by addition of boric acid (H3BO3). The resultant AMO nanomaterial was a grey, flaky material and was formed into an electrode. The electrode was assembled in a battery cell against lithium metal and cycled by discharging to zero volts, followed by charging to 1.5 volts. FIG. 29 depicts an electron micrograph image of the AMO nanomaterial, a plot of the measured capacity versus cycle number, as well as a plot of the voltage as a function of time during cycling.

Figure 30:
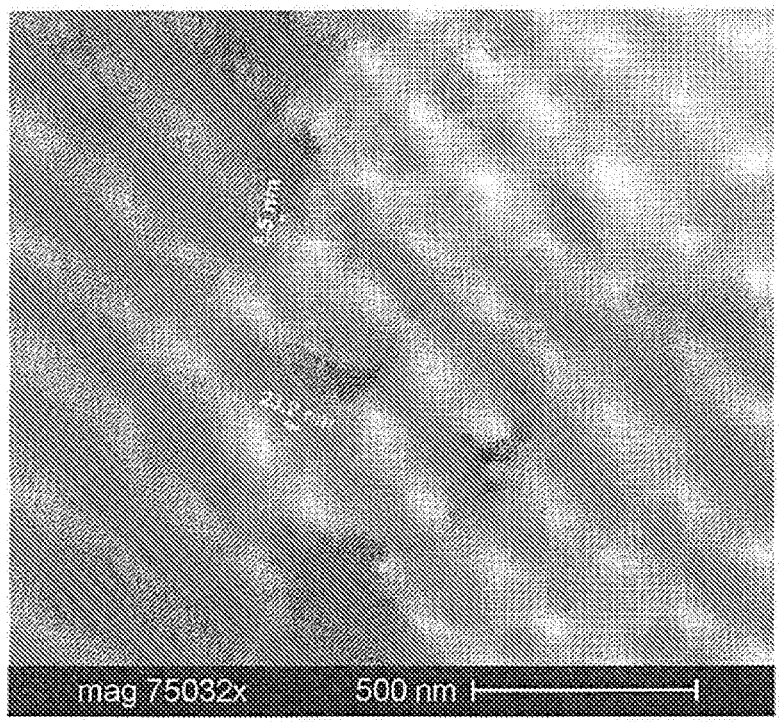
FIG. 30 provides an electron micrograph image of an AMO material and data including a plot of measured capacity versus cycle number as well as a plot of the voltage as a function of time during cycling for a battery cell including an electrode comprising the AMO material.
Figure 30:
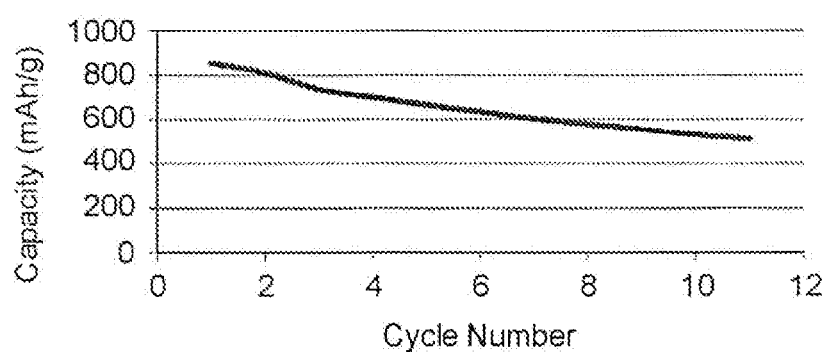
Figure 30:
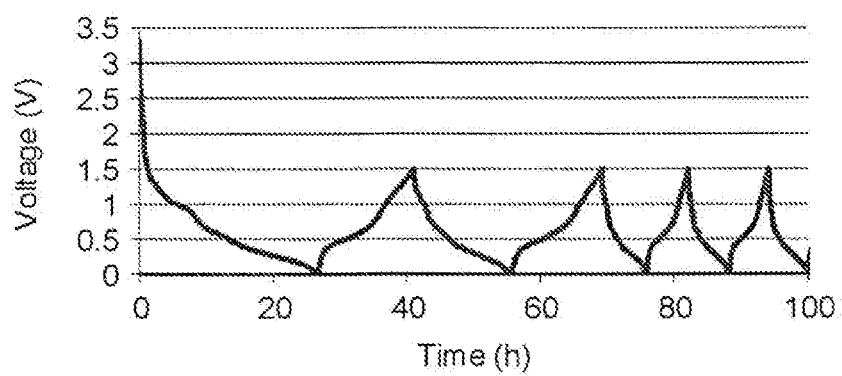

Example 15: AMO of Tin Oxide Doped with Manganese Oxide and Functionalized by Sulfate/Chloride A doped tin oxide AMO was synthesized using a single-pot hydrothermal synthesis method. Briefly, tin sulfate (SnSO4) was dissolved in an ethanol/water solution with a lesser amount of manganese chloride (MnCl2). The solution was acidified by addition of sulfuric acid (H2SO4). The resultant AMO nanomaterial was a very soft, tan material and was formed into an electrode. The electrode was assembled in a battery cell against lithium metal and cycled by discharging to zero volts, followed by charging to 1.5 volts. FIG. 30 depicts an electron micrograph image of the AMO nanomaterial, a plot of the measured capacity versus cycle number, as well as a plot of the voltage as a function of time during cycling.

Figure 31:
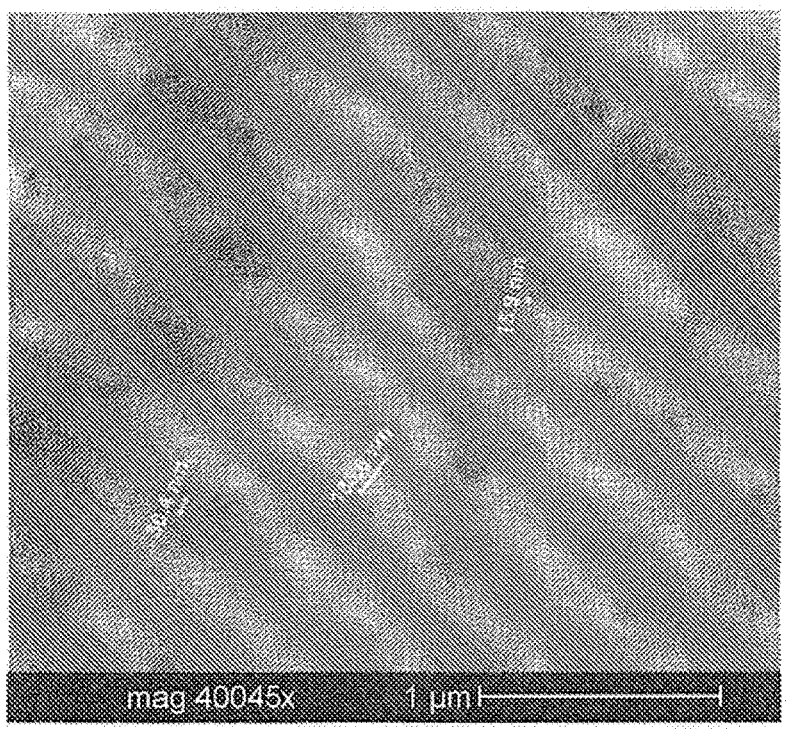
FIG. 31 provides an electron micrograph image of an AMO material and data including a plot of measured capacity versus cycle number as well as a plot of the voltage as a function of time during cycling for a battery cell including an electrode comprising the AMO material.
Figure 31:
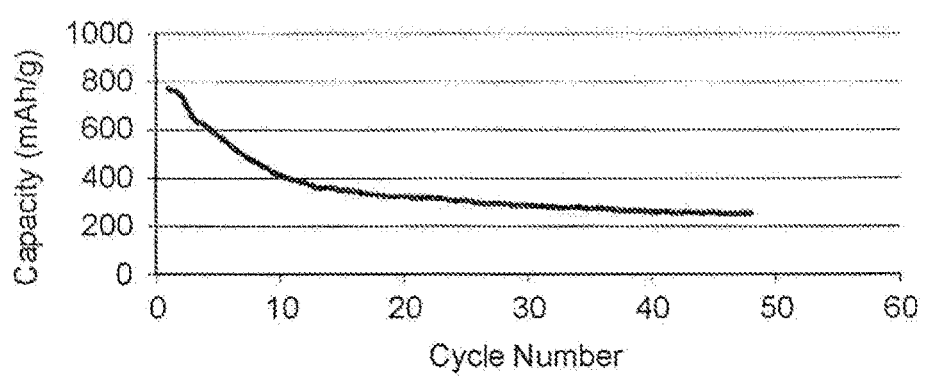
Figure 31:
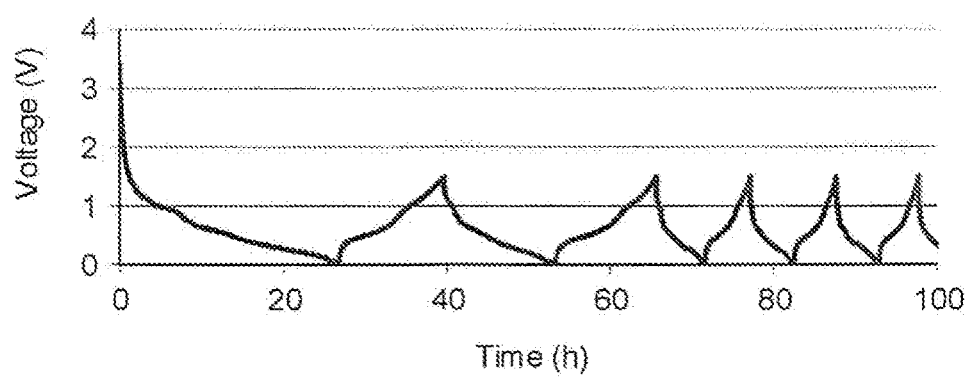

Example 16: AMO of Tin Oxide Doped with Manganese Oxide and Functionalized by Chloride A doped tin oxide AMO was synthesized using a single-pot hydrothermal synthesis method. Briefly, tin chloride (SnCl2) was dissolved in an ethanol/water solution with a lesser amount of manganese chloride (MnCl2). The solution was acidified by addition of hydrochloric acid (HCl). The resultant AMO nanomaterial was a soft, greyish brown material and was formed into an electrode. The electrode was assembled in a battery cell against lithium metal and cycled by discharging to zero volts, followed by charging to 1.5 volts. FIG. 31 depicts an electron micrograph image of the AMO nanomaterial, a plot of the measured capacity versus cycle number, as well as a plot of the voltage as a function of time during cycling.

Figure 32:
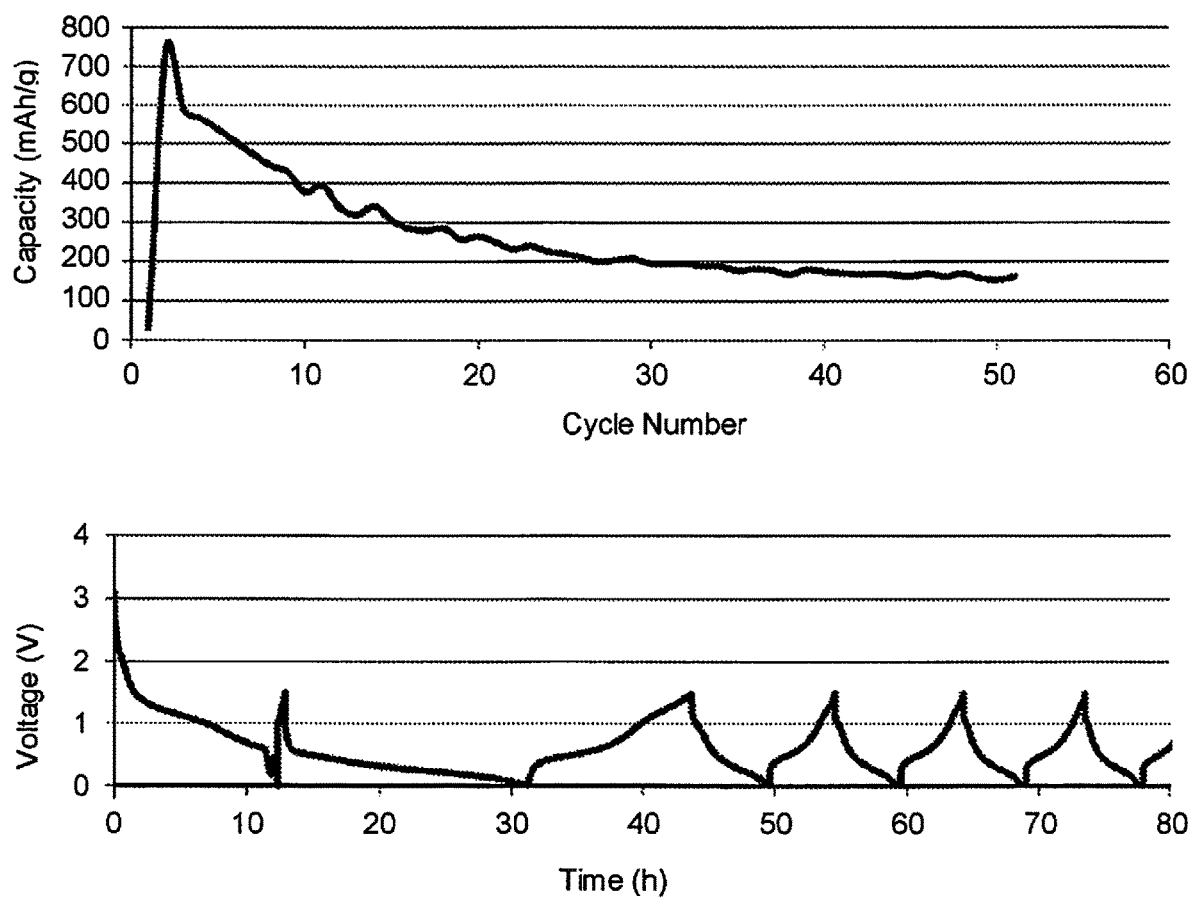
FIG. 32 provides data including a plot of measured capacity versus cycle number as well as a plot of the voltage as a function of time during cycling for a battery cell including an electrode comprising an AMO material.

Example 17: AMO of Tin Oxide Doped with Iron Oxide and Aluminum Oxide and Functionalized by Chloride Two doped tin oxide AMO samples were synthesized using a single-pot hydrothermal synthesis method. Briefly, tin chloride (SnCl2) was dissolved in an ethanol/water solution with lesser amounts of both iron chloride (FeCl3) and aluminum chloride (AlCl3). The solution was acidified by addition of hydrochloric acid (HCl). The resultant AMO nanomaterial for the first sample was a light tan, flaky material and was formed into an electrode. The electrode was assembled in a battery cell against lithium metal and cycled by discharging to zero volts, followed by charging to 1.5 volts. FIG. 32 depicts a plot of the measured capacity versus cycle number, as well as a plot of the voltage as a function of time during cycling. The resultant AMO nanomaterial for the second sample was a light grey, flaky material.

Figure 33:
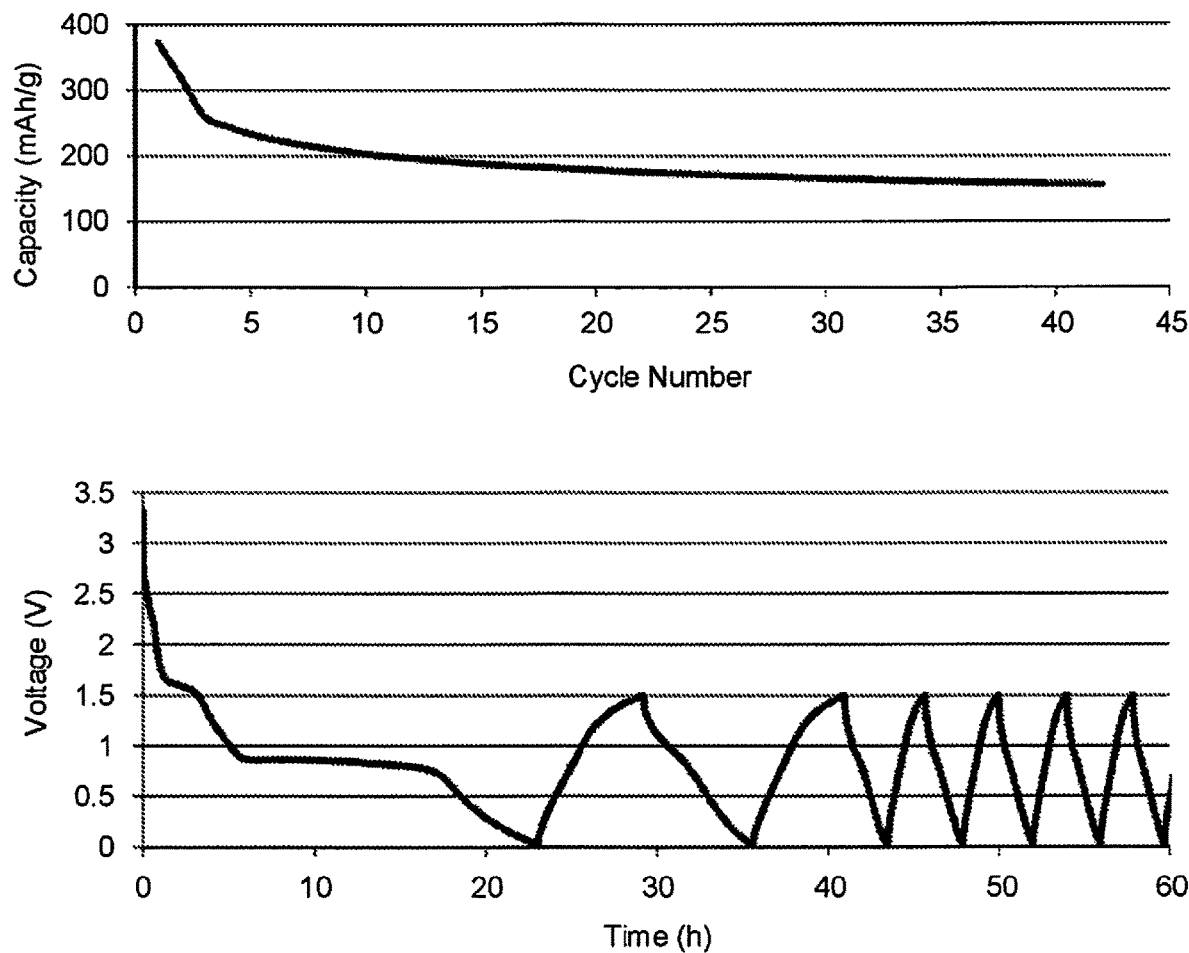
FIG. 33 provides data including a plot of measured capacity versus cycle number as well as a plot of the voltage as a function of time during cycling for a battery cell including an electrode comprising an AMO material.

Example 18: AMO of Iron Oxide Doped with Tin Oxide and Functionalized by Chloride A doped iron oxide AMO was synthesized using a single-pot hydrothermal synthesis method. Briefly, iron chloride (FeCl3) was dissolved in an ethanol/water solution with a lesser amount of tin chloride (SnCl2). The ratio of iron to tin was 95:5. The solution was acidified by addition of hydrochloric acid (HCl). The resultant AMO nanomaterial was a soft, red material and was formed into an electrode. The electrode was assembled in a battery cell against lithium metal and cycled by discharging to zero volts, followed by charging to 1.5 volts. FIG. 33 depicts a plot of the measured capacity versus cycle number, as well as a plot of the voltage as a function of time during cycling.

Figure 34:
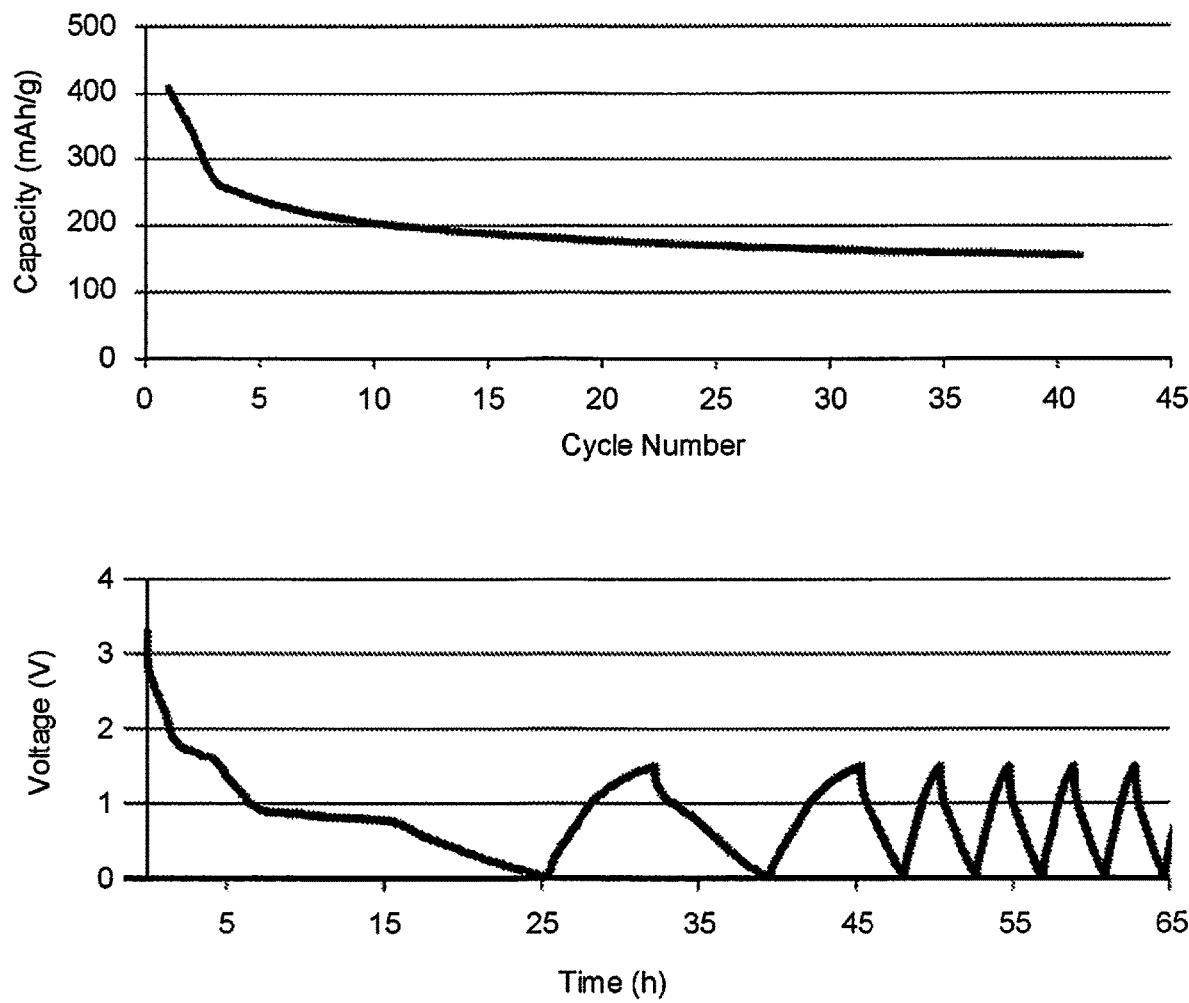
FIG. 34 provides data including a plot of measured capacity versus cycle number as well as a plot of the voltage as a function of time during cycling for a battery cell including an electrode comprising an AMO material.

Example 19: AMO of Iron Oxide Doped with Tin Oxide and Functionalized by Chloride A doped iron oxide AMO was synthesized using a single-pot hydrothermal synthesis method. Briefly, iron chloride (FeCl3) was dissolved in an ethanol/water solution with a lesser amount of tin chloride (SnCl2). The ratio of iron to tin was 95:5. The solution was acidified by addition of hydrochloric acid (HCl). The resultant AMO nanomaterial was a black, glassy material and was formed into an electrode. The electrode was assembled in a battery cell against lithium metal and cycled by discharging to zero volts, followed by charging to 1.5 volts. FIG. 34 depicts a plot of the measured capacity versus cycle number, as well as a plot of the voltage as a function of time during cycling.

Example 20: AMO of Iron Oxide Functionalized by Nitrate

Figure 35:
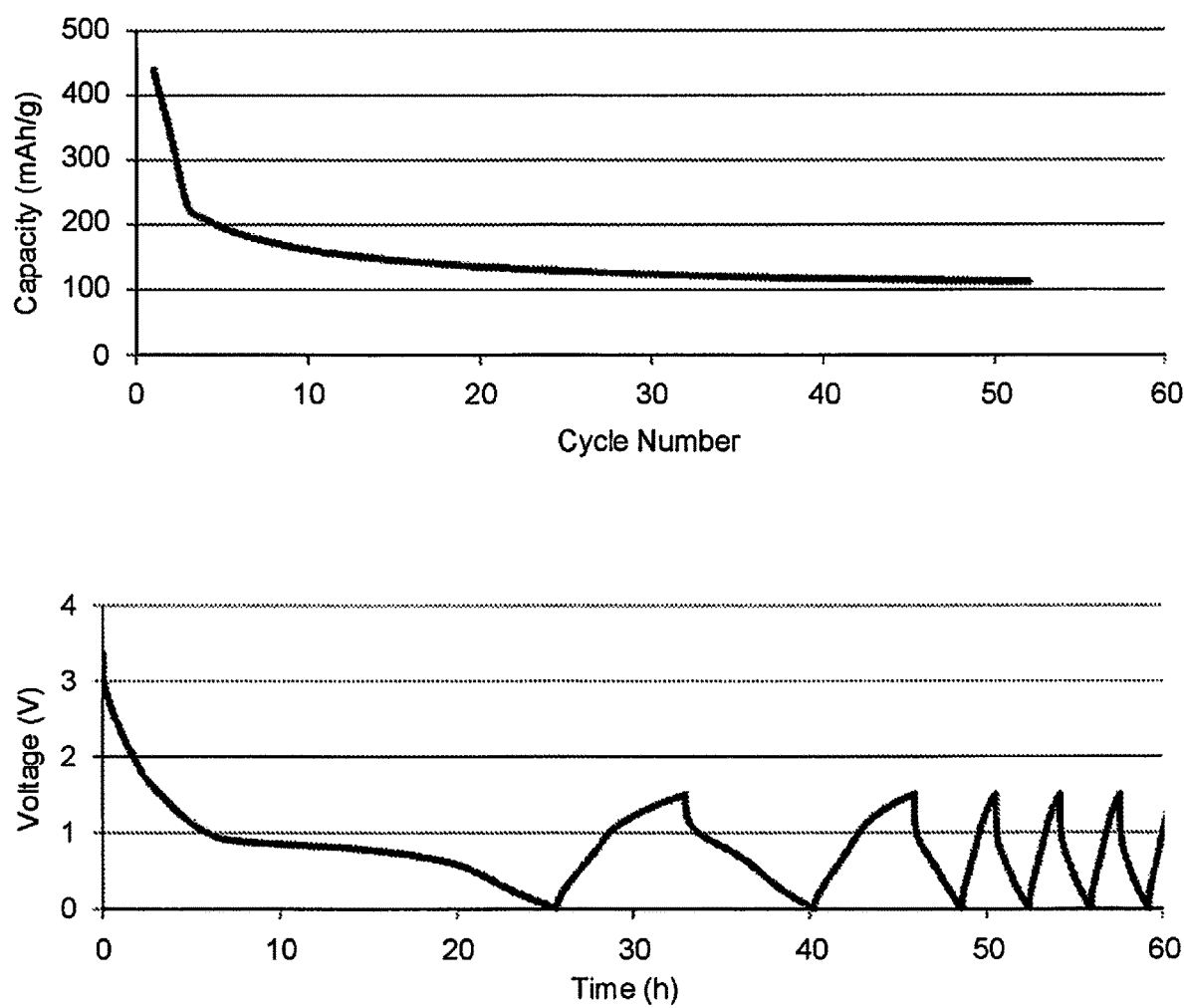
FIG. 35 provides data including a plot of measured capacity versus cycle number as well as a plot of the voltage as a function of time during cycling for a battery cell including an electrode comprising an AMO material.

An iron oxide AMO was synthesized using a single-pot hydrothermal synthesis method. Briefly, iron nitrate Fe(NO3)3 was dissolved in an ethanol/water solution and acidified by addition of nitric acid (HNO3). The resultant AMO nanomaterial was a black, glassy material and was formed into an electrode. The electrode was assembled in a battery cell against lithium metal and cycled by discharging to zero volts, followed by charging to 1.5 volts. FIG. 35 depicts a plot of the measured capacity versus cycle number, as well as a plot of the voltage as a function of time during cycling.

Example 21: AMO of Bismuth Oxide Functionalized by Chloride

Figure 36:
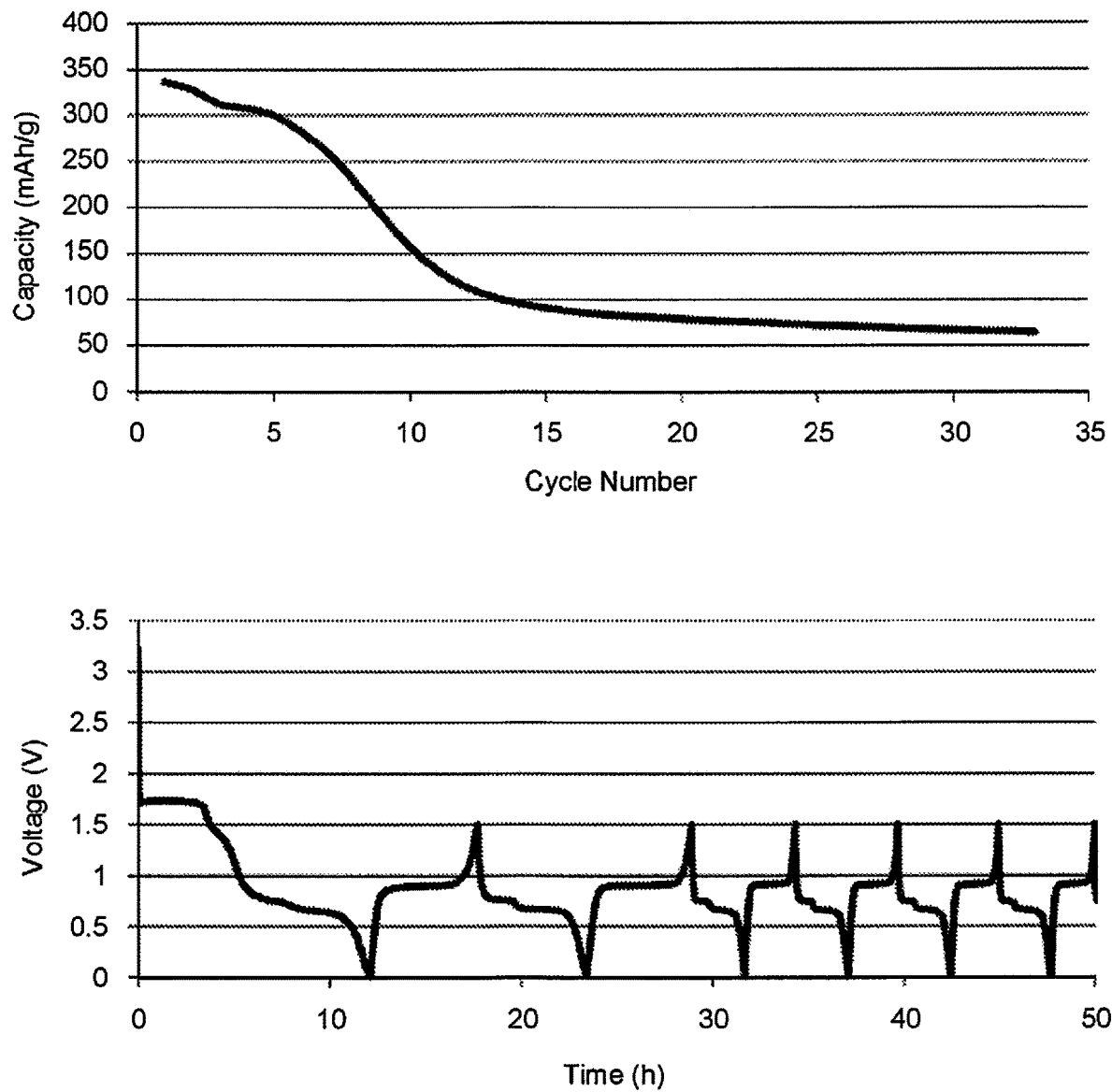
FIG. 36 provides data including a plot of measured capacity versus cycle number as well as a plot of the voltage as a function of time during cycling for a battery cell including an electrode comprising an AMO material.

A bismuth oxide AMO was synthesized using a single-pot hydrothermal synthesis method. Briefly, bismuth chloride (BiCl3) was dissolved in an ethanol/water solution and acidified by addition of hydrochloric acid (HCl). The resultant AMO nanomaterial was a soft, white material and was formed into an electrode. The electrode was assembled in a battery cell against lithium metal and cycled by discharging to zero volts, followed by charging to 1.5 volts. FIG. 36 depicts a plot of the measured capacity versus cycle number, as well as a plot of the voltage as a function of time during cycling.

Example 22: AMO of Zirconium Oxide Functionalized by Sulfate

Figure 37:
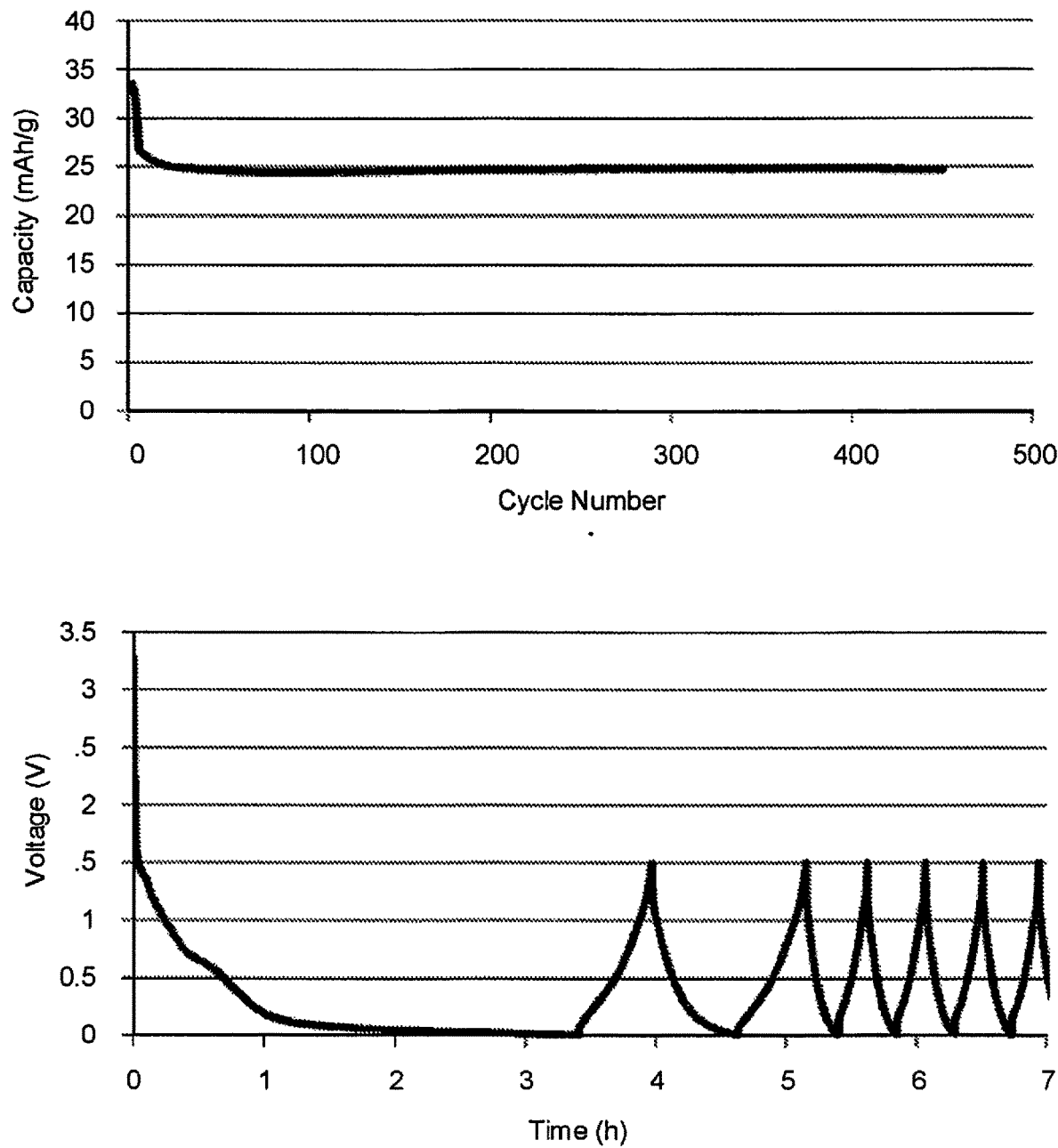
FIG. 37 provides data including a plot of measured capacity versus cycle number as well as a plot of the voltage as a function of time during cycling for a battery cell including an electrode comprising an AMO material.

A zirconium oxide AMO was synthesized using a single-pot hydrothermal synthesis method. Briefly, zirconium sulfate (Zr(SO4)2) was dissolved in an ethanol/water solution and acidified by addition of sulfuric acid (H2SO4). The resultant AMO nanomaterial was a flaky, white material and was formed into an electrode. The electrode was assembled in a battery cell against lithium metal and cycled by discharging to zero volts, followed by charging to 1.5 volts. FIG. 37 depicts a plot of the measured capacity versus cycle number, as well as a plot of the voltage as a function of time during cycling.

Example 23: AMO of Titanium Oxide Functionalized by Sulfate

Figure 38:
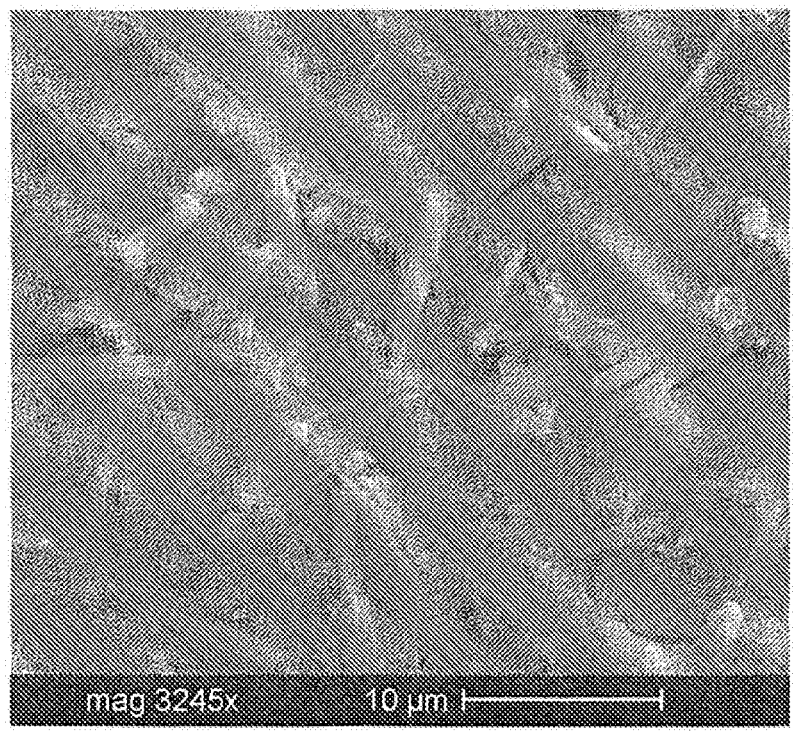
FIG. 38 provides an electron micrograph image of an AMO material and data including a plot of measured capacity versus cycle number as well as a plot of the voltage as a function of time during cycling for a battery cell including an electrode comprising the AMO material.
Figure 38:
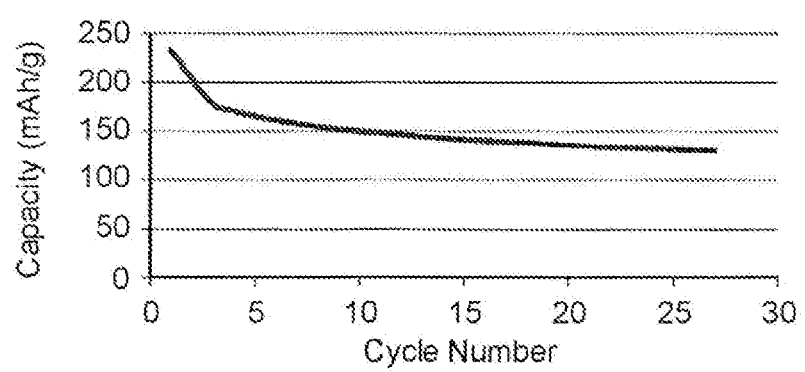
Figure 38:
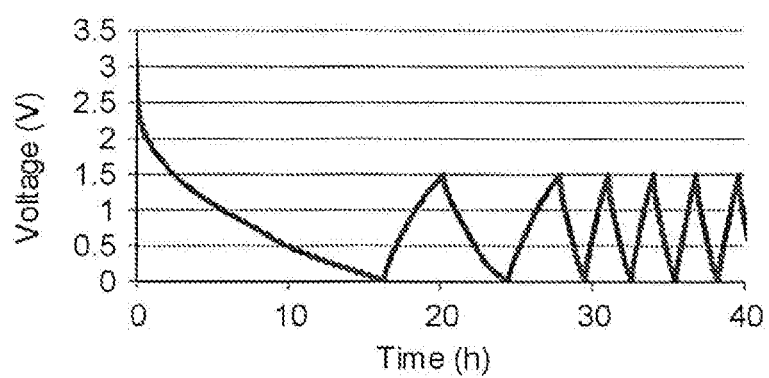

A titanium oxide AMO was synthesized using a single-pot hydrothermal synthesis method. Briefly, titanium oxysulfate (TiOSO4) was dissolved in an ethanol/water solution and acidified by addition of sulfuric acid (H2SO4). The resultant AMO nanomaterial was a white, flaky material and was formed into an electrode. The electrode was assembled in a battery cell against lithium metal and cycled by discharging to zero volts, followed by charging to 1.5 volts. FIG. 38 depicts an electron micrograph image of the AMO nanomaterial, a plot of the measured capacity versus cycle number, as well as a plot of the voltage as a function of time during cycling.

Example 24: AMO of Antimony Oxide Functionalized by Sulfate

Figure 39:
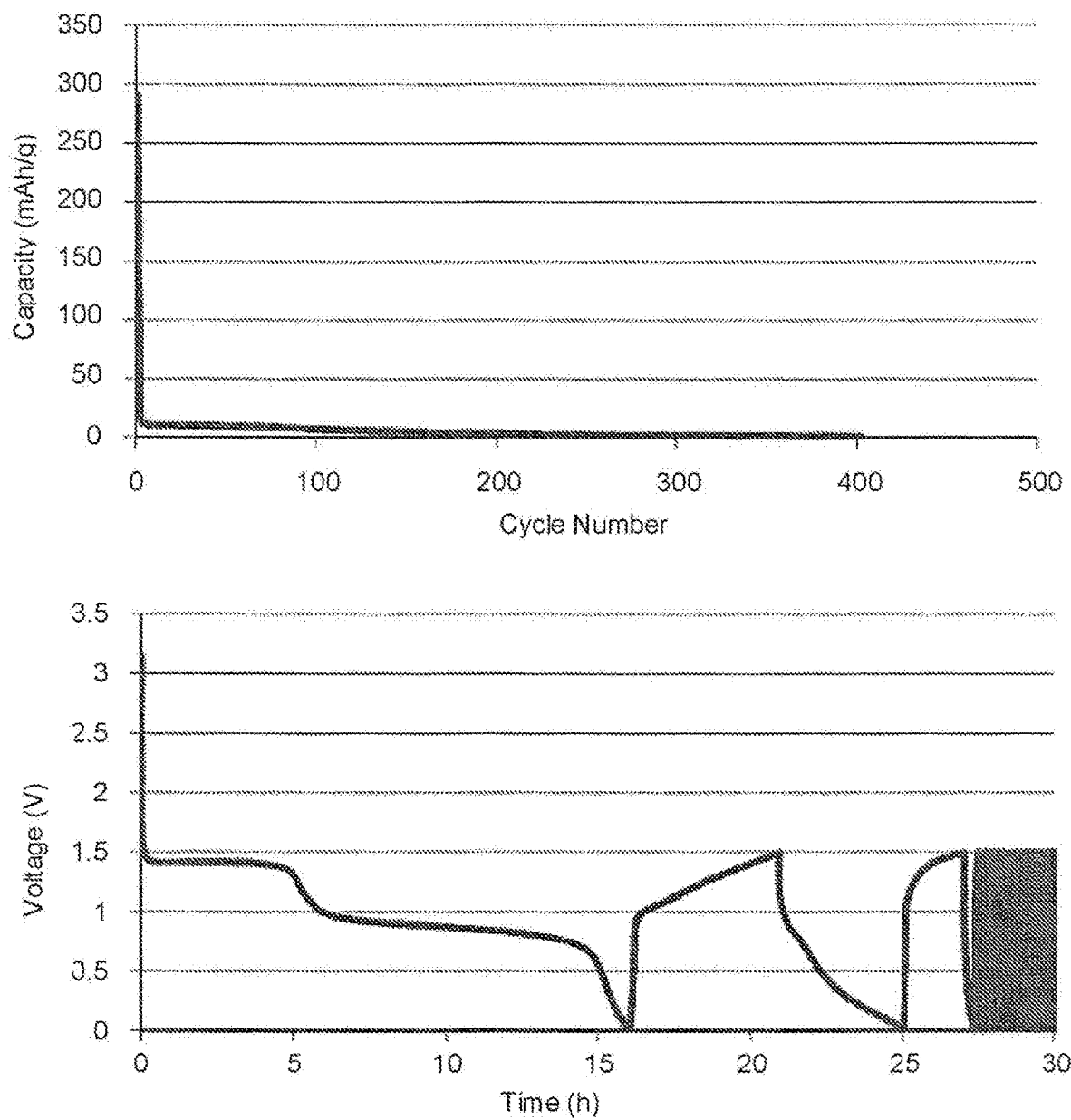
FIG. 39 provides data including a plot of measured capacity versus cycle number as well as a plot of the voltage as a function of time during cycling for a battery cell including an electrode comprising an AMO material.

An antimony oxide AMO was synthesized using a single-pot hydrothermal synthesis method. Briefly, antimony sulfate (Sb2(SO4)3) was dissolved in an ethanol/water solution and acidified by addition of sulfuric acid (H2SO4). The resultant AMO nanomaterial was a very soft, white material and was formed into an electrode. The electrode was assembled in a battery cell against lithium metal and cycled by discharging to zero volts, followed by charging to 1.5 volts. FIG. 39 depicts a plot of the measured capacity versus cycle number, as well as a plot of the voltage as a function of time during cycling.

Example 25: AMO of Indium Oxide Functionalized by Chloride

Figure 40:
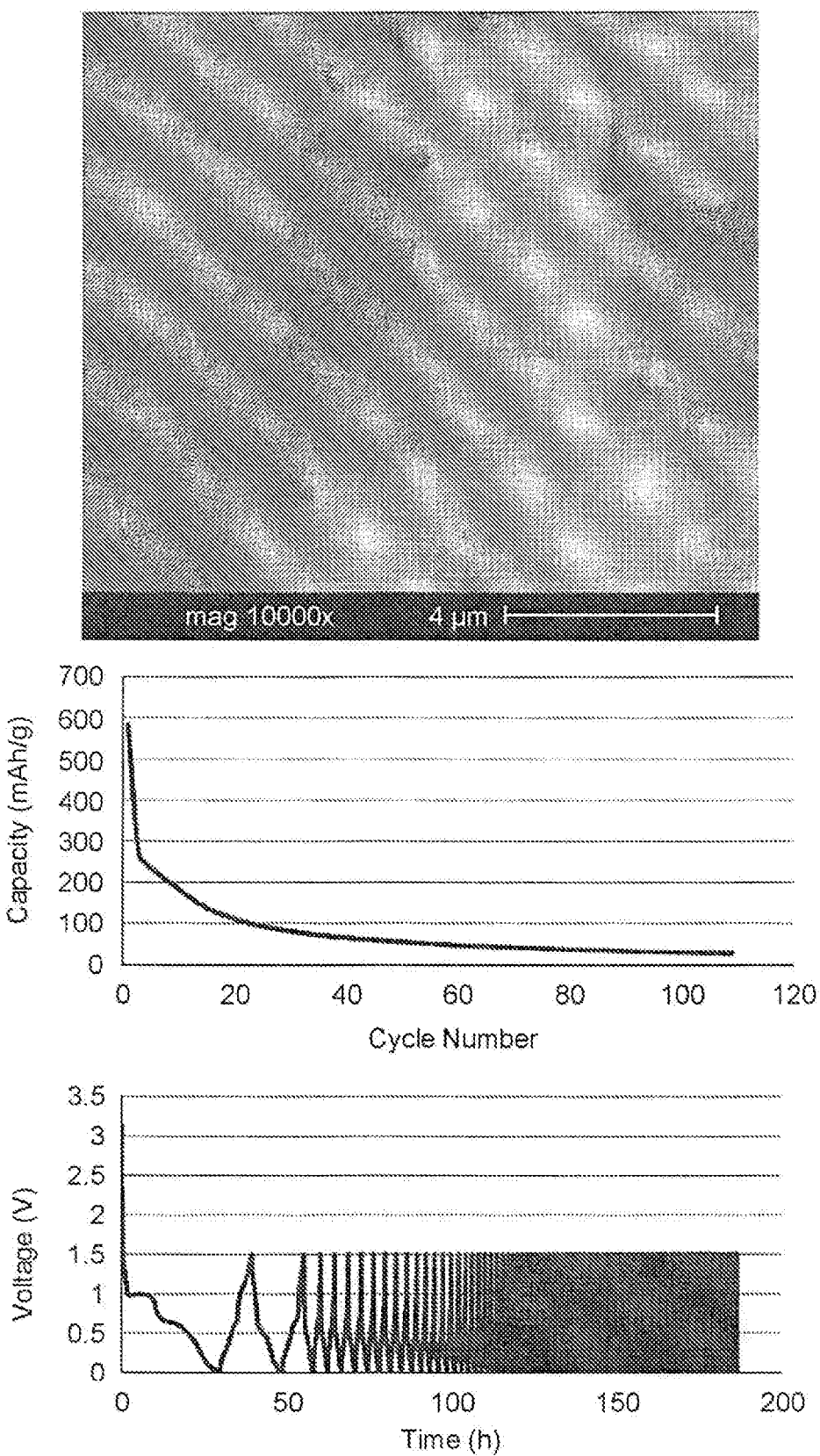
FIG. 40 provides an electron micrograph image of an AMO material and data including a plot of measured capacity versus cycle number as well as a plot of the voltage as a function of time during cycling for a battery cell including an electrode comprising the AMO material.

An indium oxide AMO was synthesized using a single-pot hydrothermal synthesis method. Briefly, indium chloride (InCl3) was dissolved in an ethanol/water solution and acidified by addition of hydrochloric acid (HCl). The resultant AMO nanomaterial was a white material and was formed into an electrode. The electrode was assembled in a battery cell against lithium metal and cycled by discharging to zero volts, followed by charging to 1.5 volts. FIG. 40 depicts an electron micrograph image of the AMO nanomaterial, a plot of the measured capacity versus cycle number, as well as a plot of the voltage as a function of time during cycling.

Example 26: AMO of Indium Oxide Functionalized by Sulfate

Figure 41:
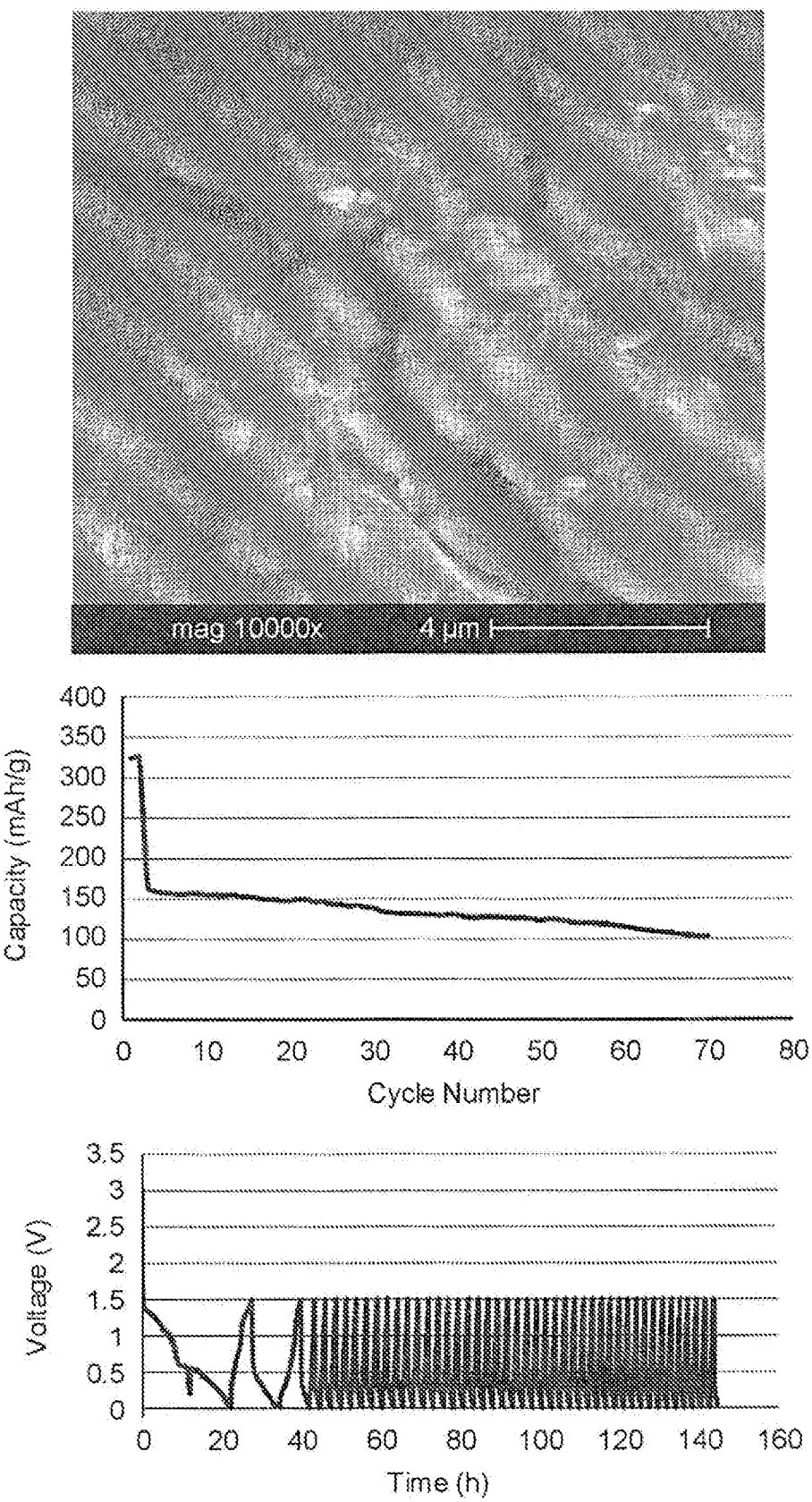
FIG. 41 provides an electron micrograph image of an AMO material and data including a plot of measured capacity versus cycle number as well as a plot of the voltage as a function of time during cycling for a battery cell including an electrode comprising the AMO material.

An indium oxide AMO was synthesized using a single-pot hydrothermal synthesis method. Briefly, indium sulfate (In2(SO4)3) was dissolved in an ethanol/water solution and acidified by addition of sulfuric acid (H2SO4). The resultant AMO nanomaterial was a white material and was formed into an electrode. The electrode was assembled in a battery cell against lithium metal and cycled by discharging to zero volts, followed by charging to 1.5 volts. FIG. 41 depicts an electron micrograph image of the AMO nanomaterial, a plot of the measured capacity versus cycle number, as well as a plot of the voltage as a function of time during cycling.

Example 27: AMO of Indium Oxide Functionalized by Bromide

Figure 42:
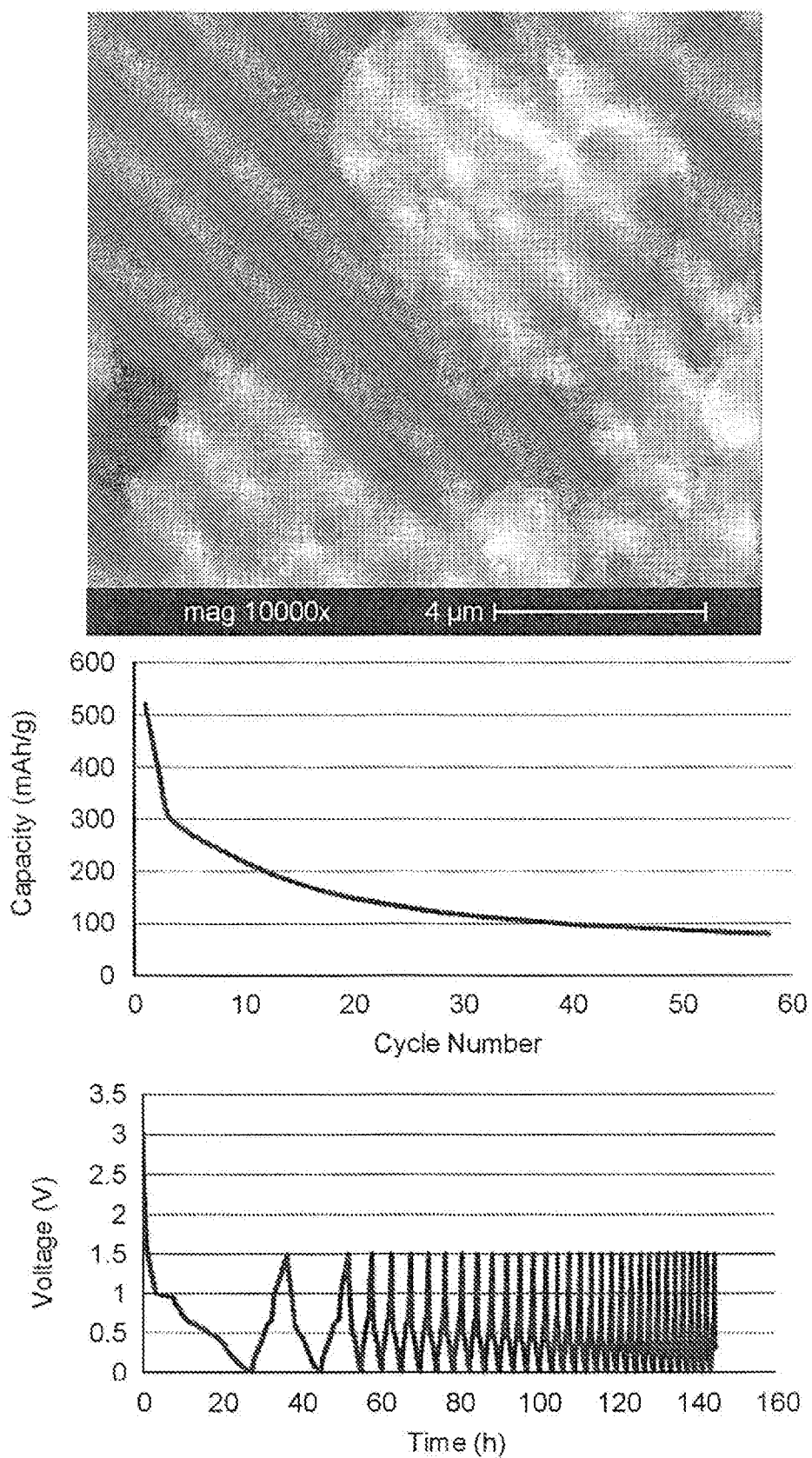
FIG. 42 provides an electron micrograph image of an AMO material and data including a plot of measured capacity versus cycle number as well as a plot of the voltage as a function of time during cycling for a battery cell including an electrode comprising the AMO material.

An indium oxide AMO was synthesized using a single-pot hydrothermal synthesis method. Briefly, indium bromide (InBr3) was dissolved in an ethanol/water solution and acidified by addition of hydrobromic acid (HBr). The resultant AMO nanomaterial was a blue-white material and was formed into an electrode. The electrode was assembled in a battery cell against lithium metal and cycled by discharging to zero volts, followed by charging to 1.5 volts. FIG. 42 depicts an electron micrograph image of the AMO nanomaterial, a plot of the measured capacity versus cycle number, as well as a plot of the voltage as a function of time during cycling.

Example 28: AMO of Indium Oxide Functionalized by Chloride

Figure 43:
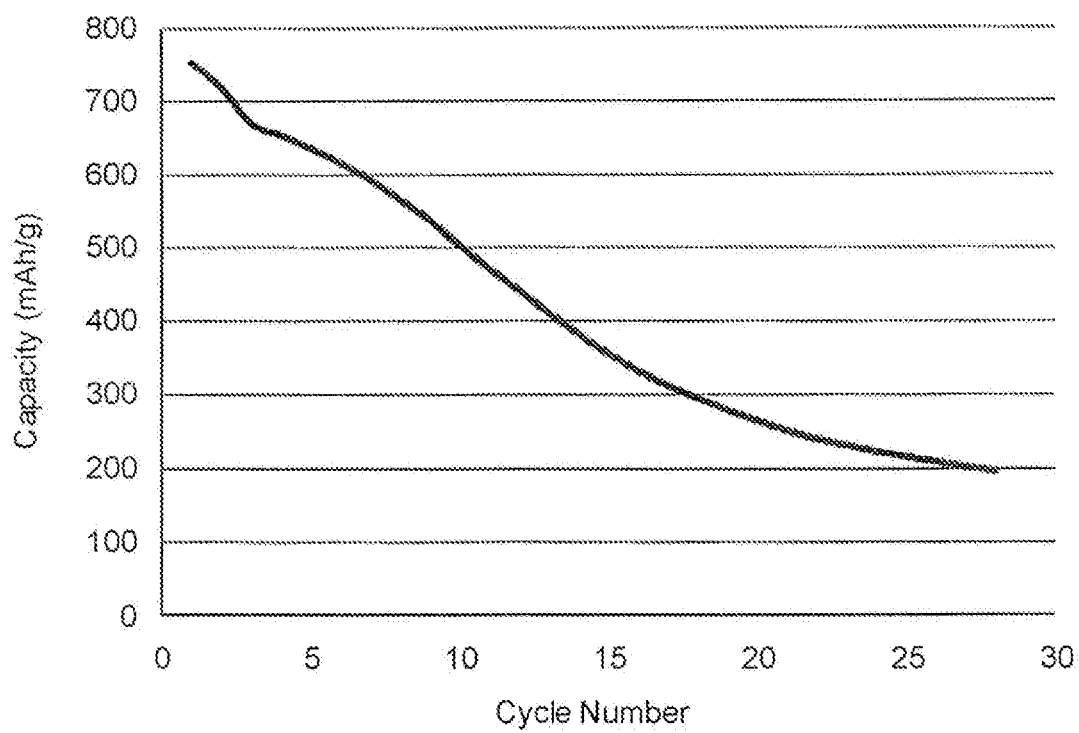
FIG. 43 provides data including a plot of measured capacity versus cycle number as well as a plot of the voltage as a function of time during cycling for a battery cell including an electrode comprising an AMO material.
Figure 43:
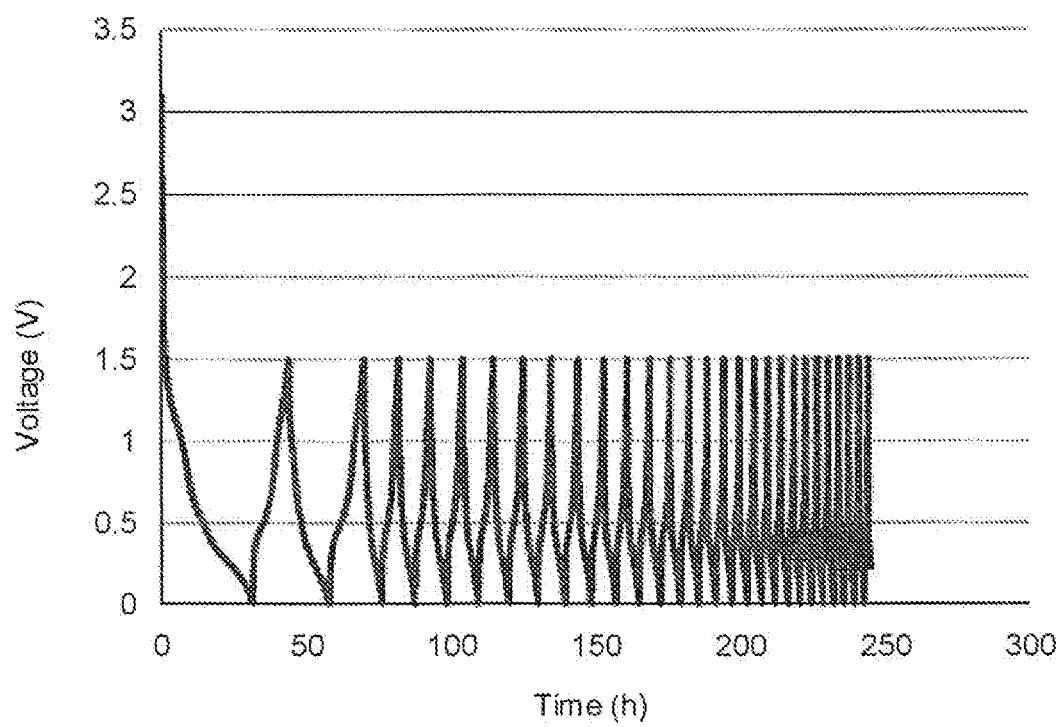

An indium oxide AMO was synthesized using a single-pot hydrothermal synthesis method. Briefly, indium chloride (InCl3) was dissolved in an ethanol/water solution and acidified by addition of hydrochloric acid (HCl). The resultant AMO nanomaterial was grey with a yellow ring and was formed into an electrode. The electrode was assembled in a battery cell against lithium metal and cycled by discharging to zero volts, followed by charging to 1.5 volts. FIG. 43 depicts an electron micrograph image of the AMO nanomaterial, a plot of the measured capacity versus cycle number, as well as a plot of the voltage as a function of time during cycling.

Figure 44:
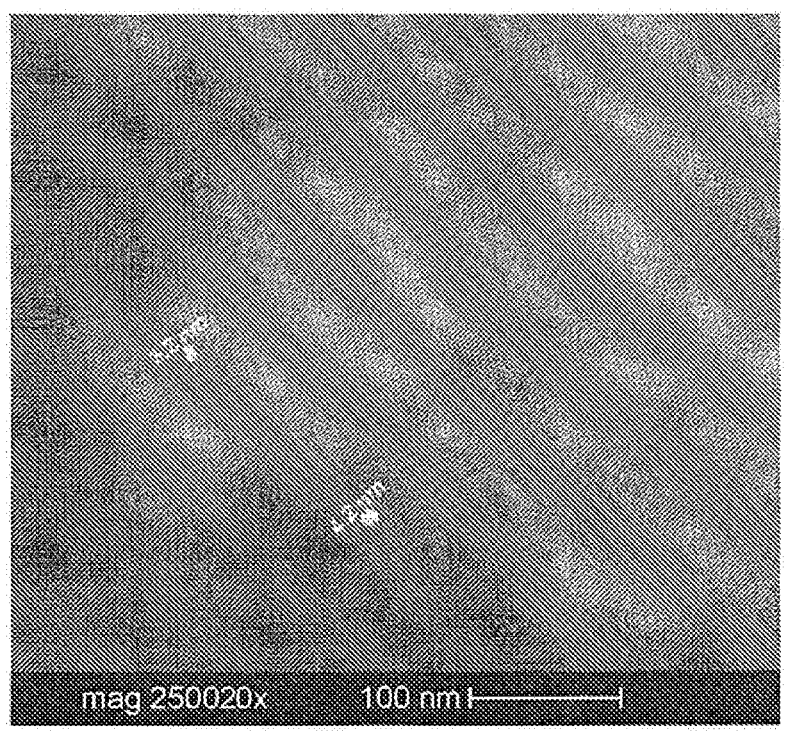
FIG. 44 provides an electron micrograph image of an AMO material and data including a plot of measured capacity versus cycle number as well as a plot of the voltage as a function of time during cycling for a battery cell including an electrode comprising the AMO material.
Figure 44:
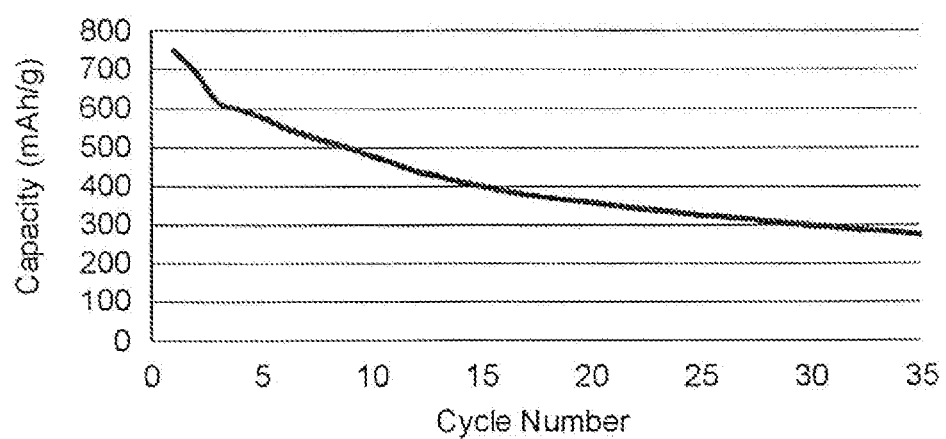
Figure 44:
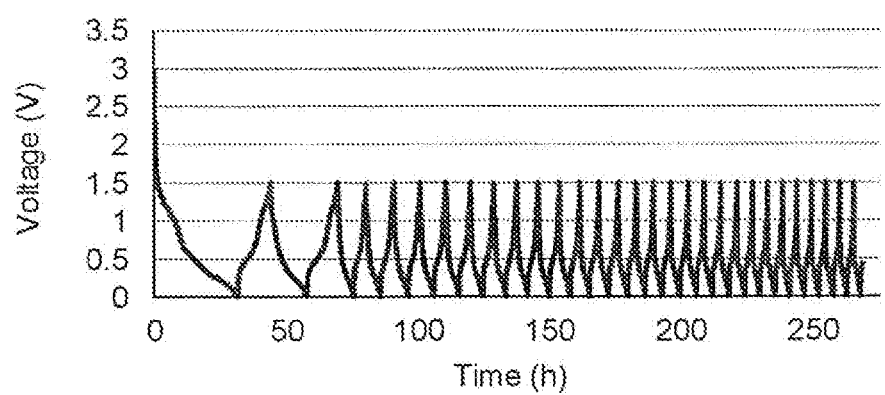

Example 29: Mixed AMO of Lithium Oxide and Iron Oxide Doped with Tin Oxide and Functionalized by Chloride/Acetate A doped mixed lithium oxide and iron oxide AMO was synthesized using a single-pot hydrothermal synthesis method. Briefly, lithium acetate (Li(CH3COO)) and iron chloride (FeCl3) were dissolved in an ethanol/water solution with a lesser amount of tin chloride (SnCl2). The solution was acidified by addition of hydrochloric acid (HCl). During synthesis, a tan, pinkish color with a green ring on the flask developed. The final AMO nanomaterial, however, was grey and was formed into an electrode. The electrode was assembled in a battery cell against lithium metal and cycled by discharging to zero volts, followed by charging to 1.5 volts. FIG. 44 depicts an electron micrograph image of the AMO nanomaterial, a plot of the measured capacity versus cycle number, as well as a plot of the voltage as a function of time during cycling.

Figure 45:
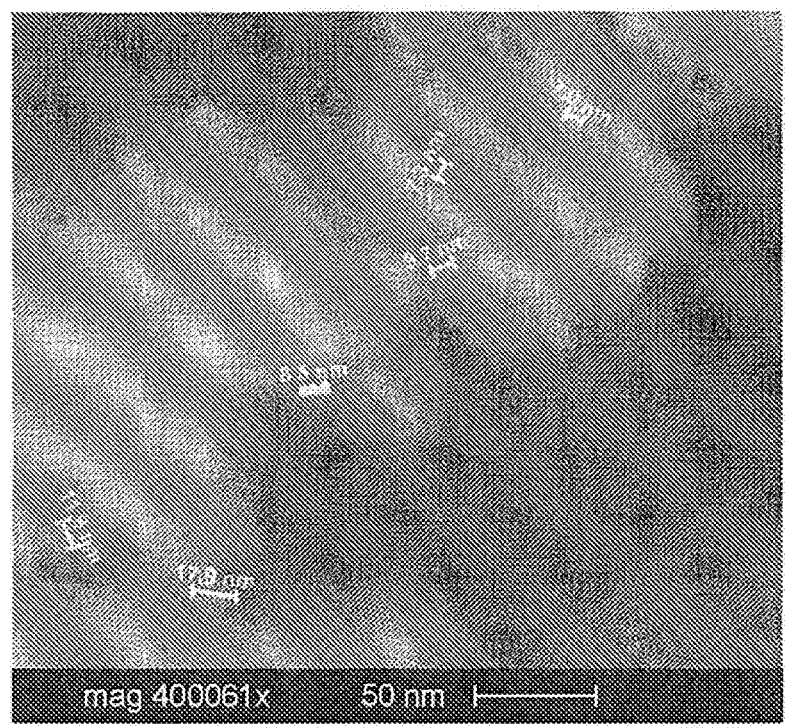
FIG. 45 provides an electron micrograph image of an AMO material and data including a plot of measured capacity versus cycle number as well as a plot of the voltage as a function of time during cycling for a battery cell including an electrode comprising the AMO material.
Figure 45:
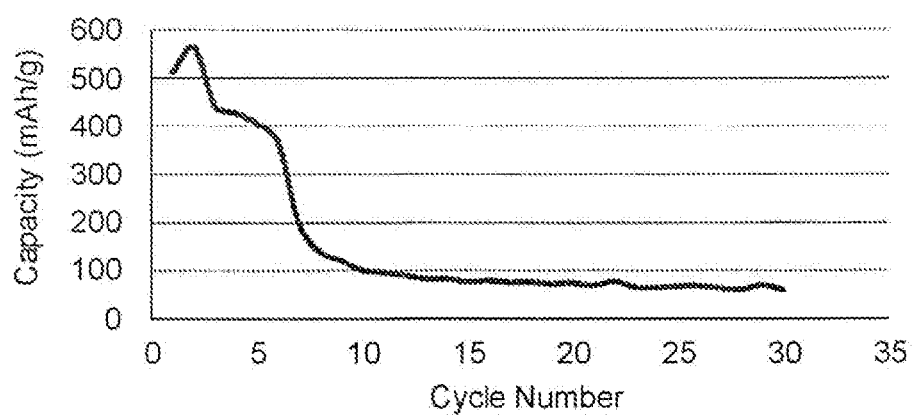
Figure 45:
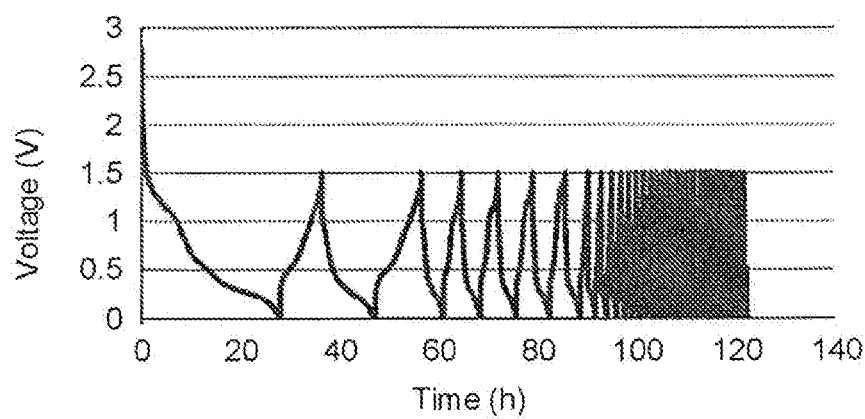

Example 30: Mixed AMO of Lithium Oxide and Iron Oxide Doped with Tin Oxide and Functionalized by Chloride/Acetate A doped mixed lithium oxide and iron oxide AMO was synthesized using a single-pot hydrothermal synthesis method. Briefly, lithium acetate (Li(CH3COO)) and iron chloride (FeCl3) were dissolved in an ethanol/water solution with a lesser amount of tin chloride (SnCl2). The solution was acidified by addition of hydrochloric acid (HCl). The resultant AMO nanomaterial was a golden pale material and was formed into an electrode. The electrode was assembled in a battery cell against lithium metal and cycled by discharging to zero volts, followed by charging to 1.5 volts. FIG. 45 depicts an electron micrograph image of the AMO nanomaterial, a plot of the measured capacity versus cycle number, as well as a plot of the voltage as a function of time during cycling.

Figure 46:
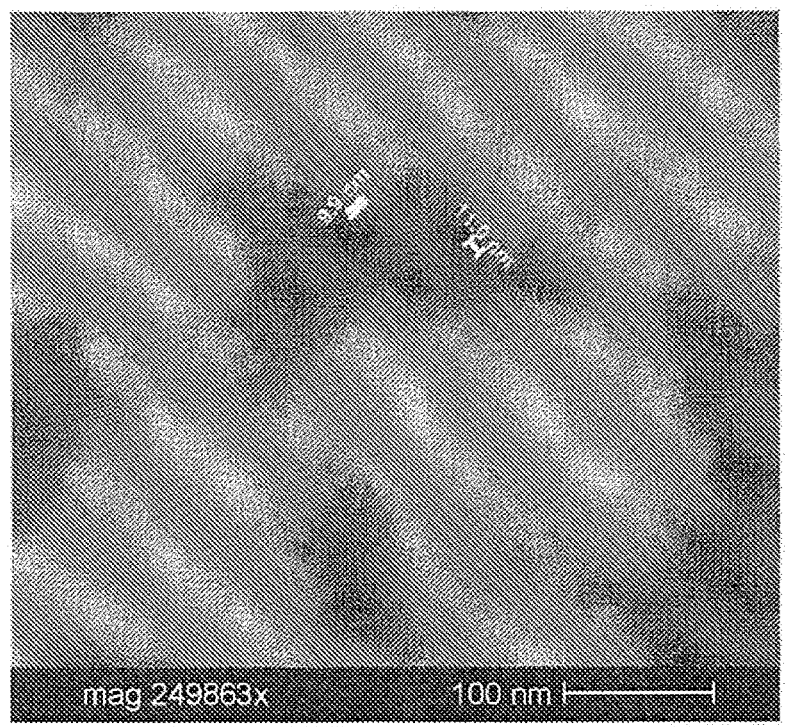
FIG. 46 provides an electron micrograph image of an AMO material and data including a plot of measured capacity versus cycle number as well as a plot of the voltage as a function of time during cycling for a battery cell including an electrode comprising the AMO material.
Figure 46:
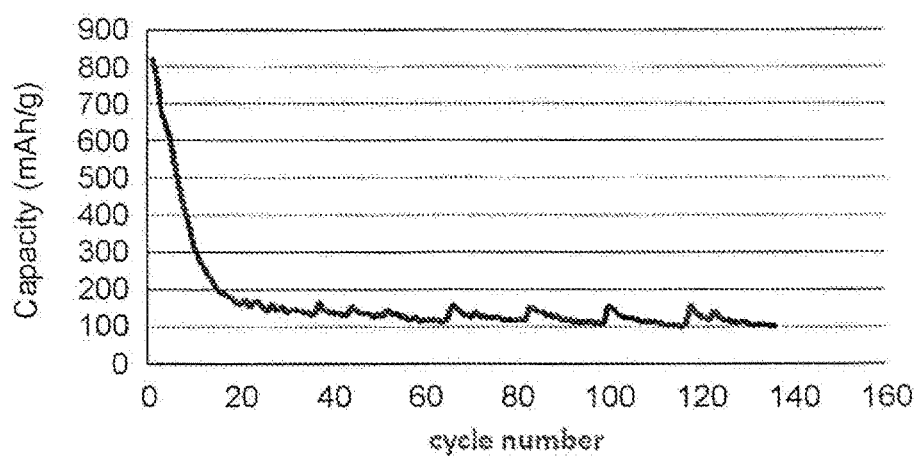
Figure 46:
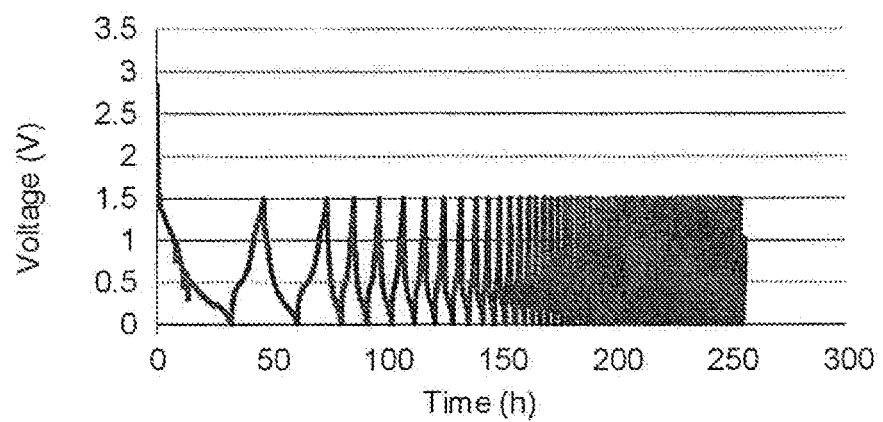

Example 31: Mixed AMO of Lithium Oxide and Iron Oxide Doped with Tin Oxide and Functionalized by Chloride/Acetate A doped mixed lithium oxide and iron oxide AMO was synthesized using a single-pot hydrothermal synthesis method. Briefly, lithium acetate (Li(CH3COO)) and iron chloride (FeCl3) were dissolved in an ethanol/water solution with a lesser amount of tin chloride (SnCl2). The solution was acidified by addition of hydrochloric acid (HCl). The resultant AMO nanomaterial was a light creamy white material and was formed into an electrode. The electrode was assembled in a battery cell against lithium metal and cycled by discharging to zero volts, followed by charging to 1.5 volts. FIG. 46 depicts an electron micrograph image of the AMO nanomaterial, a plot of the measured capacity versus cycle number, as well as a plot of the voltage as a function of time during cycling.

In various example, the disclosure provides a material comprising a solid metal oxide in monodispersed nanoparticulate form. The AMO nanomaterial may comprise tin oxide, titanium dioxide, iron oxide, zirconium oxide, or any combination of these. The AMO nanomaterial may surface functionalized by one or more electron withdrawing groups selected from the group consisting of Cl, Br, BO3, SO4, PO4, NO3, CH3COO, C2O4, and C6H5O7. A first battery electrode may further comprises a second acidic species. The second electrode may comprise graphite, lithium metal, sodium metal, lithium cobalt oxide, lithium titanate, lithium manganese oxide, lithium nickel manganese cobalt oxide (NMC), lithium iron phosphate, lithium nickel cobalt aluminum oxide (NCA), or any combination of these. An acidic species may comprise one or more organic acids selected from the group consisting of oxalic acid, acetic acid, citric acid, maleic acid, methylmalonic acid, glutaric acid, succinic acid, methylsuccinic acid, methylenesuccinic acid, and citraconic acid. An acidic species may comprise one or more organic acid anhydrides selected from the group consisting of glutaric anhydride, succinic anhydride, methylsuccinic anhydride, maleic anhydride, and itaconic anhydride. An acidic species may have a concentration in the solvent selected from the range of 0.01 wt % to 10 wt %. An acidic species may exhibit a pKa of between 1 and 6 in water. An electrolyte may further comprise a lithium salt dissolved in the solvent.

The disclosure includes a method of making a battery, comprising making an acidified metal oxide (AMO) nanomaterial, forming a first electrode of the AMO nanomaterial, forming an electrolyte by dissolving one or more salts and an acidic species in a solvent, and positioning the electrolyte between the first electrode and a second electrode. Making the AMO nanomaterial may comprise forming a solution comprising a metal salt, ethanol, and water, acidifying the solution by adding an acid to the solution, basifying the solution by adding an aqueous base to the solution, collecting precipitate from the solution, washing the precipitate, and drying the precipitate. The method may include forming the first electrode by mixing the precipitate with a second acidic species. The AMO nanomaterial comprises tin oxide, titanium dioxide, iron oxide, zirconium oxide or any combination of these. The AMO nanomaterial may be surface functionalized by one or more electron withdrawing groups selected from the group consisting of Cl, Br, BO3, SO4, PO4, NO3, CH3COO, C2O4, and C6H5O7. The second electrode may comprise graphite, lithium metal, sodium metal, lithium cobalt oxide, lithium titanate, lithium manganese oxide, lithium nickel manganese cobalt oxide (NMC), lithium iron phosphate, lithium nickel cobalt aluminum oxide (NCA), or any combination of these. The acidic species may comprise one or more organic acids selected from the group consisting oxalic acid, acetic acid, citric acid, maleic acid, methylmalonic acid, glutaric acid, succinic acid, methylsuccinic acid, methylenesuccinic acid, and citraconic acid or wherein the acidic species comprises one or more organic acid anhydrides selected from the group consisting of glutaric anhydride, succinic anhydride, methylsuccinic anhydride, maleic anhydride, and itaconic anhydride. The acidic species may have a concentration in the solvent selected from the range of 0.01 wt % to 10 wt %. The acidic species may exhibit a pKa of between 1 and 6 in water.

The disclosure provides an acidified electrolyte for use in a battery comprising a first electrode and a second electrode, wherein the first electrode comprises an acidified metal oxide (AMO) nanomaterial, the electrolyte comprising a solvent, one or more metal salts dissolved in the solvent, and an acidic species dissolved in the solvent, wherein the acidic species is different from the one or more metal salts. The acidic species may comprise one or more organic acids selected from the group consisting oxalic acid, acetic acid, citric acid, maleic acid, methylmalonic acid, glutaric acid, succinic acid, methylsuccinic acid, methylenesuccinic acid, and citraconic acid or wherein the acidic species comprises one or more organic acid anhydrides selected from the group consisting of glutaric anhydride, succinic anhydride, methylsuccinic anhydride, maleic anhydride, and itaconic anhydride. The acidic species may exhibits a pKa of between 1 and 6 in water.

All references throughout this application, for example patent documents including issued or granted patents or equivalents, patent application publications, and non-patent literature documents or other source material, are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising," particularly in a description of components of a composition or in a description of elements of a device, is understood to encompass those compositions and methods consisting essentially of and consisting of the recited components or elements. The invention illustratively described herein suitably may be practiced in the absence of any element or limitation that is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the claims.

What is claimed:

1. A battery cell comprising two electrodes and an electrolyte,
   a first electrode of the two electrodes comprises solid tin oxide nanomaterial having particle sizes less than 20 nm and having a pH<7, measured when the solid tin oxide nanomaterial is suspended-in water at 5 wt %, and a Hammett function $H_0$>−12;
   a second electrode of the two electrodes comprises lithium metal;
   the electrolyte being an acidic electrolyte containing a lithium salt or an electrolyte containing an acidic specie, the acidic specie including one or more organic acids, one or more organic acid anhydrides, or a combination thereof.

2. The battery cell of claim 1, wherein, when cycled at a same charge-discharge as a baseline battery cell:
   the battery cell has a greater initial capacity and greater cyclability than the baseline battery cell; and
   the battery cell has a greater per cycle capacity than does the baseline battery cell;

wherein, the baseline battery cell is a same size as the battery cell and includes:
- an electrode corresponding to the first electrode and including solid tin oxide nanomaterial having particle sizes less than 20 nm and being amphoteric;
- another electrode corresponding to the second electrode and including lithium metal, and
- the electrolyte being the acidic electrolyte containing the lithium salt or the electrolyte containing the acidic specie.

3. The battery cell of claim 2, wherein, the initial capacity of the battery cell is in a range of 500 mAh/g to 1,000 mAh/g.

4. The battery cell of claim 2, wherein, the greater cyclability is in a range of 15% to 45% increase in charge-discharge cycles.

5. The battery cell of claim 1, wherein, the first electrode is a cathode and the second electrode is an anode.

6. The battery cell of claim 1, wherein, the first electrode is an anode and the second electrode is a cathode.

7. The battery cell of claim 1, wherein, the solid tin oxide nanomaterial is in a range of 10 wt % to 33 wt % of the first electrode.

8. The battery cell of claim 1, wherein, the solid tin oxide nanomaterial is in a range of 33 wt % to 50 wt % of the first electrode.

9. The battery cell of claim 1, wherein, the solid tin oxide nanomaterial is in a range of 50 wt % to 80 wt % of the first electrode.

10. The battery cell of claim 1, wherein, the first electrode further comprises graphite or conductive carbon.

11. The battery cell of claim 1, wherein the solid tin oxide nanomaterial is substantially monodispersed and surface functionalized with a material that provides acidic electron withdrawing groups having a molecular weight of less than 200.

12. The battery cell of claim 11, wherein the material is at least one material selected from the group consisting of Cl, Br, $BO_3$, $SO_4$, $PO_4$, $NO_3$, $CH_3COO$, $C_2O_4$, and $C_6H_5O_7$.

13. The battery cell of claim 11, wherein the solid tin oxide nanomaterial is surface-functionalized with chloride.

14. The battery cell of claim 11, wherein the solid tin oxide nanomaterial is surface functionalized with sulfate.

15. The battery cell of claim 1, wherein the pH<5.

16. The battery cell of claim 1, wherein the solid tin oxide nanomaterial includes a second metal selected from the group consisting of iron, manganese, titanium, indium, antimony, and aluminum.

17. The battery cell of claim 1, wherein the one or more organic acids is selected from the group consisting of oxalic acid, acetic acid, citric acid, maleic acid, methylmalonic acid, glutaric acid, succinic acid, methylsuccinic acid, methylenesuccinic acid, and citraconic acid.

18. The battery cell of claim 17, wherein the one or more organic acid anhydrides is selected from the group consisting of glutaric anhydride, succinic anhydride, methylsuccinic anhydride, maleic anhydride, and itaconic anhydride.

19. The battery cell of claim 17, wherein the lithium salt is at least one lithium salt selected from the group consisting of $LiPF_6$, $LiAsF_6$, $LiClO_4$, $LiBF_4$, and $LiCF3SO_3$.

20. A battery cell comprising two electrodes and an electrolyte,
- a first electrode of the two electrodes being a cathode and comprises solid tin oxide nanomaterial having particle sizes less than 20 nm and having a pH<7, measured when the solid tin oxide nanomaterial is suspended-in water at 5 wt %, and a Hammett function $H_0$>−12;
- a second electrode of the two electrodes being an anode and comprises anodic material.

21. The battery cell of claim 20, wherein:
- the electrolyte being an acidic electrolyte containing a lithium salts or an electrolyte containing an acidic specie, the acidic specie including one or more organic acids, one or more organic acid anhydrides, or a combination thereof;
- wherein, the one or more organic acids is selected from the group consisting of oxalic acid, acetic acid, citric acid, maleic acid, methylmalonic acid, glutaric acid, succinic acid, methylsuccinic acid, methylenesuccinic acid, and citraconic acid; and
- wherein, the one or more organic acid anhydrides is selected from the group consisting of glutaric anhydride, succinic anhydride, methylsuccinic anhydride, maleic anhydride, and itaconic anhydride; and
- wherein, the lithium salt is at least one lithium salt selected from the group consisting of $LiPF_6$, $LiAsF_6$, $LiClO_4$, $LiBF_4$, and $LiCF3SO_3$.

22. The battery cell of claim 20, wherein, the solid tin oxide nanomaterial has a pH<5, measured when the solid tin oxide nanomaterial is suspended in water at 5 wt %, and a Hammett function $H_0$>−12.

23. The battery cell of claim 20, wherein, the anodic material comprises lithium metal.

* * * * *